(12) United States Patent
Adams, II et al.

(10) Patent No.: US 8,500,868 B2
(45) Date of Patent: Aug. 6, 2013

(54) SYSTEMS AND METHODS FOR THE SEPARATION OF CARBON DIOXIDE AND WATER

(75) Inventors: Thomas Alan Adams, II, Dewitt, MI (US); Paul Inigo Barton, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 997 days.

(21) Appl. No.: 12/434,486

(22) Filed: May 1, 2009

(65) Prior Publication Data
US 2010/0279181 A1 Nov. 4, 2010

(51) Int. Cl.
*B01D 19/00* (2006.01)

(52) U.S. Cl.
USPC .............. 95/247; 95/254; 95/258; 95/259; 95/266; 96/215

(58) Field of Classification Search
USPC .............. 95/247, 254, 258, 259, 266; 96/193, 96/215
See application file for complete search history.

(56) References Cited

U.S. PATENT DOCUMENTS

| | | | |
|---|---|---|---|
| 3,001,373 A | 9/1961 | Du Bois Eastman |
| 3,527,618 A | 9/1970 | Bushnell |
| 3,754,376 A | 8/1973 | Kent |
| 4,193,776 A | 3/1980 | Wasala et al. |
| 4,240,808 A | 12/1980 | Garber et al. |
| 4,242,458 A | 12/1980 | Child et al. |
| 4,250,230 A | 2/1981 | Terry |
| 4,256,471 A | 3/1981 | Goorden |
| 4,259,414 A | 3/1981 | Williams |
| 4,260,462 A | 4/1981 | Didycz et al. |

(Continued)

FOREIGN PATENT DOCUMENTS

| CS | 235810 B1 | 5/1985 |
|---|---|---|
| DE | 132189 A1 | 9/1978 |

(Continued)

OTHER PUBLICATIONS

Donatini et al., "Supercritical Water Oxidation of Coal in Power Plants with Low CO2 Emissions", Energy, vol. 34, No. 12, pp. 2144-2150, 2008.*

(Continued)

*Primary Examiner* — Jason M Greene
(74) *Attorney, Agent, or Firm* — Wolf, Greenfield & Sacks, P.C.

(57) ABSTRACT

Systems and methods for the separation and capture of carbon dioxide from water are generally described. In some embodiments, a vapor stream containing carbon dioxide and water is separated using a cascade of at least two flash drums. Additional flash steps may be incorporated to remove atmospheric gases, such as nitrogen and argon, from the feed. Carbon dioxide may be condensed and pressurized at purities suitable for pipeline transport and eventual storage in geological formations. In addition, water may be recovered at high purity. In some embodiments, fuel cells may be used in combination with fuel reforming or gasification to produce syngas. Certain aspects of the invention involve innovations related to the combined reforming and fuel cell process, that, in certain embodiments, do not depend upon water and carbon dioxide separation. It should be understood, however, that the invention is not limited to the applications described above, and may be used with any suitable system in which the separation of carbon dioxide and water is desired.

20 Claims, 18 Drawing Sheets

U.S. PATENT DOCUMENTS

| | | | |
|---|---|---|---|
| 4,380,457 | A | 4/1983 | Rathborne et al. |
| 4,522,730 | A | 6/1985 | Hochgesand et al. |
| 4,741,745 | A | 5/1988 | Kadono et al. |
| 4,746,438 | A | 5/1988 | Riggs, Jr. |
| 4,816,040 | A | 3/1989 | Bonville et al. |
| 4,921,765 | A | 5/1990 | Gmeindl et al. |
| 4,988,580 | A | 1/1991 | Ohsaki et al. |
| 5,084,362 | A | 1/1992 | Farooque |
| 5,116,507 | A | 5/1992 | Ebbins et al. |
| 5,240,472 | A | 8/1993 | Sircar |
| 5,250,183 | A | 10/1993 | Sawada et al. |
| 5,413,879 | A | 5/1995 | Domeracki et al. |
| 5,447,024 | A | 9/1995 | Ishida et al. |
| 5,449,568 | A | 9/1995 | Micheli et al. |
| 5,482,791 | A | 1/1996 | Shingai et al. |
| 5,541,014 | A | 7/1996 | Micheli et al. |
| 5,670,053 | A | 9/1997 | Collentro et al. |
| 5,711,770 | A | 1/1998 | Malina |
| 5,811,201 | A | 9/1998 | Skowronski |
| 6,036,748 | A * | 3/2000 | Wallace et al. ............... 95/266 |
| 6,120,582 | A | 9/2000 | Vuletic |
| 6,187,465 | B1 | 2/2001 | Galloway |
| 6,193,893 | B1 | 2/2001 | Mazzei et al. |
| 6,372,023 | B1 | 4/2002 | Kiyono et al. |
| 6,395,895 | B1 | 5/2002 | Holton et al. |
| 6,531,243 | B2 | 3/2003 | Thorn |
| 6,537,349 | B2 * | 3/2003 | Choi et al. ............... 95/247 |
| 6,623,880 | B1 | 9/2003 | Geisbrecht et al. |
| 6,926,869 | B2 | 8/2005 | Rizzi |
| 6,964,696 | B2 * | 11/2005 | Malatak et al. ............... 95/266 |
| 7,132,183 | B2 | 11/2006 | Galloway |
| 7,153,599 | B2 | 12/2006 | Bunker et al. |
| 2002/0033280 | A1 | 3/2002 | Schoeling et al. |
| 2002/0194782 | A1 | 12/2002 | Paisley |
| 2003/0022035 | A1 | 1/2003 | Galloway |
| 2003/0029088 | A1 | 2/2003 | Lyon |
| 2003/0131582 | A1 | 7/2003 | Anderson et al. |
| 2004/0023085 | A1 | 2/2004 | Lightner |
| 2004/0057886 | A1 | 3/2004 | Paulsen et al. |
| 2004/0115492 | A1 | 6/2004 | Galloway |
| 2004/0222152 | A1 * | 11/2004 | Billingham et al. ............ 95/266 |
| 2004/0241514 | A1 | 12/2004 | Tsuji |
| 2004/0251241 | A1 | 12/2004 | Blutke et al. |
| 2005/0011355 | A1 * | 1/2005 | Williams et al. ............... 95/266 |
| 2005/0079395 | A1 | 4/2005 | Varatharajan et al. |
| 2005/0132883 | A1 | 6/2005 | Su et al. |
| 2005/0164051 | A1 | 7/2005 | Venkataraman et al. |
| 2005/0175533 | A1 | 8/2005 | Thomas et al. |
| 2005/0223644 | A1 | 10/2005 | Kim |
| 2006/0003207 | A1 | 1/2006 | Balan et al. |
| 2006/0127714 | A1 | 6/2006 | Vik et al. |
| 2007/0020492 | A1 | 1/2007 | Labinov et al. |
| 2007/0099038 | A1 | 5/2007 | Galloway |
| 2007/0111048 | A1 | 5/2007 | Rackey et al. |
| 2007/0240570 | A1 | 10/2007 | Jadhav et al. |
| 2007/0248527 | A1 | 10/2007 | Spencer |
| 2007/0256359 | A1 | 11/2007 | Wiltowski et al. |
| 2008/0090113 | A1 | 4/2008 | Keefer et al. |
| 2008/0223214 | A1 * | 9/2008 | Palamara et al. ............... 96/193 |

FOREIGN PATENT DOCUMENTS

| | | |
|---|---|---|
| DE | 2908247 A1 | 10/1979 |
| DE | 265886 A1 | 3/1989 |
| DE | 10300466 A1 | 7/2004 |
| DE | 10305806 A1 | 9/2004 |
| DE | 102004038435 A1 | 2/2006 |
| GB | 2431511 A | 4/2007 |
| JP | 53044421 A | 11/1977 |
| JP | 6071585 A | 4/1992 |
| JP | 10067994 A | 3/1998 |
| RU | 2223229 C1 | 2/2004 |
| RU | 2223230 C1 | 2/2004 |
| WO | WO 02/065564 A2 | 8/2002 |
| WO | WO 03/049122 A2 | 6/2003 |
| WO | WO 2006/119118 A2 | 11/2006 |
| WO | WO 2007/082089 A2 | 7/2007 |
| WO | WO 2007/101377 A1 | 9/2007 |
| WO | WO 2007/149879 A2 | 12/2007 |

OTHER PUBLICATIONS

International Search Report and Written Opinion mailed Sep. 7, 2010 for Related International Application No. PCT/US2010/001296.

Acosta et al., "Physico-chemical characterization of slag waste coming from GICC thermal power plant," *Materials Letters* 50:246-250 (2001).

Adams, T. A., et al., "High-efficiency power production from natural gas with carbon capture," *Journal of Power Sources*, vol. 195, No. 7, pp. 1971-1983 (2010).

Adams, T. A., et al., High efficiency power production from coal with carbon capture, *AIChE J*, vol. 56, No. 12, pp. 3120-3136 (2010).

Agrawal et al., "Sustainable fuel for the transportation sector," *PNAS* 104(12):4828-4833 (2007).

Al-Anezi et al., "Effect of Carbon Dioxide in Seawater on Desalination: A Comprehensive Review," *Separation & Purification Reviews* 35(3):223-247 (2006).

Al-Sofi, Mohammed Abdul-Kareem, "Fouling phenomena in multi stage flash (MSF) distillers," *Desalination* 126(1):61-76 (1999).

Amman et al., "Reforming natural gas for $CO_2$ pre-combustion capture in combined cycle power plant," *Clean Techn Environ Policy* 11:67-76 (2009).

Angelino et al., "Closed versus open cycle energy recovery from solid oxide fuel cells," *J Power Energy* 222:371-379 (2008).

Anonymous, "The application of a pre-flash, a possibility to increase the desorber capacity in the waste water treatment section of a urea plant," Research Disclosure Database No. 432049, Research Disclosure Journal, USSN 0374-4353, Apr. 2000.

Araki et al., "Cycle analysis of low and high $H_2$ utilization SOFC/gas turbine combined cycle for $CO_2$ recovery," *J Power Sources* 171(2):464-470 (2007).

Blasing et al., "The annual cycle of fossil-fuel carbon dioxide emissions in the United States," *Tellus* 57B:107-115 (2005).

Booras et al., "EPRI IGCC Study Cost and Performance Results," Electric Power Research Institute, 2008 Gasification Technologies Conference, Washington, D.C., Oct. 8, 2008.

Brickett, Lynn A., "Carbon Sequestration: The Key Enabler," National Energy Technology Laboratory Office of Fossil Energy, Carbon Sequestration Program, Workshop on Gasification Technologies, Jun. 17-18, 2008.

Burnette et al., "The use of hydrogen-depleted coal syngas in solid oxide fuel cells," *J Power Sources* 182(1):329-333 (2008).

Campanari, S., "Carbon dioxide separation from high temperature fuel cell power plants," *J Power Sources* 112:273-289 (2002).

Cao et al., "Investigation of chemical looping combustion by solid fuels: 1. Process analysis," *Energy & Fuels* 20:1836-1844 (2006).

Capek et al., "Dynamics of water gas shift reaction system," *Chem Eng Sci* 47(9-11):2811-2816 (1992).

Chan et al., "Modelling of a simple hybrid solid oxide fuel cell and gas turbine power plant," *J Power Sources* 109:111-120 (2002).

Chiesa et al., "$CO_2$ Emission Abatement in IGCC Power Plants by Semiclosed Cycles: Part A—With Oxygen-Blown Combustion," *J Engineer Gas Turbines Power* 121(4):635-641 (1999).

Consonni et al., "Chemical-Looping Combustion for Combined Cycles With $CO_2$ Capture," *J Engineer Gas Turbines Power* 128(3):525-534 (2006).

De Lorenzo et al., "Carbon-Free Hydrogen and Electricity From Coal: Options for Syngas Cooling in Systems Using a Hydrogen Separation Membrane Reactor," *J Eng Gas Turbines Power* 130(3):031401-1-031401-10 (2008).

Devisser et al., "Dynamis $CO_2$ quality recommendations," *Int J Greenhouse Gas Control* 2:478-484 (2008).

Dooley et al., "Large-Scale U.S. Unconventional Fuels Production and the Role of Carbon Dioxide Capture and Storage Technologies in Reducing Their Greenhouse Gas Emissions," *Energy Procedia* 00:000-000 pp. 1-8 (2008).

Donatini, F., et al., "Supercritical water oxidation of coal in power plants with low $CO_2$ emissions," *Energy*, vol. 34, No. 12, pp. 2144-2150 (2008).

Doyon, et al., "SECA Coal-Based Multi-MW SOFC Power Plant Development," Session 1B: High Temp Fuel Cell R&D II (SECA) Fuel Cell Seminar & Exposition, San Antonio, Texas, Oct. 15-19, 2007, Fuel Cell Energy, Inc.

Doyon, Jody, "II. SECA Fuel Cell Coal-Based Systems: 1 Coal-Based Solid Oxide Fuel Cell Power Plant Development," Office of Fossil Energy Fuel Cell Program, FY 2007 Annual Report, pp. 11-13.

Duan, L. and Yang, Y., "Comparative study on different IGCC systems with quasi-zero $CO_2$ emission," *Int J Thermodyn* 10:61-69 (2007).

Duan et al., "Study on SOFC-IGCC Hybrid Power System with High Efficiency," *Proc. ASME Turbo Expo* 3:223-230 (2007).

Duan, L.; Yang, Y., and Xu, E., "Study on SOFC-MGT Hybrid Cycle System with High Efficiency," ASME 2008 International Mechanical Engineering Congress and Exposition (IMECE2008) Oct. 31-Nov. 6, 2008, Boston, Massachusetts, USA (2008).

EG&G Technical Services, Inc., "Fuel Cell Handbook ($7^{th}$ Edition)," Chapters 7 and 8, U.S. Dept. Energy, Office of Fossil Energy, National Energy Technology Laboratory, Nov. 2004.

El-Dessouky et al., "Process synthesis: the multi-stage flash desalination system," *Desalination* 115(2):155-179 (1998).

Feeley et al., "Department of Energy/Office of Fossil Energy's Power Plant Water Management R&D Program," DOE/FE's Power Plant Water Management R&D Program Summary, Jul. 2005, pp. 1-18.

Fogash et al., "Oxycoal Combustion: Opportunities and Challenges—Purification of Oxyfuel-Derived $CO_2$," AIChE National Meeting, Salt Lake City, Oct. 2007, pp. 1-9.

Franzoni et al., "Thermoeconomic analysis of pressurized hybrid SOFC systems with $CO_2$ separation," *Energy* 33:311-320 (2008).

Frazer, Lance, "Low Water Consumption: A New Goal for Coal," *Environmental Health Perspectives* 112(5):A296-A299 (2004).

Galvita et al., "Hydrogen production by coal plasma gasification for fuel cell technology," *Int 'l J Hydrogen Energy* 32(16):3899-3906 (2007).

Gemmen et al., "On the mechanisms and behavior of coal syngas transport and reaction within the anode of a solid oxide fuel cell," *J Power Sources* 161(2):1084-1095 (2006).

Gemmen et al., "Coal Syngas Testing at NETL," 2008 SECA Workshop, Aug. 5-7, 2008, National Energy Technology Laboratory, Energy Systems Dynamics Division.

Ghezel-Ayagh, H., "Solid Oxide Fuel Cell Program at FuelCell Energy Inc.," $9^{th}$ Annual SECA Workshop, Pittsburgh, PA, Aug. 5-7, 2008.

Ghezel-Ayagh et al., "Coal-based solid oxide fuel cell power plant development," Abstract from $23^{rd}$ Annual International Pittsburgh Coal Conference, PCC—Coal-Energy, Environment and Sustainable Development, 2006.

Ghosh et al., "Thermodynamic performance study of an integrated gasification fuel cell combined cycle: an exergy analysis," *Procs. Instn Mech Engrs* 217 Part A: J Power and Energy: 575-581 (2003).

Ghosh et al., "Exergy analysis of a cogeneration plant using coal gasification and solid oxide fuel cell," *Int J Energy Res* 30:647-658 (2006).

Ghosh et al., "Energy analysis of a cogeneration plant using coal gasification and solid oxide fuel cell," *Energy* 31:345-363 (2006).

Granovskii et al., "Exergy analysis of a gas turbine cycle with steam generation for methane conversion within solid oxide fuel cells," *J Fuel Cell Sci Technol* 5:031005.1-031005.9 (2008).

Gray et al., "Current and Future IGCC Technologies: Bituminous Coal to Power," Mitretek Technical Report MTR 2004-05, Aug. 2004, Mitretek Systems, Falls Church, Virginia.

Griffin et al., "Advanced Zero Emissions Gas Turbine Power Plant," *J Engineer Gas Turbines Power* 127(1):81-85 (2005).

Grol et al., "Integrated Gasification Fuel Cell (IGFC) System Studies," $9^{th}$ Annual SECA Workshop, Pittsburgh, Pennsylvania, Aug. 5-7, 2008, National Energy Technology Laboratory.

Gupta et al., "Syngas redox (SGR) process to produce hydrogen from coal derived syngas," *Energy & Fuels* 21:2900-2908 (2007).

Haga et al., "Poisoning of SOFC anodes by various fuel impurities," *Solid State Ionics* 179:1427-1431 (2008).

Hammond et al., Thermodynamic and related analysis of natural gas combined cycle power plants with and without carbon sequestration, *Int J Energy Res* 31(12):1180-1201 (2007).

Han et al., "A novel combined cycle with synthetic utilization of coal and natural gas," *Energy* 32:1334-1342 (2007).

Herzog et al., "Carbon capture and Storage from Fossil Fuel Use," *Encyclopedia of Energy*, C.J. Cleveland, ed., Elsevier Science, Inc., New York, pp. 277-287 (2004).

Hewlett Foundation and Energy Foundation, "The Last Straw: Water Use by Power Plants in the Arid West," Clean Air Task Force, The Land and Water Fund of the Rockies, Hewlett Foundation Energy Series, Apr. 2003, 20 pages.

Hornick et al "Tampa Electric Polk Power Station Integrated Gasification Combined Cycle Project Final Technical Report," Aug. 2002, Work performed under Cooperative Agreement DE-FC-21-91MC27363 for the U.S. Dept. of Energy Office of Fossil Energy, National Technology Laboratory, Morgantown, West Virginia.

Ishida et al., "A new advanced power-generation system using chemical-looping combustion," *Energy* 19(4):415-422 (1994).

Kee et al., "Solid oxide fuel cells: Operating principles, current challenges, and the role of syngas," *Combust Sci Technol* 180(6):1207-1244 (2008).

Keiski et al., "Stationary and transient kinetics of the high temperature water-gas shift reaction," *Appl Catal A Gen* 137(2):349-370 (1996).

Kiviaho et al., "Solid oxide fuel cell system development in VTT," *Trans ASME* 4:392-396 (2007).

Krüger et al., "Solid oxide fuel cell (SOFC) hybrid power plant with integrated coal gasification: Process variations and possible ways to separate carbon dioxide," *Chemie Ingenieur Technik* 79(9):1323 (2007).

Lee et al., "An improved one-dimensional membrane-electrode assembly model to predict the performance of solid oxide fuel cell including the limiting current density," *J Power Sources* 186:417-427 (2009).

Lee, et al., "Reversible chemisorption of carbon dioxide: simultaneous production of fuel-cell grade H2 and compressed CO2 from synthesis gas," *Adsorption*, 13, pp. 385-397 (2007).

Lemanski et al., "Performance of Lignite-Syngas Operated Tubular Solid Oxide Fuel Cell," *Chemical and Process Engineering* 29:233-248 (2008).

Li et al., "Clean coal conversion processes—progress and challenges," *Energy Environ Sci* 1:248-267 (2008).

Lim et al., "Operating characteristics of a 5kW class anode-supported planar SOFC stack for a fuel cell/gas turbine hybrid system," *Int J Hydrogen Energy* 33:1076-1083 (2008).

Lisbona et al., "Enhanced coal gasification heated by unmixed combustion integrated with an hybrid system of SOFC/GT," *Int J Hydrogen Energy* 33(20):5755-5764 (2008).

Lobachyov et al., "Combined Cycle Gas Turbine Power Plant with Coal Gasification and Solid Oxide Fuel Cell," *J Energy Resour Technol* 118(4):285-292 (1996).

Lu et al., "A solid oxide fuel cell system fed with hydrogen sulfide and natural gas," *J Power Sources* 135:184-191 (2004).

Lyngfelt et al., "A fluidized-bed combustion process with inherent $CO_2$ separation; application of chemical-looping combustion," *Chem Eng Sci* 56(10):3101-3113 (2001).

Malkow, T., "SOFC in brief," *Modeling Solid Oxide Fuel Cells*, Chapter 1, R. Bove and S. Ubertini, eds., Spring Science and Business Media, BV (2008).

Mantripragada et al., "$CO_2$ reduction potential of coal-to-liquids (CTL) plants," *Energy Procedia* 00:000-000 (2008) 8 pages.

Marquez et al., "Effects of coal syngas and $H_2S$ on the performance of solid oxide fuel cells: Part 2. Stack tests," *J Power Sources* 164(2):659-667 (2007).

Matelli et al., "A methodology for thermodynamic simulation of high temperature, internal reforming fuel cell systems," *J Power Sources* 142:;160-168 (2005).

Meerman et al., "Flexible integrated gasification co-generation facilities: A technical and energy analysis," *Energy Procedia* 00:000-000 (2008) pp. 1-8.

Merichem Chemicals & Refinery Services, LLC, "Knock out hydrogen sulfide with Sulfur-Rite," Product brochure, Schaumburg, Illinois.

Minchener et al., "Strategy for sustainable power generation from fossil fuels," *J Energy Institute* 81(1):38-44 (2008).

Minh et al., "Coal Based Solid Oxide Fuel Cell Technology Development," *ECS Trans.* 7(1):45-50 (2007).
Möller et al., "On the off-design of a natural gas-fired combined cycle with $CO_2$ capture," *Energy* 32:353-359 (2007).
Nakaiwa et al., "Evaluation of energy supply system with air separation," *Energy Conserv and Mgmt* 37(3):295-301 (1996).
Noponen et al., "Feasibility of autothermally reformed natural gas on anode supported solid oxide fuel cells," J Fuel Cell Sci Technol 3(4):438-444 (2006).
Newsome, D.S., "The water gas shift reaction," *Catalysis Rev* 21(2):275-318 (1980).
Nichols, M., "Gore urges civil disobedience to stop coal plants," Reuters, Sep. 24, 2008.
Nihous et al., "A Strategy to Reduce $CO_2$ Emissions from Hydrocarbon-Fueled Power Plants by Precombustion Reforming and Deep Ocean Discharge of $CO_2$," *Int J Hydrogen Energy* 19(4):387-394 (1994).
Odeh et al., "Life cycle analysis of UK coal fired power plants," *Energy Conversion and Management* 49(2):212-220 (2008).
Ovesen et al., "A kinetic model of the water gas shift reaction," *J Catalysis* 134(2):445-468 (1992).
Ovesen, et al., "A Microkinetic Analysis of the Water-Gas Shift Reaction under Industrial Conditions," *Journal of Catalysis*, 158, pp. 170-180 (1996).
Parsons et al., "Advanced Fossil Power Systems Comparison Study: Final Report," National Energy Technology Laboratory, Dec. 2002.
Peters et al., "Pre-reforming of natural gas in solid oxide fuel-cell systems," *J Power Sources* 86:432-441 (2000).
Pierre, Joseph F., "II. SECA Fuel Cell Coal-Based Systems: 3. Coal Gas Fueled SOFC Hybrid Power Systems with $CO_2$ Separation," Office of Fossil Energy Fuel Cell Program, FY 2007 Annual Report, DOE/NETL-2007/1288, Aug. 2007, pp. 17-19.
Rao et al., "A thermodynamic analysis of tubular solid oxide fuel cell based hybrid systems," *J Eng Gas Turbines Power* 125:59-66 (2003).
Rao et al., "Engineering and economic analyses of a coal-fueled solid oxide fuel cell hybrid power plant," *Proc ASME Turbo Expo* 3:545-553(2005).
Reinstrom, et al., "Carbonate Fuel Cell Powerplant System," *IEEE Transactions on Power Apparatus and Systems*, PAS-100, Issue 12, pp. 4752-4759.
Riensche et al., "Clean combined-cycle SOFC power plant—cell modeling and process analysis," *J Power Sources* 86:404-410 (2000).
Rostrup-Nielsen et al., "Polygeneration—Integration of Gasoline Synthesis and IGCC Power Production Using Topsoe's TIGAS Process," Risø-R-1608(EN), pp. 56-68, 130.226.56.153/rispubl/reports/ris-r-1608_56-68.pdf.
Sasaki et al., "$H_2S$ Poisoning of Solid Oxide Fuel Cells," *J Electrochem Society* 153(11):A2023-A2029 (2006).
Schoff et al., "Gasification Technology Options for SOFC Applications," 8th Annual SECA Workshop, San Antonio, Texas, Aug. 7-8, 2007, Electric Power Research Institute.
Seifert et al., "A model for stagewise calculation of non-condensable gases in multi-stage evaporators," *Desalination* 81(1-3):333-347 (1991).
Shaffer, Steven, "Delphi SOFC Development Update," 9th Annual 2008 SECA Workshop, Pittsburgh, Pennsylvania, Aug. 5-7, 2008.
Shen et al., "A mechanistic investigation of a calcium-based oxygen carrier for chemical looping combustion," *Combustion and Flame* 154:489-506 (2008).
Shoko et al., "Hydrogen from coal: Production and utilization technologies," *Int J Coal Geology* 65(3-4):213-222(2006).
Steinberg et al., "High Efficiency Direct Carbon and Hydrogen Fuel Cells for Fossil Fuel Power Generation," American Institute of Chemical Engineers 2002 Spring Meeting, New Orleans, Louisiana, Mar. 10-14, 2002.
Stiegel et al., "Hydrogen from coal gasification: An economical pathway to a sustainable energy future," *Int J Coal Geology* 65(3-4):173-190 (2006).
Summerfelt, S.T., "Evaluation of full-scale carbon dioxide stripping columns in a coldwater recirculating system," Aquacultural Engineering 28(3-4):155-169 (2003).
Sun et al., "Noble metal water gas shift catalysis: Kinetic study and reactor design," *Int J Hydrog Energy* 30(11):1259-1264 (2005).
Trembly et al., "Effects of coal syngas and $H_2S$ on the performance of solid oxide fuel cells: Single-cell tests," *J Power Sources* 158(1):263-273 (2006).
Trembly et al., "The effect of coal syngas containing HCl on the performance of solid oxide fuel cells: Investigations into the effect of operational temperature and HCl concentration," *J Power Sources* 169(2):347-354 (2007).
U.S. Department of Energy, "Fact Sheet: DOE to demonstrate cutting edge carbon capture and sequestration technology at multiple FutureGen clean coal projects," Jan. 2008.
U.S. Department of Energy, "Electricity Reliability Impacts of a Mandatory Cooling Tower Rule for Existing Steam Generation Units," Office of Electricity Delivery and Energy Reliability, Oct. 2008.
U.S. Department of Energy, "Energy Penalty Analysis of Possible Cooling Water Intake Structure Requirements on Existing Coal-Fired Power Plants," Office of Fossil Energy, National Energy Technology Laboratory, Argonne National Laboratory, Oct. 2002.
U.S. Department of Energy, "Carbon Sequestration Technology Roadmap and Program Plan: 2007," National Energy Technology Laboratory, Apr. 2007.
U.S. Department of Energy, "Secretary Abraham Unveils DOE '05 Budget," Press release, Feb. 2, 2004.
Van Bibber et al., "Baseline Technical and Economic Assessment of a Commercial Scale Fischer-Tropsch Liquids Facility Final Report," U.S. Dept. of Energy/National Energy Technology Laboratory, Apr. 9, 2007.
Van Der Burgt, et al., "Removal of CO2 from syngas," Research Disclosure Database No. 301003, Research Disclosure Journal, USSN 0374-4353, May 1989.
Vanosdol et al., "Calculating the Energy Cost of $CO_2$ Removal in a Coal Based Gas Turbine Fuel Cell Hybrid Power Generation System with an Isolated Anode Stream," in *Coal Based Fuel Cell Technology: Status, Needs and Future Applications*, West Virginia University, Morgantown, West Virginia, Oct. 11-12, 2007, DOE/NETL-IR-2008-010.
Verma et al., "Sensitivity analysis of a Vision 21 coal based zero emission power plant," *J Power Sources* 158(1):417-427 (2006).
Vora, Shailesh D., "SECA Program Review," Presented at the 9th Annual SECA Workshop, Pittsburgh, Pennsylvania, Aug. 5-7, 2008, Siemens Power Generation, Inc.
Wabash River Energy, Ltd., "Wabash River Coal Gasification Repowering Project: Final Technical Report," Aug. 2000.
Walters et al., "Homogeneous kinetics and equilibrium predictions of coking propensity in the anode channels of direct oxidation solid-oxide fuel cells using dry natural gas," *J Power Sources* 123:182-189 (2003).
Wang, Q., "A Novel Energy Conservation Process for Zero Emission of Carbon Dioxide: Chemical Looping Combustion," *Progress in Chemistry* 20(10):1612-1620 (2008).
White et al., "Purification of Oxyfuel-Derived $CO_2$ for Sequestration or EOR." 8th International Conference on Greenhouse gas Control Technologies (2006).
Woods et al., "Cost and Performance Base-line for Fossil Energy Plants. vol. 1: Bituminous Coal and Natural Gas to Electricity Final Report," DOE/NETL-2007/1281, Revision 1, Aug. 2007.
Zhang et al., "Comparative study of two low $CO_2$ emission power generation system options with natural gas reforming," *J Eng Gas Turbines Power* 130:051701.1-051701.11 (2008).
Zhang, Wei, "Simulation of Solid Oxide Fuel Cell-Based Power Generation Processes with $CO_2$ Capture," M.Sc. Thesis in Chemical Engineering, University of Waterloo, Waterloo, Ontario, Canada, 2006.

* cited by examiner

SYSTEMS AND METHODS FOR THE SEPARATION OF CARBON DIOXIDE AND WATER

FIELD OF INVENTION

Systems and methods for the separation of carbon dioxide and water are generally described, which are particularly suited, in certain embodiments for use in power generation systems.

BACKGROUND

Carbon dioxide and water vapor are commonly found in the exhaust emitted from many industrial processes such as fossil fuel power plants, including those using conventional pulverized coal, integrated gasification combined cycles (IGCC), natural gas combined cycles, chemical looping, and fossil oil-based fuels. Currently, these gases are typically simply vented to the atmosphere. However, due to recent widespread environmental concern and developing and expected regulatory mandates, it is desirable to minimize atmospheric carbon dioxide emissions.

One proposed method of reducing carbon dioxide emissions involves carbon dioxide capture and, optionally, sequestration. In order to effectively and safely sequester carbon dioxide by many current and proposed techniques, however, relatively high purities are required. Moreover, from the standpoint of overall water usage for many of the above mentioned processes, for both economic and environmental reasons, the ability to recover water at relatively high purity from exhaust streams including carbon dioxide/water mixtures is also desirable. Various techniques have been proposed for the separation of carbon dioxide from water including, for example, organic solvent-based absorption, selective membrane separation, and vapor condensation at low pressures. However, these techniques may pose disadvantages. For example, organic solvent-based methods often make use of expensive and/or toxic solvents. In addition, many of the above-mentioned methods require use of expensive, specialized equipment and/or are energy intensive, leading to large parasitic loads on power generating systems to which they are applied.

Accordingly, improved systems and methods for the separation of carbon dioxide from water are desirable.

SUMMARY OF THE INVENTION

Systems and methods for the separation of carbon dioxide from water are provided. Also described are systems and methods of producing power, including those in which a separation of carbon dioxide and water takes place, and those that operate via use of a gasifier in combination with a fuel cell and, in certain cases, a water-gas shift reactor. The subject matter of the present invention involves, in some cases, interrelated products, alternative solutions to a particular problem, and/or a plurality of different uses of one or more systems and/or articles.

In one series of embodiments, a method of producing electrical power from a syngas is provided. In certain embodiments, the method comprises: purifying the syngas to remove at least one impurity; enriching the syngas via subjecting it to a water-gas shift reaction to produce a product relatively enriched in hydrogen and carbon dioxide; reacting the purified, enriched syngas within a fuel cell to produce electrical power and a fuel cell anode exhaust stream; and separating the fuel cell anode exhaust stream to produce a first separator stream relatively enriched in water.

Also disclosed is a system for producing electrical power from a syngas. In certain embodiments, such system comprises: a fuel cell configured to produce electrical power from syngas; a purification unit upstream of the fuel cell, the purification unit configured to remove at least one impurity from a syngas stream; a water-gas shift reactor upstream of the fuel cell, the water-gas shift reactor configured to produce a stream enriched in hydrogen and carbon dioxide relative to the stream fed to the water-gas shift reactor; and a separator configured to produce a stream relatively enriched in water from a feed stream comprising or derived from at least a portion of a fluid product of the fuel cell.

Also disclosed are methods systems of separating carbon dioxide and water and systems for performing such methods. In one set of embodiments, a method of separating carbon dioxide and water is provided that comprises: separating a first fluid stream comprising carbon dioxide and water within a first flash drum to create a second fluid stream enriched in water relative to the first fluid stream; and separating the second fluid stream comprising carbon dioxide and water within a second flash drum to create a third fluid stream enriched in water relative to the second fluid stream. In these or other embodiments, the method of separating carbon dioxide and water may comprise: separating a first fluid stream comprising carbon dioxide and water within a first flash drum to create a second fluid stream enriched in water relative to the first fluid stream; and separating the second fluid stream comprising carbon dioxide and water within a second flash drum to create a third fluid stream enriched in carbon dioxide relative to the second fluid stream.

Also described is a method of separating carbon dioxide from water that comprises: separating, without the use of a non-aqueous solvent, a first fluid stream comprising carbon dioxide and water within a first separation unit to produce a second fluid stream containing at least about 99.8 wt % water.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
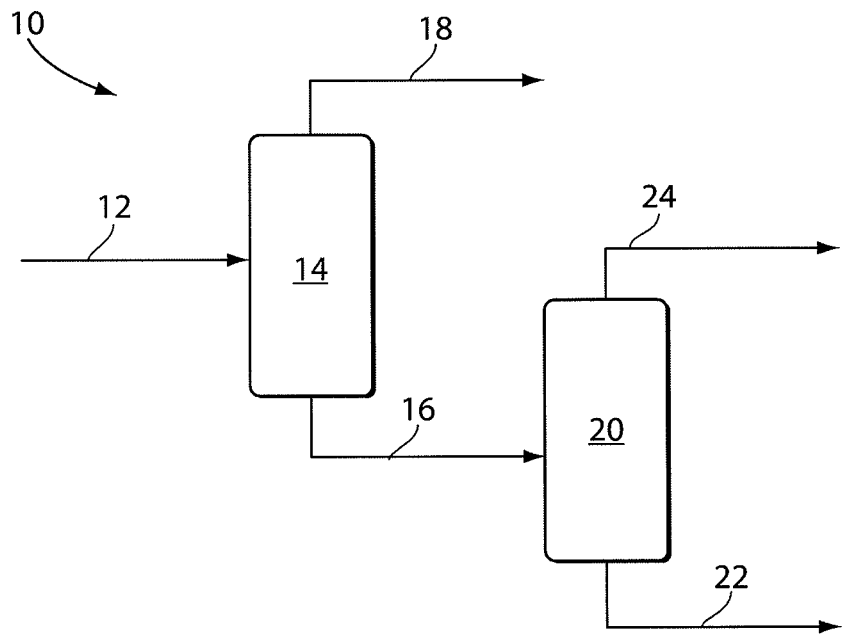
FIGS. 1A-1B are schematic diagrams of separation processes, according to one set of embodiments.

Systems and methods for the separation and capture of carbon dioxide from water are generally described. Also described are systems and methods of producing power, including those in which a separation of carbon dioxide and water takes place, and those that operate via use of a gasifier in combination with a fuel cell and, in certain cases, a water-gas shift reactor. In some embodiments, water and/or carbon dioxide is purified from a stream containing both carbon dioxide and water using a cascade of at least two flash drums. Additional flash steps may be incorporated in certain embodiments, for example to remove other gases, e.g. atmospheric gases such as nitrogen and argon, from the feed. Carbon dioxide purified with the inventive systems and processes, in certain embodiments, can be condensed and pressurized at purities suitable for pipeline transport and eventual storage in geological formations. In addition, in certain embodiments, water can be recovered at high purity.

Certain embodiments of the systems and methods described herein can provide several advantages over traditional separation techniques in certain applications. For example, carbon dioxide and water may be produced at purities difficult to achieve with cost-competitive conventional separation processes by using certain described embodiments. In certain advantageous applications employing certain embodiments of the inventive carbon dioxide-water separation processes, relatively high-purity water can be recovered and used elsewhere in the process, and carbon dioxide can be sequestered. In addition, certain separation processes described herein may be performed with higher efficiency than typical conventional processes. The multi-stage flash units utilized for purification of carbon dioxide according to certain embodiments are adapted be operated at relatively high pressures, eliminating or mitigating the need to re-compress captured carbon dioxide for transportation and storage. In some embodiments, little or no heat, aside from the enthalpic contribution of the feed stream, is required to be supplied to the flash drums during separation, reducing the amount of required input energy. Certain systems and processes for separating carbon dioxide and water described herein may also be configured and operated to be more environmentally-friendly than cost-competitive conventional alternatives, as they do not require the use of toxic solvents and/or are more energy efficient to operate. The separations using such embodiments may also be performed more inexpensively than typical conventional carbon dioxide separation techniques due to the lack of requirement for high-cost solvents, membranes, and specialized equipment such as absorption columns, distillation columns, etc. required by such conventional processes in certain embodiments of the invention.

Carbon dioxide-water separation systems and methods described herein may be used in a variety of applications. For example, the inventive multi-stage flash separation may be integrated with power plants (e.g., conventional pulverized coal, integrated gasification combined cycles (IGCC), natural gas combined cycles, etc. power plants) which may use a wide variety of carbonaceous feeds (e.g., coal, natural gas, biofuels, fossil oil-based fuels, etc.). In some instances, in these or other applications, the inventive carbon dioxide and water separation systems may be integrated with a chemical looping process, such as those used to produce hydrogen from syngas, hydrogen from gasified coal, or electricity via direct coal gasification (see discussion below for some specific examples). Some embodiments of the carbon dioxide-water separation systems and methods described herein may find particularly advantageous use as part of processes and systems that make use of fuel cells (e.g., solid oxide fuel cells) in combination with fuel reforming to produce syngas and/or electrical power. Certain aspects of certain embodiments of the invention involve innovations related to such combined reforming and fuel cell processes, that, in some cases, do not necessarily use or require a water-carbon dioxide separation step. It should be understood, however, that the inventive carbon dioxide-water separation systems and processes are not limited to the applications described herein, and may be used with any suitable system in which the separation of carbon dioxide and water is desired.

FIG. 1 shows a schematic illustration of a multi-stage flash system 10 including two flash drums for separating carbon dioxide and water, according to one set of embodiments. Feed fluid stream 12 comprises carbon dioxide and water (e.g., a mixture of carbon dioxide vapor and water vapor). As used herein, the term "fluid" generally refers to a substance that is either in a liquid, gas, or supercritical state.

In certain embodiments, it may be advantageous for the feed fluid stream to be pressurized to a pressure substantially greater than standard ambient pressure (about 1 atm) and/or be at a temperature substantially greater than the standard ambient atmospheric temperature (about 25° C.). In some embodiments, the feed fluid stream may consist essentially of carbon dioxide and water, while in other cases, the feed fluid stream may contain impurities (e.g., nitrogen, argon, sulfur-containing compounds, carbon monoxide, etc.). It may be advantageous, in some cases, for the feed fluid stream to contain relatively low amounts of carbon monoxide (e.g., less than about 1.5 wt %, less than about 1 wt %, less than about 0.1 wt %, or less. In some instances, the weight ratio of carbon dioxide to carbon monoxide in the feed fluid stream is at least about at least about 30:1, at least about 150:1, at least about X:Y40,000:1, or least about 900,000:1. In the illustrated embodiment, the feed fluid stream 12 is separated within a first flash drum 14 to create fluid stream 16 (e.g., a liquid or liquid-containing stream) enriched in water relative to the feed fluid stream (i.e. having a greater water purity/concentration than that of the feed fluid stream). In some embodiments, separating the feed fluid stream within the first flash drum may further comprise creating an additional fluid stream 18 (e.g., a vapor or vapor-containing stream) enriched in carbon dioxide relative to the feed fluid stream. Fluid stream 16 may be separated within a second flash drum 20 to create another fluid stream 22 (e.g., a liquid or liquid-containing stream) enriched in water relative to the fluid stream 16. Separating the fluid stream 16 within the second flash drum may further comprise creating fluid stream 24 (e.g., a vapor or vapor-containing stream) enriched in carbon dioxide relative to the fluid stream 16, and, in certain embodiments, enriched in carbon dioxide relative to the feed fluid stream 12 and/or fluid stream 18.

The term "flash drum" is used herein according to its ordinary meaning and generally refers to a vessel configured and operated to separate a vapor phase from a liquid phase, which is substantially free of reflux from an external condenser or reboiled fluid from an external heater. Flash drums may be used to achieve vapor liquid separation, in some embodiments, without the use of a non-aqueous solvent. In some cases, essentially no non-aqueous solvent is present within a flash drum during separation so that substantially no carbon dioxide is dissolved in any non-aqueous solvent during separation. In some embodiments, separation may be achieved using one or more flash drums operated such that substantially no externally supplied heat is input into the flash drum during the separating step. Flash drums described herein may be operated, in some instances, essentially adiabatically, while, in other cases, they may be operated essentially isothermally.

The temperature and/or pressure of one or more flash drums can be selected such that effective separation of the liquid and vapor may be achieved. For example, by operating a flash drum at a higher temperature and/or a lower pressure than the feed stream into the flash drum, a portion of the $CO_2$ in the feed may be vaporized from a liquid. By operating a flash drum at a lower temperature than the feed stream into the flash drum, a portion of the water in the feed may be condensed from a vapor. In some embodiments, the temperature of a flash drum (e.g., flash drum 14, flash drum 20) is lower than the temperature of the fluid stream fed to the flash drum (e.g., fluid stream 12 and fluid stream 16, respectively), while the pressure of the flash drum is substantially equal to the pressure of the fed fluid. Similarly, the pressure of a flash drum may be lower than the pressure of the fluid stream fed to the flash drum while the temperature of the flash drum and fed fluid stream are substantially equal. In some cases, both the pressure and the temperature of the flash drum are lower than the pressure and temperature of the fluid stream fed to the flash drum.

In addition, flash drums may be operated at different temperatures and/or pressures to achieve enhanced separations in sequential steps. For example, in some embodiments, a first flash drum (e.g., flash drum 14 in FIG. 1) is operated at a first pressure and a first temperature, and a second flash drum downstream of the first flash drum (e.g., flash drum 20 in FIG. 1) is operated at a second pressure and a second temperature. In some embodiments, the second pressure may be substantially lower than the first pressure while the second temperature may be substantially lower, substantially the same, or substantially higher than the first temperature. In addition, the second temperature may be substantially lower than the first temperature while the second pressure may be substantially lower, substantially the same, or substantially higher than the first pressure. In some embodiments, the second flash drum may be operated at ambient temperature and/or ambient pressure.

In some embodiments, the pressure in the first flash drum (e.g., flash drum 14) is at least about 2 bar, at least about 5 bar, at least about 10 bar, at least about 20 bar, at least about 30 bar, or at least about 35 bar. The pressure in the first flash drum 14 may be between about 2 bar and about 35 bar, between about 5 bar and about 35 bar, or between about 10 bar and about 35 bar in some instances. In some embodiments, the pressure in the second flash drum (e.g., flash drum 20) is at least about 2 bar, at least about 5 bar, at least about 10 bar, at least about 20 bar, at least about 30 bar, or at least about 35 bar. The pressure in the second flash drum may be between about 2 bar and about 35 bar, between about 5 bar and about 35 bar, or between about 10 bar and about 35 bar in some cases. In addition, the flash drums described herein may be operated at any suitable temperature. Methods for designing flash drums to achieve the desired degree of separation may be found, for example, in Chapter 3 of Wankat, P. C., *Equilibrium Staged Separations*, Prentice Hall, Upper Saddle River, N.J., 1988, which is incorporated herein by reference in its entirety.

The inventive carbon dioxide-water separation processes may be used to achieve high purity of carbon dioxide and/or water in some cases. For example, a liquid stream exiting a flash drum (e.g., water-enriched stream 22 in FIGS. 1A-1B) can potentially contain at least about 99 wt %, at least about 99.5 wt %, at least about 99.8 wt %, at least about 99.9 wt %, at least about 99.99 wt %, or more water. In some instances, a vapor stream exiting a flash drum (e.g., carbon dioxide-enriched stream 18 or 24 in FIGS. 1A-1B) may contain at least about 99 wt %, at least about 99.5 wt %, at least about 99.8 wt %, at least about 99.9 wt %, or more carbon dioxide. In some embodiments, high purities (e.g., any of the purity levels listed above) may be achieved while maintaining pressure in a purified stream at or near the pressure of feed stream 12. In some embodiments, a liquid stream exiting a flash drum may contain at least about 99 wt %, at least about 99.5 wt %, at least about 99.8 wt %, at least about 99.9 wt %, or more water while the pressure of the stream is at least about 2 bar, at least about 5 bar, at least about 10 bar, at least about 20 bar, or at least about 30 bar or between about 2 bar and about 35 bar, between about 5 and about 35 bar, between about 10 bar and about 35 bar, or between about 20 bar and about 35 bar. In some embodiments, a vapor stream exiting a flash drum may contain at least about 99 wt %, at least about 99.5 wt %, at least about 99.8 wt %, at least about 99.9 wt %, or more carbon dioxide while the pressure of the stream is at least about 2 bar, at least about 5 bar, at least about 10 bar, at least about 20 bar, or at least about 30 bar or between about 2 bar and about 35 bar, between about 5 and about 35 bar, between about 10 bar and about 35 bar, or between about 20 bar and about 35 bar.

Figure 1B:
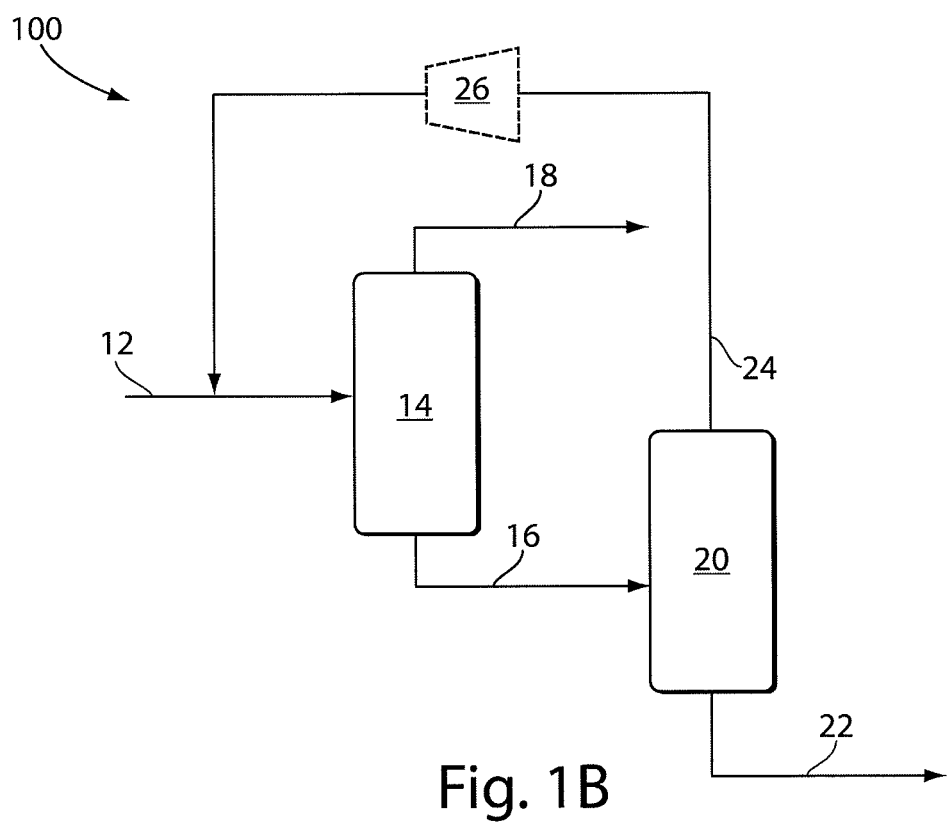

In the embodiment illustrated in FIG. 1A, fluid stream 24 is transported out of system 10. However, in some embodiments, separations may be enhanced by incorporating one or more recycle streams feeding the same or a different network of flash drums. For example, in embodiment illustrated in FIG. 1B, carbon dioxide-enriched stream 24 is recycled and combined with feed fluid stream 12, and the mixed fluid is fed to first flash drum 14. Optionally, a compressor 26 may be used to pressurize the fluid in one or more recycle streams. For example, the compressor may be used to pressurize recycled fluid to a pressure substantially equal to the pressure of the feed fluid stream. By using one or more recycle streams, the concentration of water in a water-enriched stream (e.g., stream 22 in FIG. 1B) and/or the concentration of carbon dioxide in a carbon dioxide-enriched stream (e.g., stream 18 in FIG. 1B) may be able to be made to be relatively higher, as compared to the concentrations that would be observed were the recycle stream(s) not incorporated into the system.

Figure 2A:
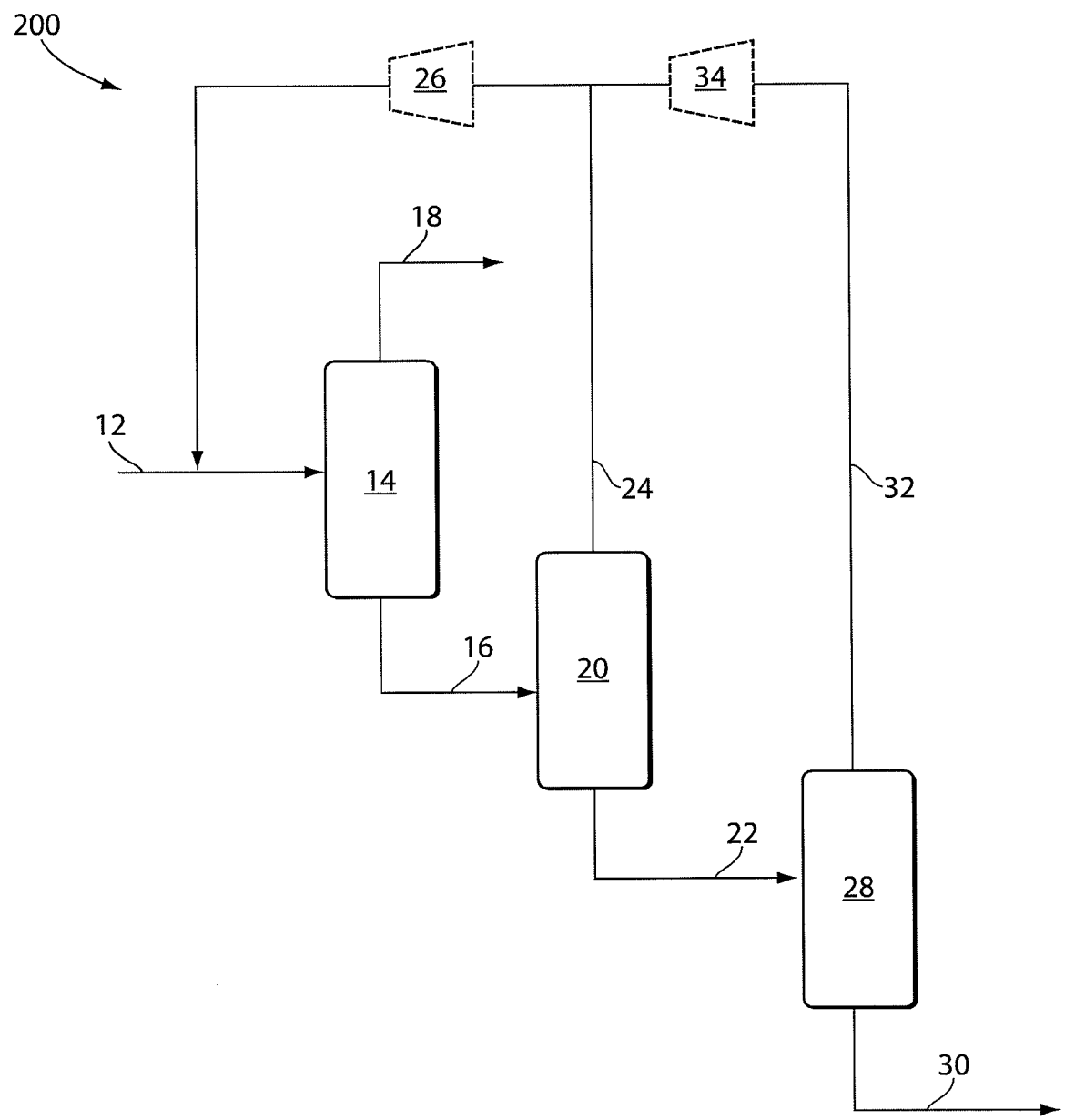
FIGS. 2A-2B show, according to one set of embodiments, schematic diagrams of separation processes.

In certain embodiments more than two flash drums are used. For example, FIG. 2A shows a schematic illustration of a three-stage flash separation system 200. In this set of embodiments, fluid stream 22 exiting the bottom of flash drum 20 and comprising carbon dioxide and water is separated within a third flash drum 28 to create a fluid stream 30 enriched in water relative to the fluid stream 22. Fluid stream 32 produced by flash drum 28 may be enriched in carbon dioxide relative to the fluid stream 22. As shown in FIG. 2A, the fluid stream 32 may be recycled back to feed fluid stream 12, although in some embodiments, fluid stream 32 may instead be transported out of system 200. Optionally, a compressor 34 may be used to pressurize the fluid in stream 32. For example, the compressor may be used to pressurize the fluid in stream 32 to a pressure substantially equal to the pressure of fluid stream 24. Alternatively, compressor 34 may be used to pressurize the fluid in stream 32 to a pressure substantially equal to the pressure of feed fluid stream 12, and streams 32 and 12 may be directly mixed.

Figure 2B:
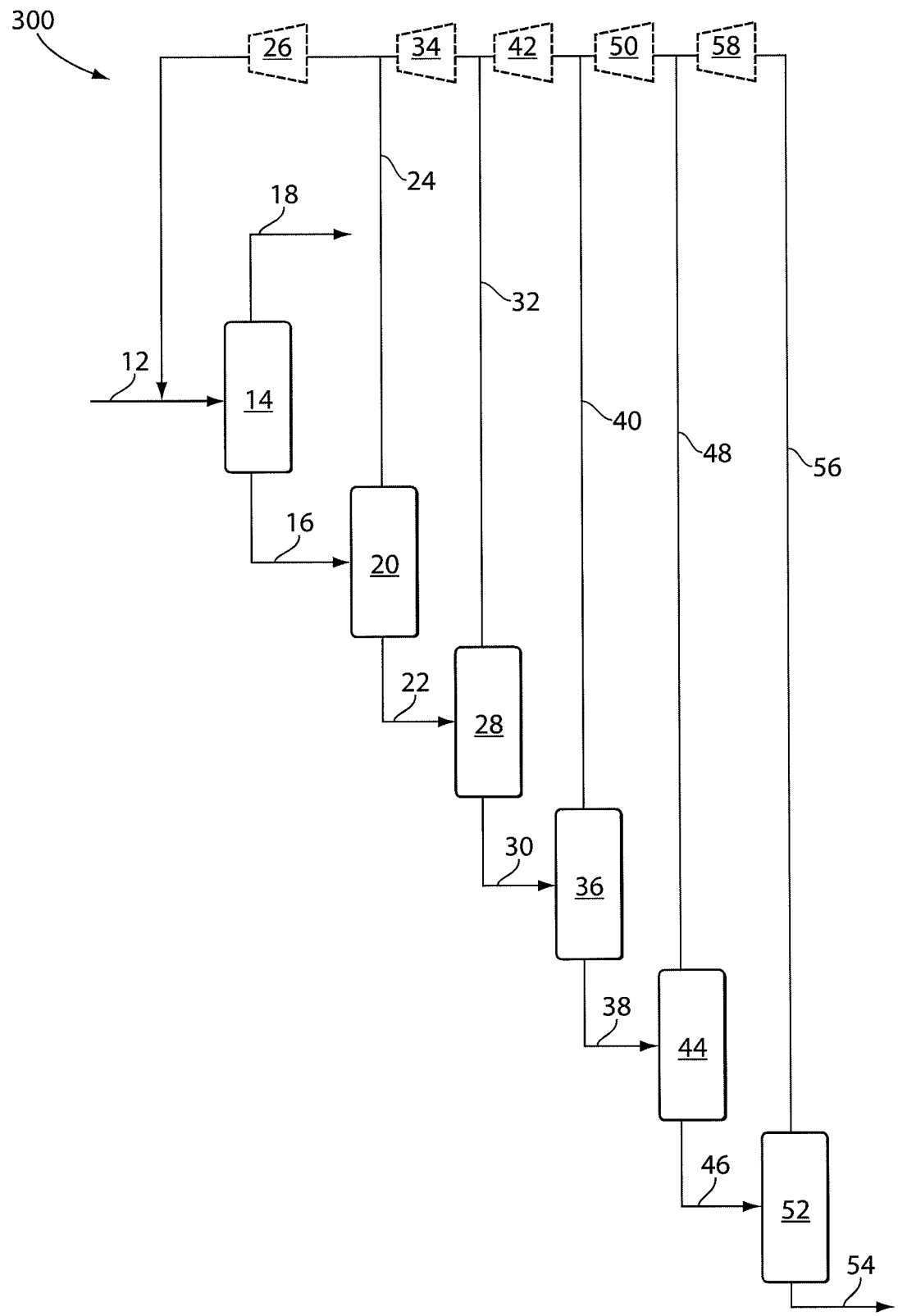

As should be appreciated, any number of additional flash drums beyond the two illustrated in FIG. 1A may be utilized to obtained a desired level of separation or purity for water and/or carbon dioxide for a given feed stream composition and set of process conditions/parameters/constraints. For example, FIG. 2B shows a schematic illustration of a six-stage flash separation system 300. In this set of embodiments, fluid stream 30 exiting flash drum 28 and comprising carbon dioxide and water is separated within a fourth flash drum 36 to create a fluid stream 38 enriched in water relative to the fluid stream 30 and a fluid stream 40 enriched in carbon dioxide relative to fluid stream 30. Similarly, fluid stream 38 comprising carbon dioxide and water may be further separated within a fifth flash drum 44 to create fluid stream 46 enriched in water relative to fluid stream 38 and fluid stream 48 enriched in carbon dioxide relative to fluid stream 38, and fluid stream 46 may be separated in flash drum 52 to create fluid stream 54 enriched in water relative to fluid stream 46 and fluid stream 56 enriched in carbon dioxide relative to fluid stream 46. Any of streams 40, 48, and 56 may be recycled back to first fluid stream 12, although in some embodiments, any of streams 40, 48, and 56 may be transported out of system 300. Optionally, compressors 42, 50, and 58 may be used to pressurize the fluid in streams 40, 48, and 56, respectively. The compressor(s) may be used to pressurize fluid to a pressure substantially equal to the pressure of another recycle stream with which it is combined. Alternatively, the compressor(s) may be used to pressurize fluid to a pressure substantially equal to the pressure of feed fluid stream 12, and the fluid in any recycle stream may be directly mixed with the fluid in feed stream 12.

The flash separation systems and methods provided herein may potentially be used with a variety of industrial and power generation systems. For example, feed fluid stream 12 may comprise or be derived from syngas in some cases. The term "syngas" is given its normal meaning in the art, and is used to refer to a mixture of primarily carbon monoxide, hydrogen, water, and carbon dioxide. In some embodiments, the feed fluid stream 12 comprises or is derived from at least a portion of a fluid product of a chemical reactor (e.g., a fuel cell, a gasifier, a pyrolyzer, a water-gas shift reactor, a combustor, a reducer, and the like).

The inventive multi-stage flash separation systems and methods may potentially be used with any system that produces one or more streams containing a mixture of carbon dioxide and water to separate/enrich water and/or carbon dioxide. In many instances, the separation systems may be advantageously integrated with one or more processes in which the carbon dioxide and water mixture is produced at or near the end of a process (e.g., in the flue gas of a power generating system). In some embodiments, the separation systems can be configured to be modular and/or portable, so that they can be interchanged among different industrial systems (i.e., disconnected from one system and connected to another system). In cases where similar carbonaceous feed stocks are used among two or more processes, the multi-stage separation techniques described herein could be interchanged among the two or more processes without substantial changes in design parameters (e.g., intermediate operating pressures, temperatures, etc.) because the ratio of carbon dioxide and water within the streams to be separated would be similar among the two or more systems.

In one particular set of applications, feed fluid stream 12 of the inventive multi-stage flash systems may comprise or be derived from a chemical looping process. Generally, chemical looping refers to processes by which oxygen is provided to a fuel source through an oxygen carrier (e.g., a metallic oxide). The energy of the fuel may be transferred to the metallic oxide by reducing the metallic oxide (e.g. to a metal). The reduced metal may be recovered and oxidized, releasing energy in the form of heat or high energy fuels such as hydrogen. The spent fuel may take the form of a gaseous mix of carbon dioxide, water, and potentially other waste gases. For carbon dioxide capture purposes, the spent fuel can be separated using the systems and methods provided herein. Chemical looping is described, for example, in Li, F., et al., "Clean coal conversion processes—progress and challenges," *Energy Environ. Sci.*, 1: 248-267 (2008), which is incorporated herein by reference in it entirety.

Figure 3A:
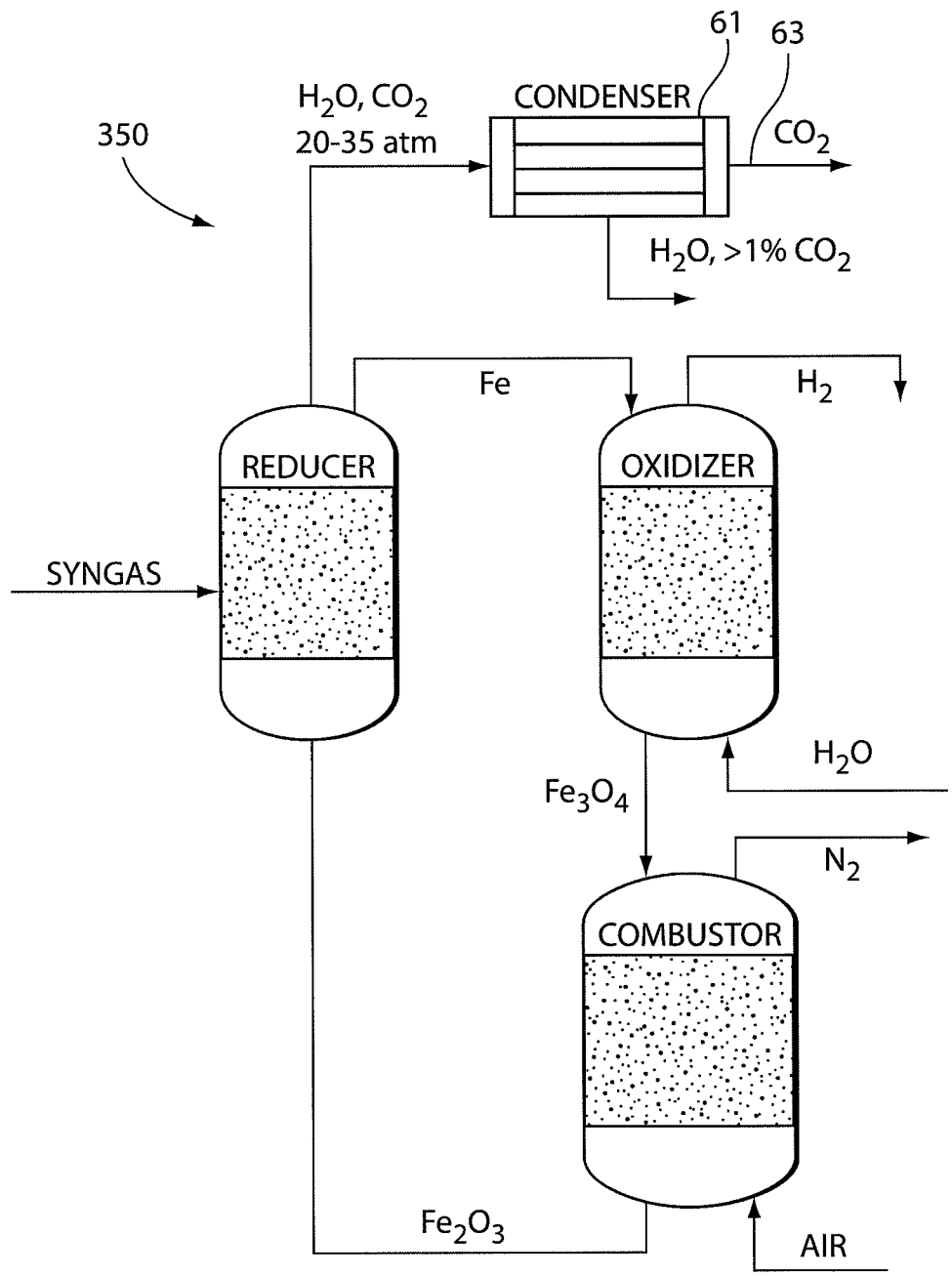
FIGS. 3A-3B are schematic illustrations of chemical looping processes, according to one set of embodiments.

In some such embodiments, the feed fluid stream 12 of the inventive multi-stage flash systems may comprise or be derived from a chemical looping process for the production of hydrogen from a syngas fuel. A schematic of an exemplary process 350 that uses iron as a carrier is shown in FIG. 3A and described in Gupta, P., et al, "Syngas redox (SGR) process to produce hydrogen from coal derived syngas," *Energy & Fuels*, 21: 2900-2908 (2007), which is incorporated herein by reference in its entirety. In this set of embodiments, syngas (e.g., from coal, biomass, wood, etc. gasification) is fed to a reducer 60 along with $Fe_2O_3$, where any or all of the following reactions may take place:

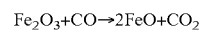
$$Fe_2O_3 + CO \rightarrow 2FeO + CO_2 \qquad [1]$$

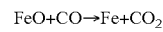
$$FeO + CO \rightarrow Fe + CO_2 \qquad [2]$$

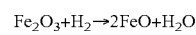
$$Fe_2O_3 + H_2 \rightarrow 2FeO + H_2O \qquad [3]$$

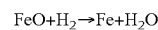
$$FeO + H_2 \rightarrow Fe + H_2O \qquad [4]$$

The gaseous wastes (e.g., $CO_2$ and $H_2O$) are readily separated from the solid Fe. The Fe is sent to an oxidizer 62 and, for example, reacted with steam as follows:

$$Fe + H_2O \rightarrow FeO + H_2 \quad [5]$$

$$3Fe + H_2O \rightarrow Fe_3O_4 + H_2 \quad [6]$$

The hydrogen gas product can be collected, separated from the excess steam, and used for power generation or other purposes. The $Fe_3O_4$ may then be reacted with $O_2$ from the air in combustor 64 to produce $Fe_2O_3$ according to:

$$4Fe_3O_4 + O_2 \rightarrow 6Fe_2O_3 \quad [7]$$

$Fe_2O_3$ may be regenerated and recycled to the reducer 60, completing the iron loop.

The reducer described in Gupta typically operates in the range of 20 to 35 bar. In addition, the $CO_2$ and $H_2O$ waste stream 66 collected at this pressure may be separated with a single condenser 68. The $CO_2$ may be sequestered, and the water may be treated for recycle. However, at pressures of 20 to 35 bar, the resulting water stream would contain at least 1% $CO_2$.

Figure 3B:
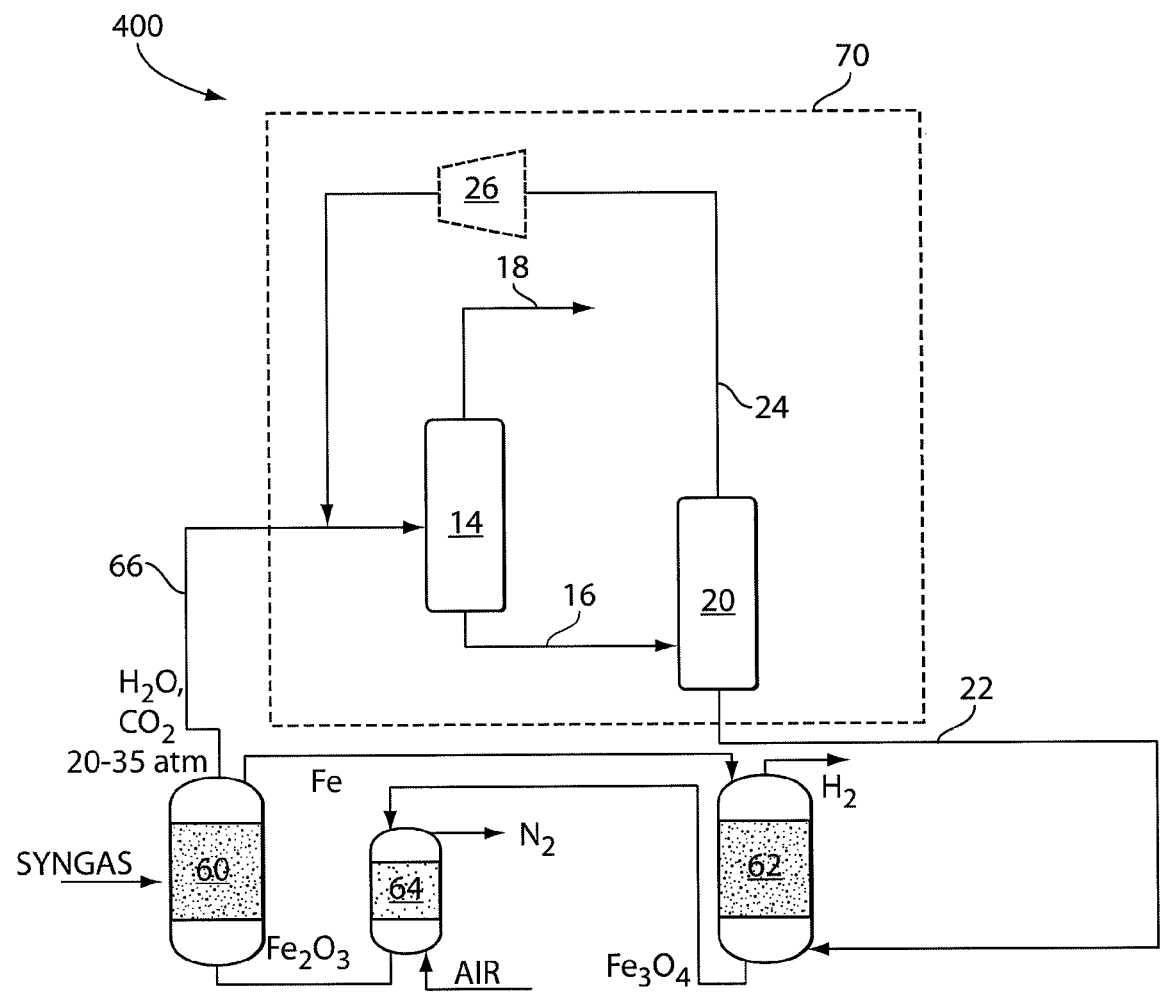

FIG. 3B illustrates an inventive system 400 employing the Gupta process and to which a multi-stage flash separation system 70 provided according to the present invention has been added. System 70 may be configured using the teaching of the present disclosure such that it could be used to reduce the amount of carbon dioxide in stream 66 to less than about 0.01%, enabling nearly 100% carbon capture to be achieved. In addition, high purity water produced by system 70 could then be used as the water source in the oxidizer. A traditional single-stage condenser as used in FIG. 3A, on the other hand, will lead to $CO_2$ contamination in the $H_2$ product stream. This would yield a lower quality (and lower value) $H_2$ product, and ultimately cause more $CO_2$ emissions to the atmosphere downstream.

While relatively high purity water could be produced with the single condenser 61 of system 350 in FIG. 3A operating at 1 bar, reducing the pressure in line 63 to this level would be accompanied by a significant energy penalty as the $CO_2$ stream would need to be pressurized in order to transport it efficiently. For example, pipeline conditions may require, in some cases, a pressure of at least about 150 bar, and pressurizing from the a low pressure of 1 bar would require roughly 33% more energy than pressurizing from within the 20-35 bar range of enriched carbon dioxide able to be produced with multi-stage flash system 70.

Figure 4:
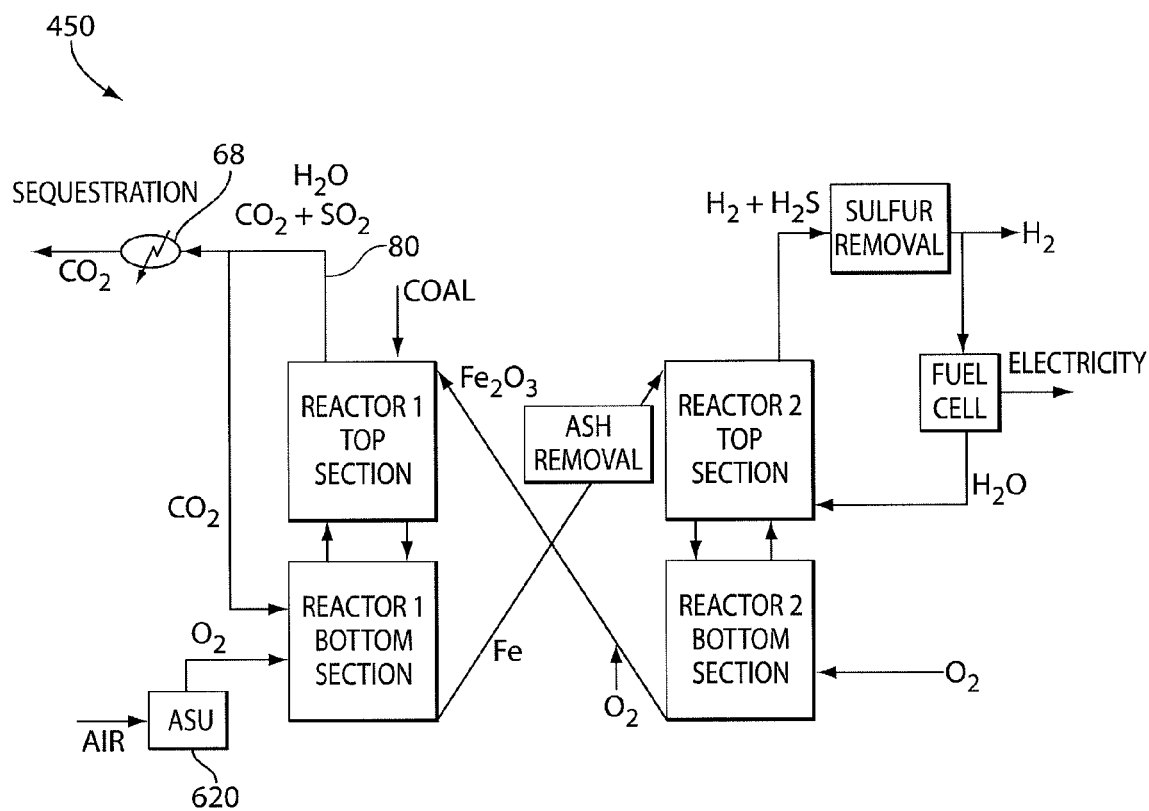
FIG. 4 shows, according to one set of embodiments, a schematic illustration of a chemical looping process for the production of hydrogen directly from gasified coal.

In other embodiments, the feed fluid stream 12 of the inventive multi-stage flash systems may comprise or be derived from a chemical looping process for the production of hydrogen from direct coal gasification. A schematic of an exemplary process 450 that produces hydrogen directly from gasified coal is illustrated in FIG. 4, which is disclosed in U.S. Patent Application 2005/0175533 to Thomas et al, entitled "Combustion looping using composition oxygen carriers," incorporated herein by reference in its entirety. The Thomas process is similar to the Gupta process, with the important difference that coal is gasified directly in a reducing reactor. The Thomas process requires a coal feedstock, but eliminates the need for a gasifier. In the Thomas process, coal is reacted directly with oxidized iron and some additional oxygen in the top section of Reactor 1, producing $CO_2$, $H_2O$, and some volatile impurities such as $SO_2$. Unreacted or partially reacted coal (e.g., char/ash) is further reacted with partially reduced iron with the aid of additional $O_2$ and recycled $CO_2$ in the bottom section of Reactor 1, releasing more $CO_2$ and $H_2O$. A mixture of reduced iron and ash remains, which is separated by an appropriate technique in the Ash Removal stage. The recovered iron is then oxidized in the top section of Reactor 2 by contact with steam, producing $H_2$ and impurities such as $H_2S$. Partially oxidized iron is oxidized further by reaction with $O_2$ in the bottom of Reactor 2. The $H_2$ product, after sulfur removal can be used for various purposes, such as in a fuel cell.

Several variants of the Thomas process produce a water/carbon dioxide waste stream 80 from the reducer in the range of 1-30 bar. In the Thomas process, a single condenser 68 is used to achieve separation of water and carbon dioxide. For reducer operating pressures sufficiently above 1 bar (e.g., at or above about 5 bar), the single-stage condenser could be replaced with the systems and methods described herein (i.e. system 70 as shown in FIG. 3B). By directly gasifying coal in the reducer, sulfur and other impurities will be present in the waste stream 80 comprising water and carbon dioxide. The gaseous pollutants ($SO_2$, etc.) can be sequestered along with the $CO_2$, and the water soluble wastes (e.g., $H_2S$, Hg) can be sent to appropriate treatment apparatuses. Thus, by incorporating a multi-stage flash separation process according to the invention, one could ensure that the aqueous waste stream does not contain volatile wastes such as $SO_2$, which could potentially have a negative impact on downstream wastewater treatment.

Figure 5:
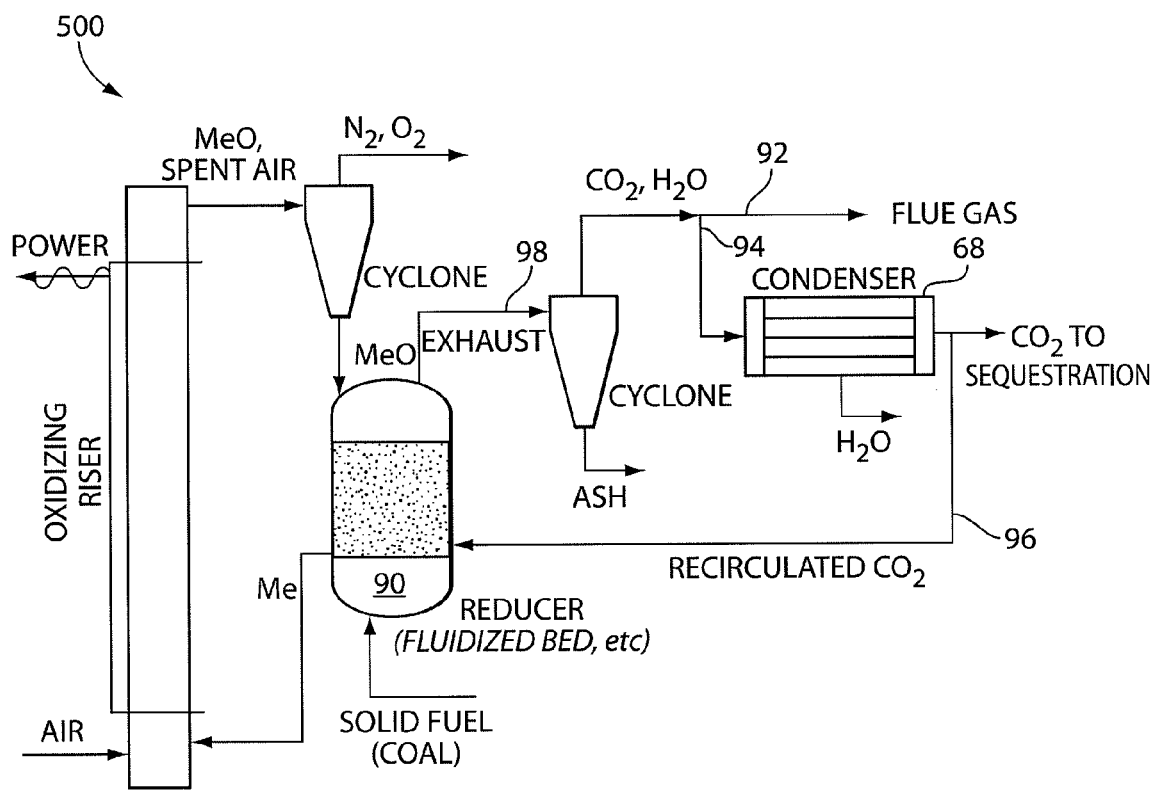
FIG. 5 is a schematic illustration of a chemical looping process for the production of electricity directly from gasified coal, according to one set of embodiments.

In other embodiments, the feed fluid stream 12 of the inventive multi-stage flash systems may comprise or be derived from a chemical looping process for the production of electricity from direct coal gasification. A schematic of an exemplary process 500 that produces electricity directly from gasified coal is illustrated in FIG. 5 and described in Cao, Y., et al., "Investigation of chemical looping combustion by solid fuels. 1. Process Analytics," *Energy & Fuels*, 20: 1836-1844 (2006), which is incorporated herein by reference in its entirety. Similar to the Thomas process, the Cao process also uses direct coal gasification, but electricity is produced without the generation of hydrogen gas. The reducer 90 operates at medium to high pressure, and can be powered by alternative metal carriers such as Cu, Co, Ni, and Mn. Cao's process sends a portion of the waste carbon dioxide and water-gas in line 92 to the flue, venting to the atmosphere. Another portion 94 is separated through a single condenser 68. A portion of the recovered carbon dioxide is recycled via line 96 to the reducer 90 to facilitate bubbling or fluidization in the reactor. This creates a higher ratio of carbon dioxide to water in the reducer waste stream 98 than would be seen in the Gupta or Thomas processes. However, the multi-stage systems and methods described herein (e.g. system 70) may still be advantageously applied, replacing the existing single condenser 68 used for separation of water and carbon dioxide and/or for treating fluid presently exhausted in line 92. The increased percentage of carbon dioxide in lines 92/94 compared to what is produced by the Gupta and Thomas processed should not significantly impact the operation of the inventive multi-stage flash separation system 70, as the separation is based on equilibrium conditions, rather than feed concentrations.

In some embodiments, the feed fluid stream 12 of the inventive multi-stage flash systems comprises or is derived from at least a portion of a fluid product of a fuel cell (e.g., a solid oxide fuel cell (SOFC), a polymer electrolyte membrane fuel cell, or a molten carbonate fuel cell). For example, the feed fluid stream may comprise or be derived from a fuel cell anode exhaust stream comprising carbon dioxide and water.

Figure 6:
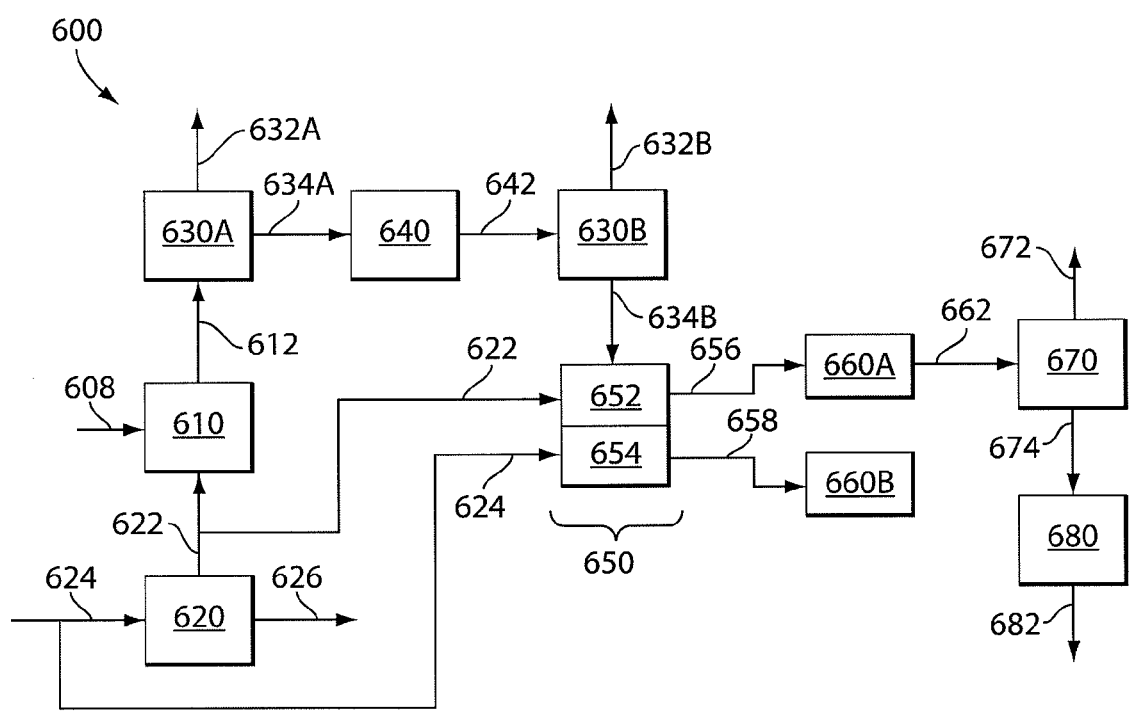
FIG. 6 is a schematic illustration of a power production process using a fuel cell, according to one set of embodiments.

FIG. 6 is a schematic block diagram of a system 600 according to one set of embodiments in which the inventive carbon dioxide-water separation systems are integrated into a process system 600 in which a fuel cell is employed. In the set of embodiments shown in FIG. 6, a fuel cell is used to produce power from syngas. The syngas may be produced from a carbonaceous fuel (e.g., coal, natural gas, petroleum products, biomass, etc.). To produce the syngas, the carbonaceous fuel in stream 608 may be converted to syngas in optional fuel reactor 610. The syngas composition produced by the fuel reformer may depend upon the type of carbonaceous fuel used and/or the operating conditions of the reactor(s). In some cases, it may be desirable to maximize the amount of fuel and/or oxygen in the reactor. In certain embodiments, the fuel is reacted in the presence of no more than about 6 wt % nitrogen or argon to produce syngas. This may be accomplished, for example, by reacting the fuel using a stream containing at least about 94 wt % oxygen.

In some embodiments (e.g., when coal and/or biomass is used as a fuel), reactor 610 comprises a gasifier. The gasifier may produce high pressure syngas in stream 612 comprising $H_2$, $H_2O$, $CO$, $CO_2$, $COS$, $H_2S$, $HCl$, and/or other compounds. Several commercially available technologies can be used for designing gasifiers, and each will produce syngas with different compositional profiles and at different temperatures and pressures. As an example, a General Electric Radiant-Only Gasifier, which operates at pressures of up to 56 bar and temperatures above 1300° C. may be used. Using this gasifier, coal is fed in slurry form by mixing milled coal with water (e.g., recycled process water). The gasifier may be equipped with a cooling mechanism, where radiant heat is recovered as steam for power in other units of the system (e.g., a heat recovery and steam generation (HRSG) unit, described in more detail below). In some embodiments, a slurry of slag (e.g., mostly ash) may be collected through a solids-recovery mechanism, leaving a syngas stream essentially free of solids.

The fuel reactor 610 may comprise a reformer in some cases (e.g., when natural gas or another gaseous hydrocarbon is used as the fuel). For example, in some cases, a fuel reformer may be used to perform steam reforming. Steam reforming may proceed according to the following reaction:

$$C_nH_m + nH_2O \leftrightarrow nCO + (0.5\,m+n)H_2 \qquad [8]$$

Generally, steam reforming is endothermic, and is performed at high temperatures (e.g., above 700° C.). Steam reforming may be performed in a variety of reactor types (e.g., a fixed bed catalytic reactor, a fluidized-bed reactor, a membrane reactor, etc) using catalysts that comprise a variety of materials (e.g., nickel, magnesium, ruthenium, rhodium, etc.)

In some embodiments, purified oxygen may be used at various points within the system. An optional air separation unit (ASU) 620 may be used to produce purified oxygen in stream 622 from stream 624. In some embodiments, stream 624 may comprise oxygen and nitrogen from the ambient air, which are separated to produce the purified oxygen in stream 622 and nitrogen in stream 626. In certain cases, in addition to providing high pressure oxygen to reactor 610, the ASU 620 may be used to provide, for example, medium pressure oxygen to a downstream sulfur recovery unit (not shown), medium pressure oxygen or air to the fuel cell 650 and/or a downstream gas turbine (not shown), and/or medium pressure oxygen for oxidation of unreacted hydrogen from the fuel cell. Examples of existing technologies that can be used for air separation include, for example, cryogenic separation units and/or ionic transport membrane separation units.

In certain embodiments the syngas is purified to remove at least one impurity prior to feeding it to the fuel cell 650. The purifying step may be performed, for example, to prevent poisoning of the catalysts and other materials within the fuel cell and maximize its usable life. For example, depending upon the input conditions, a solid oxide fuel cell (SOFC) at high temperature (e.g., about 900° C. or greater) may tolerate only up to about 100 ppm of $H_2S$ before an irreversible voltage drop occurs. At lower concentrations, long term cell decay may not be significant, but a stable voltage drop of 0.1V-0.2V can still occur, reducing the cell efficiency by about 10-20%. Hydrogen chloride has also been shown to reversibly degrade SOFC performance at concentrations as low as 20 ppm.

FIG. 6 includes two syngas purification units 630A and 630B which transfer impurities to streams 632A and 632B, respectively, to produce purified syngas streams 634A and 634B, respectively. In certain embodiments, only one of these purification units is used. Examples of impurities that may be removed include, but are not limited to, HCl, Hg, COS and $H_2S$, among others. In some embodiments, at least about 98 wt % of the purified syngas stream consists essentially of water, carbon dioxide, carbon monoxide, hydrogen, or $H_2S$.

Several technologies may be used to achieve HCl removal. In some embodiments, recycled water from an upstream process can be used as a solvent in a scrubber, collecting HCl in the liquid bottoms and passing syngas through the top. Similar scrubbing technologies have been used in other applications such as integrated gasification combined cycle (IGCC) systems. In some embodiments, scrubbing is preferred when removing HCl before enriching the syngas in carbon dioxide and hydrogen (e.g., using the water-gas shift, described below).

Sulfur-containing compounds can also be removed using a variety of technologies. In some embodiments, solvents (e.g., Rectisol, Flexsorb, methyldiethan-olamine, Selexol, etc.) can be used in absorption-based processes to dissolve and remove $H_2S$. One alternative to an absorption based process is the Sulfur-Rite process by Merichem Co. In this process, the $H_2S$ in a sour gas stream reacts with a proprietary material to produce water and $FeS_2$ (iron pyrite). The $FeS_2$ is non-hazardous and can be land-filled. This process can operate at low pressures for a variety of sour gas feeds, and is particularly well-suited for systems where simultaneous $CO_2$ removal is not necessary, such as when using the separation technology provided according to the present invention. Sulfur-containing compounds may be removed from the process in a liquid slurry, in some embodiments. Depending on the process used, high purity water may also be recovered, which can be recycled to the fuel reactor 610 (e.g., for use in gasification, steam reforming, etc.).

An advantageous inventive feature of certain embodiments of the invention is the provision of a water-gas shift (WGS) reactor as part of an industrial scale syngas production/fuel cell power generation process. Before entering the fuel cell 650, the syngas may also be enriched in carbon dioxide and hydrogen via subjecting it to a water-gas shift reaction. System 600 of FIG. 6 includes a water-gas shift reactor 640 which may be used to produce enriched syngas in stream 642. The water-gas shift occurs according to the following reaction:

$$CO + H_2O \leftrightarrow CO_2 + H_2 \qquad [9]$$

In addition, the following reaction may also occur in the water-gas shift reactor:

$$COS + H_2O \leftrightarrow CO_2 + H_2S \qquad [10]$$

The water-gas shift reaction may be used to reduce the amount of CO and $H_2O$ in the syngas stream and increase the amount of $H_2$ and $CO_2$. In some cases, the water-gas shift exhaust stream contains less than about 1.5 wt %, less than about 1 wt %, less than about 0.1 wt %, or less carbon monoxide. In some instances, the weight ratio of carbon dioxide to carbon monoxide in the water-gas shift exhaust stream is at least about 30:1, at least about 50:1, or at least about 150:1. The presence of CO in the fuel may have a negative effect on the performance of fuel cells in some cases, potentially causing both power loss and cell degradation. This may lead to a reduced usable lifetime and reduction in cell voltage and electrical efficiency. In some embodiments (as illustrated), the water-gas shift of the syngas may be performed upstream of the fuel cell, potentially leading to improved performance and a longer fuel cell lifetime. It may be desirable, in some cases, to perform the water-gas shift enrichment such that high conversion to $H_2$, $CO_2$, and, in certain cases, $H_2S$ are achieved, thus minimizing the amount of CO in the feed to the fuel cell. The water used in the WGS step may, in some embodiments, comprise or be derived from at least a portion of a fluid product of another process unit (e.g., one or more flash drums of an inventive multi-stage flash carbon dioxide-water separation system).

The WGS reaction step can be performed using a variety of reactor types and catalysts, the selection of which will depend upon on the process conditions. For example, at low temperatures (200-250° C.), the equilibrium conditions favor a high extent of conversion, but very slow kinetics. At high temperatures (300-450° C.), the forward reactions are fast but high conversions may be limited by equilibrium. Moreover, different catalysts may be required to perform within different ranges of temperatures, e.g. due to sintering concerns. Iron-based catalysts may be used in some embodiments (e.g., in high temperature applications). Copper or aluminum-based catalysts may also be used, for example, at low temperatures. Precious metal catalysts, while more expensive, may permit smaller reactor volumes than traditional catalysts. Zeolite catalysts may also be used in some cases, and may be active at lower temperatures (e.g., 100-300° C.). The WGS reactor may comprise, for example, a plug-flow, a membrane reactor, or any other suitable reactor. One of ordinary skill in the art would be able to select an appropriate reactor for use as a water-gas shift reactor. For example, techniques for designing packed-bed WGS reactors are described in Moe, J. M., "Design of water-gas shift reactors," *Chemical Engineering Progress,* 58:3:33-36 (1962).

In some embodiments, the WGS step may be performed in more than one reactor. Optionally, the effluent stream from a first WGS reactor may be, in some embodiments, expanded and/or cooled before being fed to a second WGS reactor (not shown). In some embodiments, the expansion may be performed using an expansion turbine to generate electricity. The use of the turbine may be preferred, for example, when a sulfur removal takes place before the WGS step is performed, or when the units between the WGS reactor and the fuel cell are operated at lower pressures than the pressure in the fuel reactor (e.g. gasifier).

In some embodiments, the WGS may occur within a fuel cell, separate from fuel cell 650, rather than or in addition to in a stand-alone WGS reactor. For example, syngas could be fed to the anode of a fuel cell, and steam could be fed to the cathode. $O^{2-}$ ions could dissociate from the $H_2O$ in the cathode and move through the electrolyte to the anode side. This may produce a high concentration of $H_2$ on the cathode side. In the anode, the $O^{2-}$ ions could react with the CO in the syngas, forming $CO_2$. Some $O^{2-}$ could react with $H_2$ in the syngas as well, forming $H_2O$. In some embodiments, an overall net increase in $H_2$ would result. In some such embodiments, the anode and cathode outlet streams could be combined, reducing the importance of a high temperature seal and possibly permitting high pressure operation (e.g., 55 bar and above). Assuming an ideal solid oxide fuel cell and complete conversion, the fuel cell could produce enough electricity to increase the plant efficiency by at least about 4.5 percent using such a configuration.

It should be understood that the syngas purification steps (in unit 630A and/or 630B) and WGS steps (in unit 640) may be performed in any order. For example, in some embodiments a purification step may be performed before or after a WGS step. In some embodiments, a purification step may be performed both before and after a WGS step (e.g., HCl removal—630A—before a WGS and $H_2S$ and/or Hg removal—630B—after a WGS, etc.), as illustrated in FIG. 6. For example, in a sweet-gas shift reaction, sulfur-containing compounds (COS, $H_2S$, etc) are removed before the WGS reactor(s). In some cases it may be desirable to remove sulfur-containing compounds after the WGS unit(s) (i.e., a sour gas shift), which may involve the use of a sulfur tolerant catalyst in the WGS reactor.

Referring again to FIG. 6, the purified, WGS treated syngas is then reacted within fuel cell 650 to produce electrical power and a fuel cell anode exhaust stream 656. In the set of embodiments illustrated in FIG. 6, syngas 634B is fed to anode side 652 of fuel cell 650, and oxygen 624 (e.g., air, purified oxygen, etc.) is fed to the cathode side 654. In a solid oxide fuel cell, the following electrochemical oxidation reactions are expected to occur:

$$2H_2+O_2 \rightarrow 2H_2O+\text{Power} \qquad [11]$$

$$2CO+O_2 \rightarrow 2CO_2+\text{Power} \qquad [12]$$

In some embodiments, it may be advantageous to maintain separation of the anode and cathode gases exiting the fuel cell. For example, substantial amounts of gases such as nitrogen, argon, etc. that may be present on the cathode side may make it difficult to recover high purity carbon dioxide from the fuel cell anode exhaust stream.

In some cases, it may be preferable to operate the fuel cell at an elevated pressure (e.g., at least about 2 bar, at least about 5 bar, at least about 10 bar, at least about 20 bar, at least about 30 bar, or higher). Elevated pressure operation in the fuel cell may increase the efficiency of the fuel cell. In addition, the overall efficiency of the system may be improved with high pressure operation as the amount of work required to compress the carbon dioxide for purification and optional sequestration would be reduced. With a properly designed fuel cell, the fuel cell could be operated, in some embodiments, at essentially the same pressure as the fuel reactor 610. To achieve this, however, very good control must be maintained over the cathode and anode pressures, such that a sudden pressure drop would not occur.

In addition, it may be advantageous to maintain essentially equal pressure on the anode and cathode sides of the fuel cell. This may help to prevent blowout or damage to the electrolyte that separates the anode and the cathode. The pressures on either side of the fuel cell electrolyte may be maintained, for example, by compressing the cathode gas (e.g., air or pure oxygen) to the operating pressure of the fuel cell.

Typically, solid oxide fuel cells operate in the 800° C.-1000° C. range. Due to certain inefficiencies, some of the energy of oxidation may be given off as heat instead of electricity, raising the temperature of the anode and cathode gases. To avoid overheating, several techniques may be applied. For example, an integrated cooling system may be used to generate steam. In addition, steam may be generated via heat exchange with other parts of the process.

While a single fuel cell has been described above and illustrated in FIG. 6, it should be understood that more than one fuel cell (e.g., a stack of fuel cells) may be used in the systems and methods described herein. Fuel cell stacks may be arranged in a variety of configurations to achieve a desired output voltage and current. In some embodiments, the number of fuel cells and/or the flow rate of the syngas may be selected to achieve the desired power output. For example, the one or more fuel cells may be used to produce at least 1 megawatt, at least 10 megawatts, or at least 100 megawatts of power in certain system configurations.

It is generally desirable for the systems described herein to include a large enough number of fuel cells such that a high percentage of the available syngas is consumed, thus maximizing efficiency. However, if the fuel cell stacks are not able to achieve satisfactory syngas conversion, an additional oxidation unit may be placed downstream of the SOFC unit anode, such that any residual hydrogen is oxidized to produce additional heat, which may be used in other parts of the system (e.g., a downstream heat recovery unit). Alternatively, a gas combustion turbine may be used, in some embodiments, to produce additional electricity if temperatures are sufficiently low and $H_2$ concentrations are sufficiently high to permit combustion. By converting essentially all of the hydrogen fed to the fuel cell, essentially only water and $CO_2$ remain in the anode exhaust stream. Fuel cells generally create direct current (DC) power. In embodiments in which alternating current is desired, a DC→AC inverter can be used.

In some cases, excess heat (e.g., excess heat given off by the fuel reactor 610, steam generated from intermediate cooling of the WGS reactors, heat from the fuel cell 650, etc.) may be recovered and used to generate steam. In some embodiments, one or more optional heat recovery and steam generation (HRSG) units 660A and 660B may be used to, for example, generate steam for additional turbine power from one or more exhaust streams from the fuel cell. Generally, the process for generating electricity from excess heat may comprise: heating liquid water at high pressure to produce steam (e.g., via a network of heat exchangers interacting with the other parts of the plant); expanding the steam (e.g., through a multistage turbine) to low pressure to produce electricity; and condensing the expanded steam to a liquid.

The cooling load for the condenser in the HRSG can be provided through a variety of traditional methods including, but not limited to, once-through cooling (e.g., drawing a steady supply of water from a large reservoir), cooling towers, or air-cooled heat exchangers. Once-through cooling and air-cooled exchangers involve negligible water consumption.

The maximum temperature and pressure of the steam passed through the HRSG is usually limited by the specifications of the particular multistage turbine in use. The pressure drop through the HRSG is typically small, and the cathode exhaust stream is vented to the atmosphere after cooling and expansion. In FIG. 6, HRSG unit 660A may be used to recover heat from anode exhaust stream 656, while HRSG 660B may be used to recover heat from cathode exhaust stream 658. Such a configuration may be useful when maximum heat recovery is desired, but mixing of the anode and cathode exhaust streams is undesirable.

FIG. 6 also includes a carbon dioxide-water separator system 670 configured to produce a stream relatively enriched in water 672 from a feed stream 662 comprising or derived from at least a portion of a fluid product of the fuel cell. As shown in FIG. 6, the fuel cell anode exhaust stream 656 is fed to a HRSG unit 660A prior to being separated to produce a stream 672 relatively enriched in water. However, in other embodiments a HRSG is not used, and the fuel cell anode exhaust stream 656 is directly separated using separator 670. In some embodiments, the feed stream 662 to the separator 670 comprises mostly water vapor and $CO_2$, with a small amount of atmospheric inerts ($N_2$, Ar, etc.) and trace amounts of other gases.

Separating the carbon dioxide and water downstream of the fuel cell provides several potential advantages. First, flash separation of $CO_2$ from the syngas feed upstream of the fuel cell may be less efficient or effective at achieving high purities, because the syngas feed typically comprises more non-water/carbon dioxide contaminating species. Multi-component separation of carbon dioxide can be difficult to achieve, often requiring expensive and potentially toxic solvents or specialized process equipment such as membranes. On the other hand, the anode exhaust stream 656 may comprise a relatively higher fraction of carbon dioxide and water, allowing for a more advantageous separation of the carbon dioxide via the inventive multi-stage flash separation techniques, for example. In addition, upstream separation usually requires venting of at least a portion of the carbon dioxide to the atmosphere, which may be economically and/or environmentally undesirable. Downstream separation, on the other hand, can result in the capture of essentially all of the carbon dioxide produced by the overall process. Moreover, downstream separation of carbon dioxide can allow for higher process efficiency in certain cases. Upstream separation methods may require, for example, depressurizing the feed stream before separating. After the separation, the syngas may need to be recompressed for feeding it into the fuel cell, and the separated carbon dioxide must be recompressed for cost-effective transport and/or storage. Furthermore, upstream solvent-based methods to recover $CO_2$, such as those using Selexol, can require a significant amount of capital for the large separation towers necessary. For example, about ten times as much Selexol is required for $CO_2$ absorption as it is for $H_2S$ absorption. For IGCC, the $CO_2$ absorption section alone contributes 10% to the capital cost of the plant. On the other hand, downstream separation, which avoids solvent based absorption, uses much less expensive equipment and reduces solvent use (e.g., by about 90% for IGCC).

Any of the inventive carbon dioxide and water separation systems and methods described herein may potentially be adapted and used to separate the fuel cell anode exhaust stream to produce a separator stream(s) relatively enriched in water and/or carbon dioxide. In some embodiments, the multi-stage flash separation techniques described herein may be used; however, in other embodiments, certain advantages of carbon dioxide-water separation downstream, as opposed to only upstream of the fuel cell may be realized even using conventional carbon dioxide-water separation technology. High purity water produced by the separation step can be recycled upstream (e.g., to the fuel reactor 610 for use as sump water, in making slurries for coal solids, to WGS reactor 640, etc.).

The separating unit 670 may also produce a second stream 674 relatively enriched in carbon dioxide. Stream 674 may be cooled, compressed (e.g., via multi-stage compression), and/or condensed in unit 680 to achieve a purified carbon dioxide stream 682 at a desired temperature and pressure. In some embodiments, the carbon-dioxide enriched separator stream 682 may be compressed at ambient temperature. In some cases, the carbon dioxide enriched stream may be sequestered. Depending on the purity requirements for sequestration, further separation of $CO_2$ in stream 682 from residual impurities such as $O_2$, $N_2$ and Ar may be desirable.

The systems 600 described herein may be operated at a relatively high efficiency, in some embodiments. The efficiency of the overall system is measured as the amount of energy recovered from the system as electricity (e.g., from the fuel cell, from heat recovery systems, etc.) divided by the total amount of energy input to the system (e.g., higher heating value of the fuel, work input to the system, etc.), multiplied by 100%. For example, in some cases, the overall system efficiency of system 600 may be at least about 40%, at least about 50%, at least about 60%, at least about 70%, at least about 75%, or higher. In some embodiments, the overall efficiency of the system may depend upon the fuel and syngas production technology used in the process. For example, in some cases the overall system efficiency may be at least about 60%, at least about 70%, or at least about 75% when natural gas and steam reforming is used, while in other cases, the overall system efficiency may be at least about 40%, at least about 50%, or higher when coal or biomass and gasification is used.

Another advantage of the embodiments described by system 600 herein is that water is produced rather than consumed. In these systems, water exits the fuel cell in a recoverable form, which can be recycled to the process, minimizing the need to consume fresh water. Moreover, a portion of the water recovered from the system may be sufficiently pure to be used for applications outside the system. For example, the exemplary system outlined in FIG. 9 and discussed in Example 3 below, produces roughly 1 billion L/yr of water (based on a 750 MW plant) when once-through cooling or air-cooled exchangers are used. An IGCC plant of the same scale, on the other hand, consumes about 1.6 billion L/yr of water, and a traditional coal plant consumes as much as 10.8 billion L/yr. When cooling towers are used, the system of FIG. 9 consumes about 5.3 billion L/yr of water, much less than that for an equivalent IGCC plant (about 7.6 billion L/yr).

The following examples are intended to illustrate certain embodiments of the present invention, but do not exemplify the full scope of the invention.

EXAMPLE 1

This example describes a process simulation of a two-stage flash separation of carbon dioxide and water. The feed stream compositions and conditions listed in all examples herein were calculated using Aspen Plus 2006.5. All simulations described herein used the Peng-Robinson equation of state with the Boston-Mathias modification on all process units, except: Redlich-Kwong-Soave EOS with predictive Holderbaum mixing rules for streams primarily containing $CO_2$ and $H_2O$ well below the critical point of $CO_2$; NBC/NRC steam tables were used for pure water streams; and the electrolyte-NRTL model with Henry coefficients and electrolyte chemistry specifications obtained from the AP065 databank for $CO_2/H_2O$ rich streams near the critical pressure of $CO_2$. All compressors and turbines were assumed to have an isentropic efficiency of 0.72, a mechanical efficiency of 1, and a maximum pressure ratio of 5.0. All pump efficiencies were calculated according to the software's default method, which generally computed efficiencies to be in the range of 0.68 to 0.85. All built-in process models and physical-property models in Aspen Plus used default parameters except where specified herein.

Figure 7:
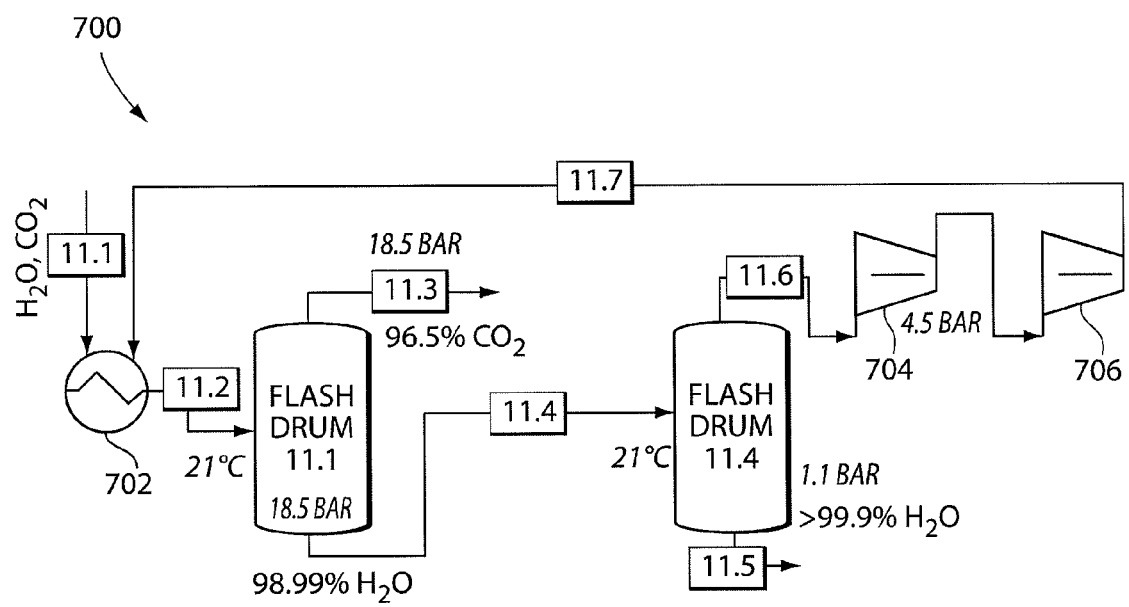
FIG. 7 is a schematic illustration of one set of embodiments employing a two-stage flash carbon dioxide-water separation system.

FIG. 7 is a schematic diagram of the two-stage flash system 700. The stream compositions and conditions in FIG. 7 are outlined in Table 1 below.

TABLE 1

Stream compositions and conditions for the two-stage flash separation system in FIG. 7

| | | Stream | | | | | | |
|---|---|---|---|---|---|---|---|---|
| | | 11.1 | 11.2 | 11.3 | 11.4 | 11.5 | 11.6 | 11.7 |
| T (° C.) | | 105 | 21 | 21 | 21 | 19 | 19 | 289 |
| P (bar) | | 18.6 | 18.5 | 18.4 | 18.4 | 1.1 | 1.1 | 18.5 |
| F (kmol/h) | | 28119 | 28273 | 12218 | 16054 | 15901 | 154 | 154 |
| Vapor Frac. | | 0.47 | 0.43 | 1.00 | 0.00 | 0.00 | 1.00 | 1.00 |
| Mole Fractions | H2O | 56.58% | 56.29% | 0.17% | 98.99% | 99.93% | 2.02% | 2.02% |
| | N2 | 0.76% | 0.75% | 1.75% | 3 ppm | 2 ppb | 285 ppm | 285 ppm |
| | Ar | 0.69% | 0.68% | 1.58% | 7 ppm | 16 ppb | 685 ppm | 685 ppm |
| | CO | 692 ppb | 688 ppb | 2 ppm | | | 57 ppb | 57 ppb |
| | CO2 | 41.97% | 42.27% | 96.49% | 1.01% | 679 ppm | 97.87% | 97.87% |

In this example, a stream (11.1 in FIG. 7) containing 56.6% water and 42.0% $CO_2$ at 18.6 bar and 105° C. is fed to a condenser 702. All pressures in the examples herein are provided as absolute pressures. In addition, a downstream recycle stream (11.7) containing 2.02% water and 97.87% $CO_2$ at 18.5 bar and 289° C. is fed to the condenser. The condenser is used to cool the combined stream to 21° C. (at a pressure of 18.5 bar). The mixed stream (11.2) is separated within a first flash drum (Flash Drum 11.1) to produce a vapor stream (11.3) containing 96.49% $CO_2$. The carbon dioxide in this stream can be compressed and sequestered. In addition, the first flash drum produces a liquid stream containing 98.99% water.

Liquid stream (11.4) is separated within a second flash drum (Flash Drum 11.4) to produce a vapor stream (11.6) containing 97.87% $CO_2$. In the system illustrated in FIG. 7, the vapor stream is compressed, using two compressors 704 and 706, to a pressure of 18.5 bar and recycled to the beginning of the system as stream 11.7. The second flash drum also produces a liquid stream 11.5 containing 99.93% water. The high purity water stream is removed from the system.

EXAMPLE 2

Figure 8:
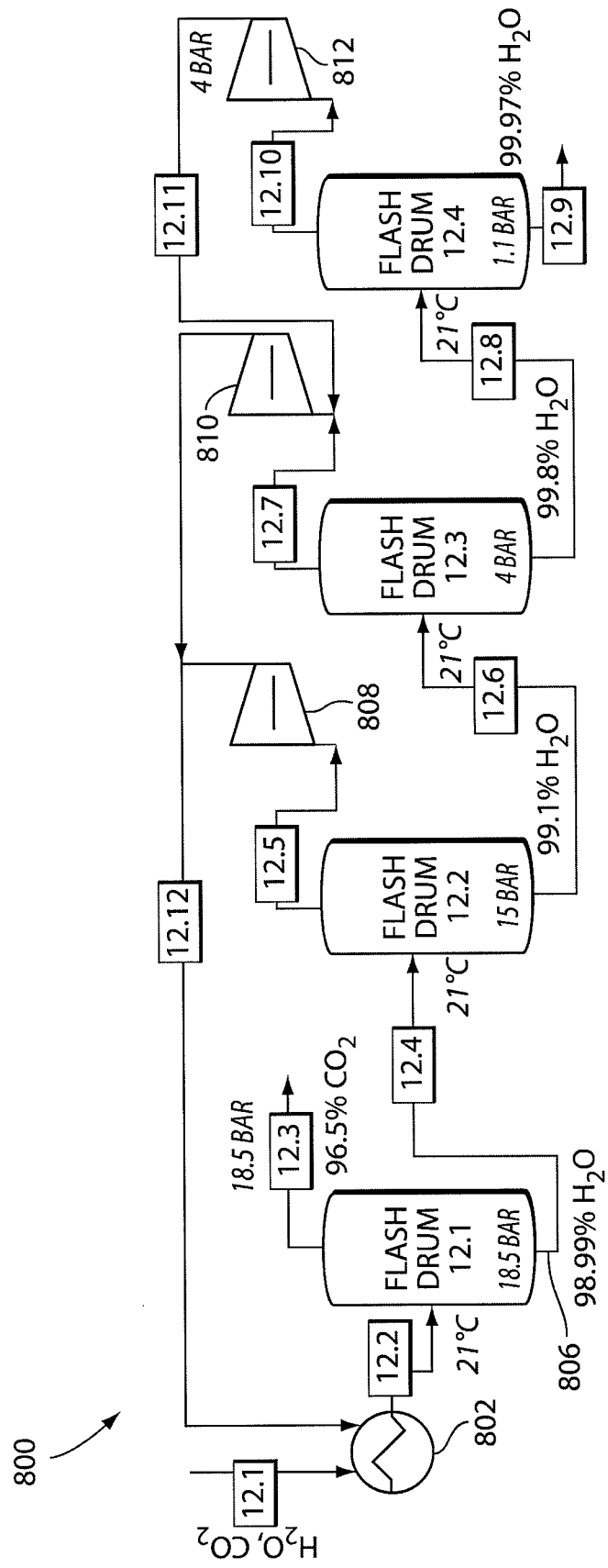
FIG. 8 is a schematic illustration of one set of embodiments that employs a four-stage flash carbon dioxide-water separation system.

This example describes a process simulation of a process for the four-stage flash separation of carbon dioxide and water. The feed stream compositions and conditions listed in this example were calculated using Aspen Plus 2006.5 as described in Example 1. FIG. 8 is a schematic diagram of the four-stage flash system 800. The stream compositions and conditions in FIG. 8 are outlined in Table 2 below.

TABLE 2

Stream compositions and conditions for the four-stage flash separation system in FIG. 8

|  |  | Stream | | | | | |
|---|---|---|---|---|---|---|---|
|  |  | 12.1 | 12.2 | 12.3 | 12.4 | 12.5 | 12.6 |
| T (° C.) |  | 105 | 21 | 21 | 21 | 21 | 21 |
| P (bar) |  | 18.6 | 18.5 | 18.4 | 18.4 | 15.0 | 15.0 |
| F (kmol/h) |  | 28119 | 28277 | 12224 | 16053 | 24 | 16029 |
| Vapor Frac. |  |  | 0.46625 | 0.43228 | 1 | 0 | 1 | 0 |
| Mole | $H_2O$ | 56.58% | 56.27% | 0.17% | 98.99% | 0.2% | 99.14% |
| Fractions | $N_2$ | 0.76% | 0.75% | 1.75% | 3 ppm | 0.17% | 212 ppb |
|  | Ar | 0.69% | 0.68% | 1.58% | 7 ppm | 0.36% | 1 ppm |
|  | CO | 692 ppb | 688 ppb | 2 ppm |  | 315 ppb |  |
|  | $CO_2$ | 41.97% | 42.28% | 96.49% | 1.01% | 99.26% | 0.86% |

|  |  | Stream | | | | | |
|---|---|---|---|---|---|---|---|
|  |  | 12.7 | 12.8 | 12.9 | 12.10 | 12.11 | 12.12 |
| T (° C.) |  | 20 | 20 | 50 | 21 | 21 | 246 |
| P (bar) |  | 4.0 | 4.0 | 1.1 | 1.1 | 1.1 | 18.5 |
| F (kmol/h) |  | 100 | 15929 | 15895 | 35 | 35 | 158 |
| Vapor Frac. |  | 1 | 0 | 0 | 1 | 1 | 1 |
| Mole | $H_2O$ | 0.6% | 99.76% | 99.97% | 2.24% | 2.24% | 0.9% |
| Fractions | $N_2$ | 34 ppm |  |  | 442 ppb | 442 ppb | 278 ppm |
|  | Ar | 194 ppm | 17 ppb |  | 8 ppm | 8 ppm | 668 ppm |
|  | CO | 14 ppb |  |  |  |  | 56 ppb |
|  | $CO_2$ | 99.36% | 0.24% | 305 ppm | 97.74% | 97.74% | 98.99% |

TOTAL COMPRESSOR POWER USED: 0.45 MW

In this example, a stream (12.1 in FIG. 8) containing 56.6% water and 42.0% $CO_2$ at 18.6 bar and 105° C. is fed to a condenser 802. In addition, a downstream recycle stream 12.12 is fed to the condenser. The condenser is used to cool the combined stream to 21° C. (at a pressure of 18.5 bar). The mixed stream (12.2) is separated within a first flash drum (Flash Drum 12.1) to produce a vapor stream (12.3) containing 96.5% $CO_2$. The carbon dioxide in this stream can be compressed and sequestered. In addition, the first flash drum produces a liquid stream 806 containing 99.0% water.

The liquid stream (12.4) is separated within a second flash drum (Flash Drum 12.2) to produce a vapor stream (12.5) containing 99.26% $CO_2$. In the system illustrated in FIG. 8, the vapor stream is compressed in compressor 808 to a pressure of 18.5 bar and recycled to the beginning of the system. The second flash drum also produces a liquid stream 12.6 containing 99.14% water.

Liquid stream 12.6 is separated within a third flash drum (Flash Drum 12.3) to produce a vapor stream (12.7) containing 99.36% $CO_2$. In the system illustrated in FIG. 8, the vapor stream is compressed in compressor 810 to a pressure of 18.5 bar and recycled to the beginning of the system. The third flash drum also produces a liquid stream 12.8 containing 99.76% water.

Liquid stream 12.8 is separated within a fourth flash drum (Flash Drum 12.4) to produce a vapor stream (12.10) containing 97.74% $CO_2$. Vapor stream 12.10 is compressed in compressor 812 to a pressure of 4.0 bar, then mixed with stream 12.7 to be compressed in compressor 810. The fourth flash drum also produces a liquid stream 12.9 containing 99.97% water. The high purity water in stream 12.9 can be used outside the separation process in a variety of applications.

EXAMPLE 3

This example describes a process simulation of a process for power and water production from coal with carbon capture and sequestration. The feed stream compositions and conditions listed in this example were calculated using Aspen Plus 2006.5 using the same physical property models and assumptions described in Example 1.

Figure 9:
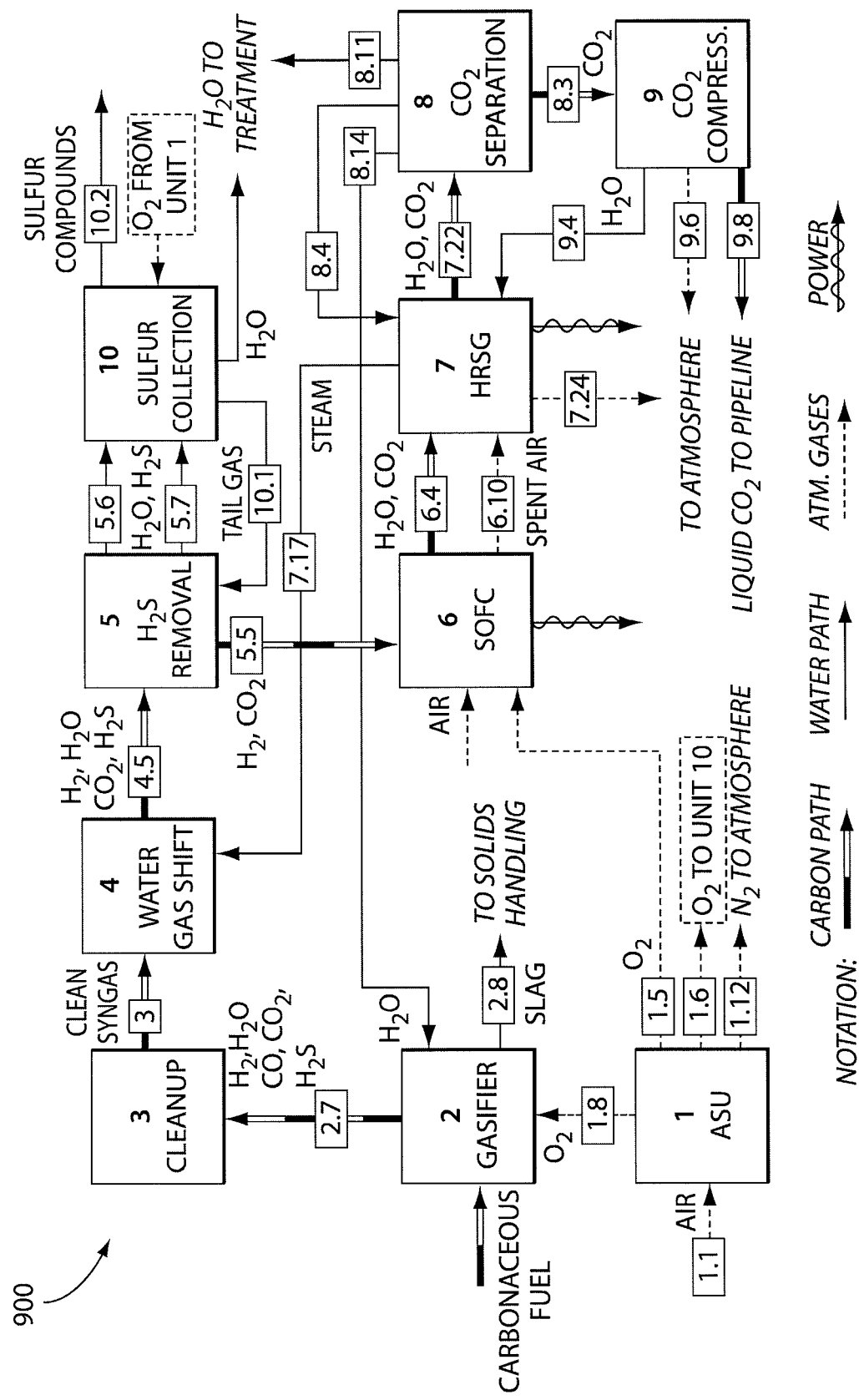
FIG. 9 is a schematic illustration of a power production system using a fuel cell, according to one set of embodiments.

FIG. 9 is a schematic diagram of the integrated gasification/fuel cell/$CO_2$—$H_2O$ separation system 900 described in this example. The amount of high-purity water generated in the system is sufficient to meet the fresh water consumption needs of the system, and the system as a whole operates at a higher efficiency compared to conventional processes with coal feeds.

Figure 10:
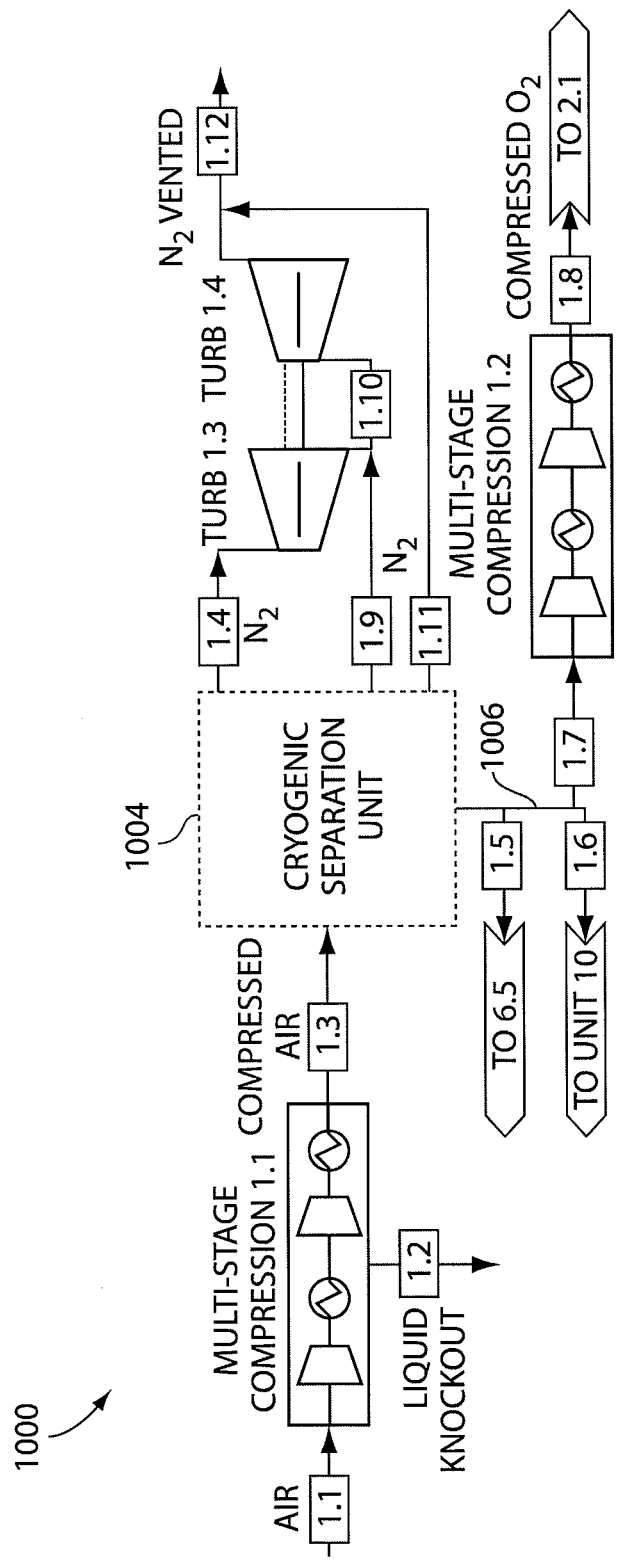
FIG. 10 shows, according to one set of embodiments, a schematic diagram of an air separation unit.

To begin, ambient air is fed to an air separation unit (1 ASU), where the oxygen and nitrogen in the air are separated. Some of the $O_2$ is compressed to high pressure and fed to the gasifier (2 Gasifier), and the rest is compressed to medium pressure and sent to the sulfur collection unit (10 Sulfur Collection). Nitrogen that is not needed is vented back to the atmosphere (1.12). FIG. 10 is a schematic diagram showing the details of the cryogenic air separation unit (1 ASU) of FIG. 9. The stream compositions and conditions in FIG. 10 are outlined in Table 3 below.

TABLE 3

Stream compositions and conditions for the air separation unit in FIG. 10

|  | Stream | | | | | |
|---|---|---|---|---|---|---|
|  | 1.1 | 1.2 | 1.3 | 1.4 | 1.5 | 1.6 |
| T (° C.) | 15.0 | 32.1 | 110.1 | 10.0 | 32.2 | 32.2 |
| P (bar) | 1.0 | 1.0 | 13.1 | 12.6 | 10.0 | 10.0 |
| F (kmol/h) | 29597 | 134 | 29463 | 2739 | 86 | 96 |

TABLE 3-continued

Stream compositions and conditions for the air separation unit in FIG. 10

| | | | | | | | |
|---|---|---|---|---|---|---|---|
| Vap Frac | | 1.00 | 0.00 | 1.00 | 1.00 | 1.00 | 1.00 |
| Mole Fractions | $H_2O$ | 1.08% | 100% | 0.63% | | | |
| | $O_2$ | 20.76% | 3 ppm | 20.85% | 0.52% | 94.9% | 94.9% |
| | $N_2$ | 77.19% | 483 ppb | 77.54% | 99.24% | 1.88% | 1.88% |
| | Ar | 0.94% | 138 ppb | 0.94% | 0.24% | 3.22% | 3.22% |
| | $CO_2$ | 300 ppm | 27 ppb | 301 ppm | 20 ppb | 10 ppb | 10 ppb |

| | | Stream | | | | | |
|---|---|---|---|---|---|---|---|
| | | 1.7 | 1.8 | 1.9 | 1.10 | 1.11 | 1.12 |
| T (° C.) | | 32.2 | 90.9 | 32.2 | 20.8 | 15.6 | −31.1 |
| P (bar) | | 10.0 | 67.6 | 3.9 | 3.9 | 1.1 | 1.1 |
| F (kmol/h) | | 5904 | 5904 | 16945 | 19685 | 3692 | 23377 |
| Vap Frac | | 1.00 | 1.00 | 1.00 | 1.00 | 0.96 | 0.99 |
| Mole Fractions | $H_2O$ | | | | | 5.03% | 0.79% |
| | $O_2$ | 94.9% | 94.9% | 0.53% | 0.53% | 7.16% | 1.58% |
| | $N_2$ | 1.88% | 1.88% | 99.23% | 99.23% | 86.62% | 97.24% |
| | Ar | 3.22% | 3.22% | 0.24% | 0.24% | 0.95% | 0.35% |
| | $CO_2$ | 10 ppb | 10 ppb | 20 ppb | 20 ppb | 0.24% | 380 ppm |

In FIG. 10, ambient air (1.1) is compressed to medium pressure using a four stage compression sequence (Multi-stage Compression 1.1), with some liquid water removed as a knockout stream (1.2). The compressed air (1.3) is fed to the cryogenic separation unit (1004), where it is separated into an oxygen rich stream (1006), nitrogen streams (1.4, and 1.9) at various pressures, and a nitrogen stream containing water vapor (1.11). After expansion through turbines (Turb 1.3 and Turb 1.4), the nitrogen and water vapor streams are vented back to the atmosphere (1.12). A small portion (1.6) of stream 1006 may be diverted to sulfur collection unit (10 Sulfur Collection) for use in sulfur recovery. Another small portion (1.5) is diverted to the fuel cell unit (6) to enable oxidation of unreacted hydrogen exiting the SOFC anode. This stream (1.5) may be compressed further to the operating conditions of the SOFC. The rest of the oxygen rich stream is compressed with a multi-stage compressor unit (Multi-stage Compression 1.2) to high pressure and sent to the gasifier unit (2 Gasifier) (stream 1.8).

As an alternative, it may be advantageous to achieve the desired oxygen gas pressure by pumping rather than by gas compression. Inside the cryogenic separation unit 1004, liquid oxygen is recovered as a product of distillation. A portion of this liquid oxygen could be pumped to the desired pressure and then vaporized through heat exchange. This would eliminate the need for (Multi-stage Compression 1.2), possibly increasing the electrical efficiency of the power plant.

Figure 11:
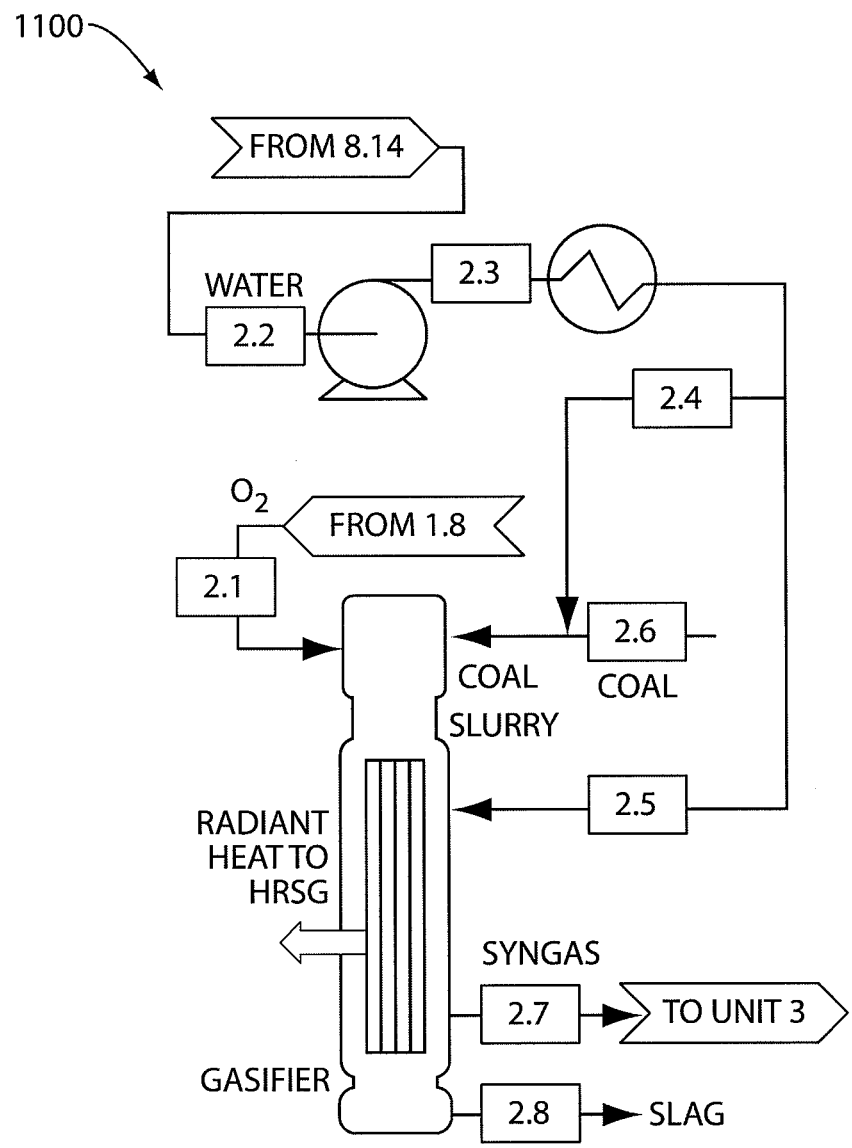
FIG. 11 is a schematic diagram of a gasifier, according to one set of embodiments.

Referring again to FIG. 9, coal is gasified in gasifier unit (2 Gasifier), producing high pressure syngas (2.7) containing $H_2$, $H_2O$, CO, $CO_2$, COS, $H_2S$, HCl, and other compounds. FIG. 11 includes a schematic diagram of an exemplary gasifier 1100 that may be employed. The stream compositions and conditions in FIG. 11 are outlined in Table 4 below.

TABLE 4

Stream compositions and conditions for the gasifier in FIG. 11

| | | Stream | | | | | | | |
|---|---|---|---|---|---|---|---|---|---|
| | | 2.1 | 2.2 | 2.3 | 2.4 | 2.5 | 2.6* | 2.7 | 2.8* |
| T (° C.) | | 90.9 | 21.0 | 38.0 | 100.0 | 100.0 | 128.8 | 210.0 | 210.0 |
| P (bar) | | 67.6 | 18.4 | 60.0 | 60.0 | 60.0 | 60.0 | 55.0 | 55.0 |
| F (kmol/h) | | 5904 | 11328 | 11328 | 5228 | 6100 | 13762 | 29967 | 24902 |
| Vap Frac | | 1.00 | 0.00 | 0.00 | 0.01 | 0.01 | solid | 1.00 | solid |
| Mole Fractions | $H_2O$ | | 98.99% | 98.99% | 98.99% | 98.99% | | 31.57% | |
| | $O_2$ | 94.9% | 3 ppb | 3 ppb | 3 ppb | 3 ppb | | | |
| | $N_2$ | 1.88% | 3 ppm | 3 ppm | 3 ppm | 3 ppm | | 0.71% | |
| | Ar | 3.22% | 7 ppm | 7 ppm | 7 ppm | 7 ppm | | 0.63% | |
| | CO | | | | | | | 27.43% | |
| | $CO_2$ | | 1.01% | 1.01% | 1.01% | 1.01% | | 12.25% | |
| | $H_2$ | | 10 ppb | 10 ppb | 10 ppb | 10 ppb | | 26.69% | |
| | $H_2S$ | | 1 ppm | 1 ppm | 1 ppm | 1 ppm | | 0.57% | |
| | HCl | | | | | | | 627 ppm | |
| | $CH_4$ | | 7 ppb | 7 ppb | 7 ppb | 7 ppb | | 694 ppm | |
| | Others | 10 ppb | 3 ppb | 3 ppb | 3 ppb | 3 ppb | #6 Coal | 298 ppm | Slag |

*Flow measurement is in kg/hr

In FIG. 11, coal (2.6) is fed as a slurry, using water (2.4) from the downstream carbon dioxide separation step (described later). Oxygen (1.8) from the air separation unit is fed to the gasifier, where it is used to gasify the coal to produce syngas (2.7) at 210° C. The simulation in FIG. 11 assumes that 0.98% of the higher heating value (HHV) of the coal is lost as unrecoverable heat to the environment in the gasifier.

In the cleanup unit (3 Cleanup) (FIG. 9), the syngas (2.7) is purified to remove HCl. In the simulation in FIG. 9, it is assumed that 100% of the HCl is removed via a scrubbing step using water as a solvent.

Figure 12:
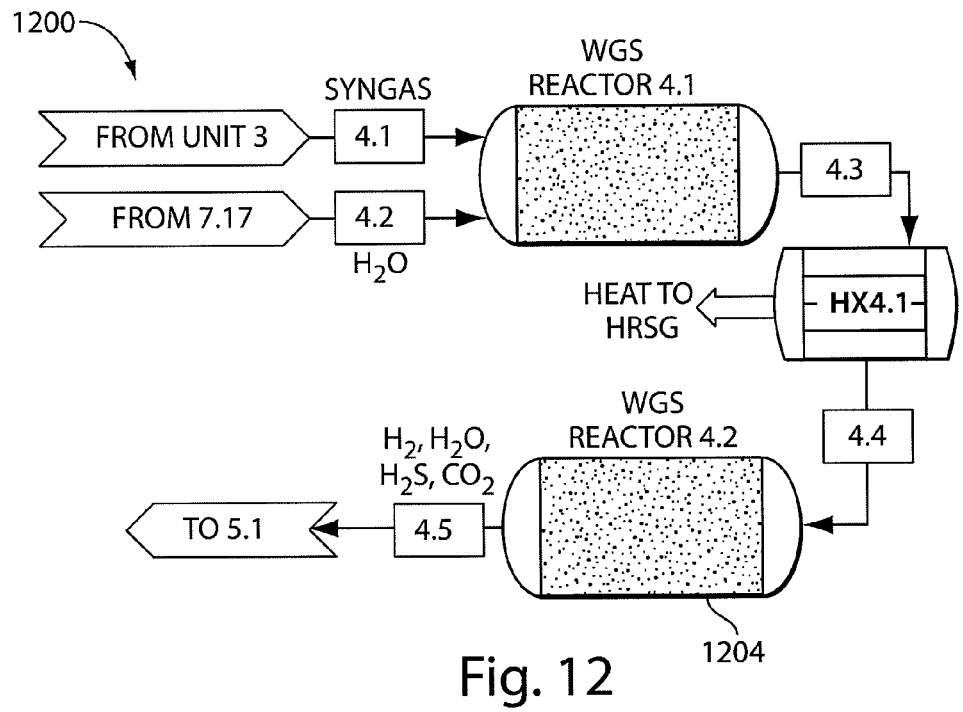
FIG. 12 shows, according to one set of embodiments, a schematic illustration of a water-gas shift reaction system.

The water-gas shift is performed in the WGS unit (4 Water Gas Shift). FIG. 12 shows a schematic illustration of the water-gas shift reaction system 1200 used for the WGS unit (4 Water Gas Shift) in this example. The stream compositions and conditions in FIG. 12 are outlined in Table 5 below.

TABLE 5

Stream compositions and conditions for the water-gas shift unit in FIG. 12

| | | Stream | | | | |
|---|---|---|---|---|---|---|
| | | 4.1 | 4.2 | 4.3 | 4.4 | 4.5 |
| T (° C.) | | 210.0 | 274.7 | 388.6 | 232.0 | 267.7 |
| P (bar) | | 55.0 | 60.3 | 54.3 | 54.3 | 53.6 |
| F (kmol/h) | | 29948 | 7024 | 36972 | 36972 | 36972 |
| Vap Frac | | 1.00 | 0.93 | 1.00 | 1.00 | 1.00 |
| Mole Fractions | $H_2O$ | 31.59% | 99.61% | 26.7% | 26.7% | 23.19% |
| | $N_2$ | 0.71% | 1 ppm | 0.57% | 0.57% | 0.57% |
| | Ar | 0.63% | 3 ppm | 0.51% | 0.51% | 0.51% |
| | CO | 27.45% | | 4.45% | 4.45% | 0.94% |
| | $CO_2$ | 12.25% | 0.39% | 27.81% | 27.81% | 31.32% |
| | $H_2$ | 26.7% | 4 ppb | 39.42% | 39.42% | 42.93% |
| | $H_2S$ | 0.57% | 446 ppb | 0.48% | 0.48% | 0.48% |
| | $CH_4$ | 694 ppm | 3 ppb | 562 ppm | 562 ppm | 562 ppm |

In FIG. 12, the WGS reaction is achieved in two stages: a high temperature stage (WGS Reactor 4.1), where approximately 78% conversion is achieved, and a subsequent low temperature stage (WGS Reactor 4.2), where 96% overall conversion is achieved. Depending upon the process configuration and the desired level of syngas conversion, different configurations of the water-gas shift system may be used, including more or fewer reactors in series at various temperatures and pressures, or several reactor chains in parallel, depending on the size or pressure drop limitations of the reactors.

Figure 13:
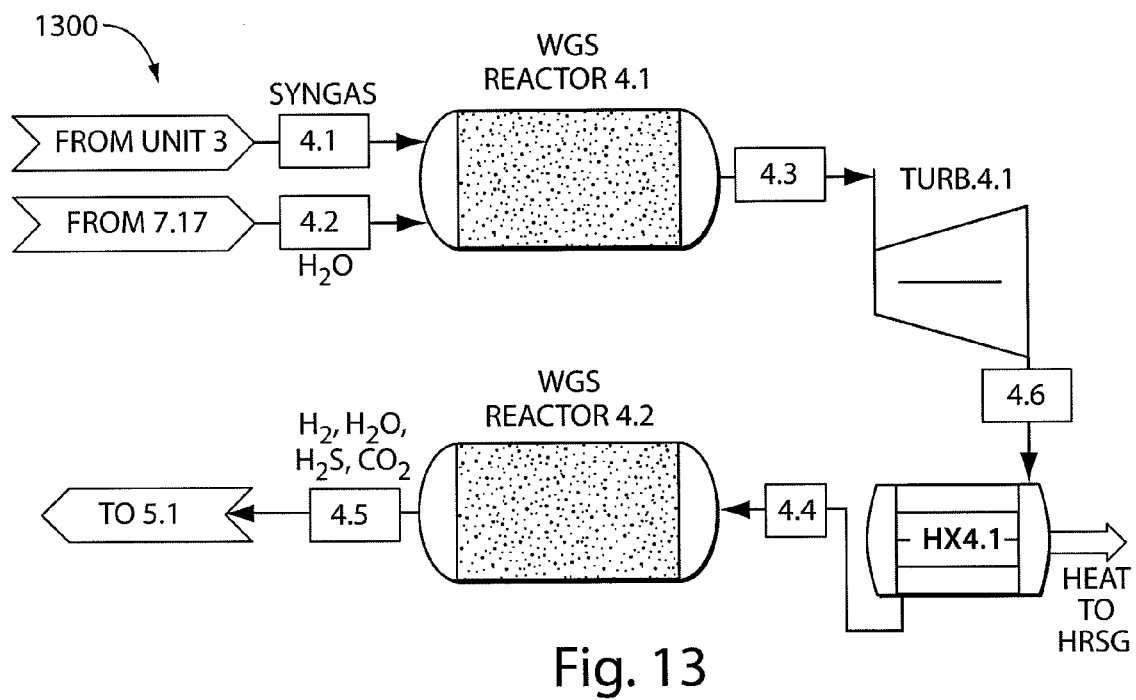
FIG. 13 is a schematic illustration of a water-gas shift reaction system, according to one set of embodiments.

FIG. 13 is a schematic illustration of an alternative arrangement 1300 for the water-gas shift reactors. In FIG. 13, the effluent (4.3) from a first water-gas shift reactor (WGS Reactor 4.1) is fed to an expansion turbine (e.g., Turb. 4.1 in FIG. 13), and subsequently fed to a second water-gas shift reactor (WGS Reactor 4.2). The gas may be expanded from a high to a medium pressure and subsequently cooled with a heat exchanger (HX4.1), thereby lowering the inlet temperature to the second water-gas shift stage. The expansion turbine (Turb. 4.1) may serve to increase the overall efficiency of the plant by providing both extra electricity and lower temperatures, reducing the need for cooling water (e.g., from other system units or from outside the system). The use of an expansion turbine may be preferred when a sweet-gas shift is performed, or when a sour-gas shift is performed and the units (e.g., $H_2S$ removal unit (5 $H_2S$ Removal), described below) between the water-gas shift reactor and the fuel cell are operated at lower pressures than the pressure in the gasifier.

The water-gas shift reactions are taken to high conversion, leaving only $H_2$, $H_2O$, $CO_2$, and $H_2S$ in significant quantities. In this example, steam (4.2) is provided for this reaction by partial recycle of water from the heat recovery and steam generation unit (7 HRSG) (originating in carbon dioxide compressor unit (9 $CO_2$ Compress.)).

It should be noted that a variety of techniques are permissible for units (3 Cleanup), (4 Water Gas Shift), and (5 $H_2S$ Removal) of FIG. 9 and they can be performed/arranged in different orders. For example, in a sweet-gas shift reaction, the sulfur containing compounds (COS, $H_2S$, etc) are removed before the water-gas shift reactors. However, in some cases it may be desirable to remove these compounds after the WGS units. In such a case, the catalyst in the water-gas shift reactors should be sulfur tolerant. This case, called a sour-gas shift, is shown as an example in FIG. 9, where HCl is scrubbed in the cleanup unit, the WGS reactions take place in the WGS unit, and the mercury and sulfur and compounds are removed in $H_2S$ removal unit.

Figure 14:
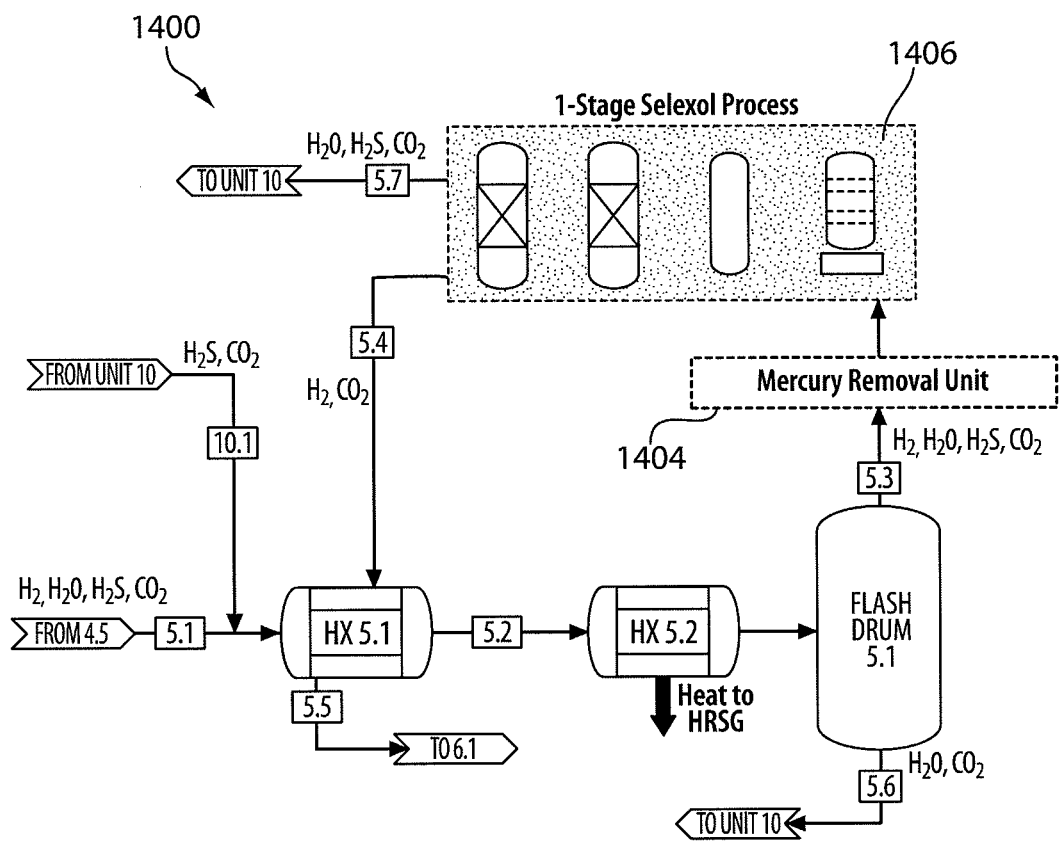
FIG. 14 is a schematic illustration of a $H_2S$ removal system, according to one set of embodiments.

A variety of techniques are available for removal of sulfur-containing compounds, the selection of which may depend upon where the sulfur removal unit is located in relation to the WGS reactors. In the set of embodiments illustrated in FIG. 9, clean, enriched syngas (4.5) is fed to the $H_2S$ removal unit. FIG. 14 shows a schematic illustration of the $H_2S$ removal system 1400 used as the $H_2S$ removal unit in this example. The stream compositions and conditions in FIG. 14 are outlined in Table 6 below.

TABLE 6

Stream compositions and conditions for the $H_2S$ removal unit in FIG. 14

| | | Stream | | | | | | | |
|---|---|---|---|---|---|---|---|---|---|
| | | 5.1 | 5.2 | 5.3 | 5.4 | 5.5 | 5.6 | 5.7 | 10.1 |
| T (° C.) | | 267.7 | 173.1 | 49.0 | 54.5 | 257.0 | 49.0 | 49.0 | 353.0 |
| P (bar) | | 53.6 | 53.5 | 53.5 | 53.5 | 53.5 | 53.5 | 2.1 | 53.5 |
| F (kmol/h) | | 36972 | 37235 | 28686 | 28212 | 28212 | 8549 | 474 | 264 |
| Vap Frac | | 1.00 | 0.95 | 1.00 | 1.00 | 1.00 | 0.00 | 0.86 | 1.00 |
| Mole Fractions | $H_2O$ | 23.19% | 23.03% | 0.3% | | | 99.28% | 18.42% | 0.19% |
| | $N_2$ | 0.57% | 0.65% | 0.84% | 0.75% | 0.75% | 4 ppm | 6.09% | 10.96% |
| | Ar | 0.51% | 0.51% | 0.66% | 0.67% | 0.67% | 6 ppm | | 192 ppm |
| | CO | 0.94% | 0.93% | 1.21% | 1.23% | 1.23% | 8 ppm | | 17 ppm |
| | $CO_2$ | 31.32% | 31.7% | 40.96% | 41.02% | 41.02% | 0.64% | 37.16% | 85.73% |

TABLE 6-continued

Stream compositions and conditions for the $H_2S$ removal unit in FIG. 14

| | | Stream | | | | | | |
|---|---|---|---|---|---|---|---|---|
| | | 5.1 | 5.2 | 5.3 | 5.4 | 5.5 | 5.6 | 5.7 | 10.1 |
| $H_2$ | | 42.93% | 42.62% | 55.32% | 56.25% | 56.25% | 387 ppm | | 0.16% |
| $H_2S$ | | 0.48% | 0.5% | 0.64% | 26 ppm | 26 ppm | 304 ppm | 38.3% | 2.93% |
| $CH_4$ | | 562 ppm | 559 ppm | 725 ppm | 737 ppm | 737 ppm | 594 ppb | | 19 ppm |
| Others | | 37 ppm | 37 ppm | 4 ppm | 30 ppb | 30 ppb | 149 ppm | 224 ppm | 78 ppm |

In FIG. 14, the reaction effluent (4.5) leaving the low temperature WGS reactor (1204—see FIG. 12) is cooled through heat exchangers HX5.1 and HX5.2 and then separated in a flash drum (Flash Drum 5.1). The liquid (5.6) leaving the flash drum comprises water and a low amount of hydrogen sulfide, which is sent to sulfur collection unit (10 Sulfur Collection) (FIG. 9) for further treatment. The balance (5.3) leaves the flash drum in the gas phase and is sent to the mercury removal unit 1404, where mercury present in the syngas is removed through an appropriate method such as carbon bed adsorption. Due to the small amount present, mercury was not considered for the stream calculations of Example 3.

In unit 1406 of FIG. 14, the 1-Stage Selexol process is used to remove $H_2S$ from the gas. The shifted syngas (after Hg removal) is contacted with a liquid solvent (Selexol) in an absorption column at a gas to solvent molar ratio of about 5 to 1. Most of the $H_2S$ and $H_2O$ in the feed are recovered into the solvent, along with some of the $CO_2$. The rich solvent is then further enriched by contacting with nitrogen in a second absorption column. Then the $H_2S$, $H_2O$, and $CO_2$ are released from the solvent (stream 5.7) by stripping and sent to the sulfur collection unit (10 Sulfur Collection) for further treatment. The lean solvent is then recycled to the first absorber. The $H_2S$-lean syngas recovered from the first absorber (5.4) is reheated using heat exchanger HX5.1 and then sent directly to fuel cell unit (6 SOFC) for use as the SOFC fuel. An example 1-Stage Selexol process is described in Woods et al., "Cost and Performance Base-line for Fossil Energy Plants. Volume 1: Bituminous Coal and Natural Gas to Electricity Final Report," DOE/NETL-2007/1281, Revision 1, August 2007, which is incorporated herein by reference in its entirety.

One alternative to an absorption based process is the Sulfur-Rite process by Merichem Co. In this process, the $H_2S$ in a sour gas stream reacts with a proprietary material to produce water and $FeS_2$ (iron pyrite). The $FeS_2$ is non-hazardous and can be land-filled. This process can operate at low pressures for a variety of sour gas feeds, and is particularly suitable for systems where simultaneous $CO_2$ removal is not necessary, such as in the present invention. If the Sulfur-Rite process is used for the $H_2S$ removal unit (5 $H_2S$ Removal), further downstream treatment of the sulfur is not needed, and so the sulfur collection unit (10 Sulfur Collection) (e.g., the Claus process) can be eliminated. If the Sulfur-Rite process is placed downstream of the WGS unit, Turb. 4.1 (FIG. 13) should be used to lower the syngas pressure to the pressure of the Sulfur-Rite system.

Figure 15:
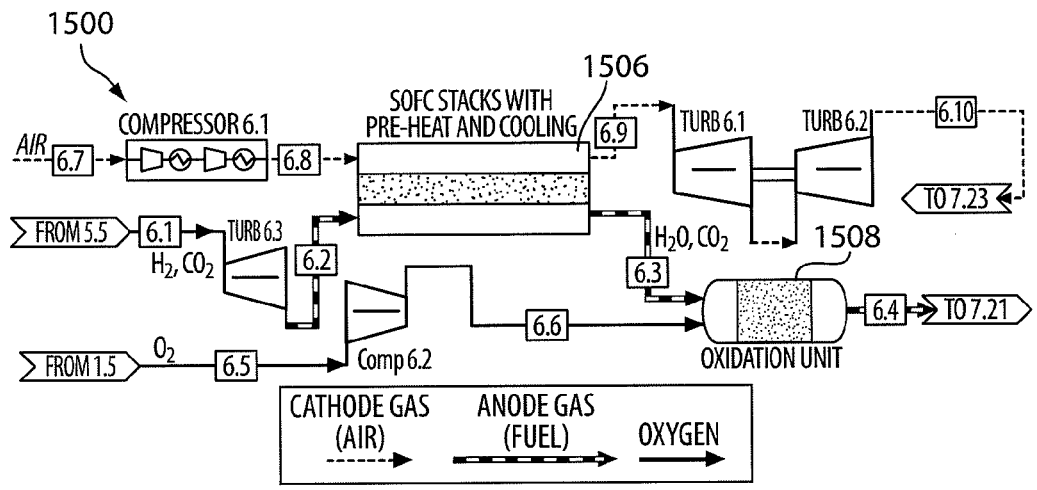
FIG. 15 is a schematic illustration of a fuel cell system, according to one set of embodiments.

In FIG. 9, the clean shifted syngas (5.5) is fed to a SOFC unit (6 SOFC). FIG. 15 shows a schematic illustration of the fuel cell system 1500 used for the SOFC unit in the system 900 as simulated. The stream compositions and conditions in FIG. 15 are outlined in Table 7 below.

TABLE 7

Stream compositions and conditions for the fuel cell system in FIG. 15

| | Stream | | | | | | | | | |
|---|---|---|---|---|---|---|---|---|---|---|
| | 6.1 | 6.2 | 6.3 | 6.4 | 6.5 | 6.6 | 6.7 | 6.8 | 6.9 | 6.10 |
| T (° C.) | 257.0 | 180.0 | 1030.9 | 1168.1 | 32.2 | 117.5 | 15.0 | 567.1 | 1030.9 | 527.4 |
| P (bar) | 53.5 | 21.0 | 18.6 | 18.6 | 10.0 | 19.1 | 1.0 | 20.0 | 18.6 | 1.1 |
| F (kmol/h) | 28212 | 28212 | 28212 | 28258 | 86 | 86 | 40000 | 40000 | 31933 | 31933 |
| Vap Frac | 1.00 | 1.00 | 1.00 | 1.00 | 1.00 | 1.00 | 1.00 | 1.00 | 1.00 | 1.00 |
| Mole Fractions $H_2O$ | | | 55.97% | 56.3% | | | 1.08% | 1.08% | 1.35% | 1.35% |
| $O_2$ | 1 ppb | 1 ppb | | 3 ppm | 94.9% | 94.9% | 20.76% | 20.76% | 0.74% | 0.74% |
| $N_2$ | 0.75% | 0.75% | 0.75% | 0.76% | 1.88% | 1.88% | 77.19% | 77.19% | 96.69% | 96.69% |
| Ar | 0.67% | 0.67% | 0.67% | 0.68% | 3.22% | 3.22% | 0.94% | 0.94% | 1.18% | 1.18% |
| CO | 1.23% | 1.23% | 61 ppm | 613 ppb | | | | | | |
| $CO_2$ | 41.02% | 41.02% | 42.25% | 42.26% | | | 300 ppm | 300 ppm | 376 ppm | 376 ppm |
| $H_2$ | 56.25% | 56.25% | 0.28% | 28 ppm | | | | | | |
| $H_2S$ | 26 ppm | 26 ppm | 26 ppm | 26 ppm | | | | | | |
| $CH_4$ | 737 ppm | 737 ppm | 737 ppm | 7 ppm | | | | | | |
| Others | 29 ppb | 29 ppb | 19 ppb | 6 ppb | 10 ppb | 10 ppb | | | 30 ppb | 30 ppb |

In FIG. 15, several heat-integrated fuel cell stacks (1506) are used in series. The fuel cells are exothermic; hence, heat exchangers are located between each stack to provide interstage cooling to ensure that the operating temperature does not exceed the maximum allowed by the fuel cell (assumed to be 1030° C. for this example). Ambient air (6.7) is compressed to medium pressure with a multistage compressor unit (Compressor 6.1). This air stream is warmed to the SOFC operating conditions through preheating in 1506 prior to entering the cathode side of the SOFCs. The cleaned, shifted syngas (5.5) from upstream is expanded in Turb. 6.3 to the operating pressure of the SOFC, producing electricity. The reduced pressure stream (6.2) is then warmed to the same temperature and fed to the anode side. Preheating for both streams 6.2 and 6.8 is provided in 1506 by heat integration with the interstage coolers. For some embodiments, additional heat may be needed from another source, such as the HRSG.

The hot, spent fuel stream (6.3) then enters the oxidation reactor 1508, where high purity oxygen (6.5) from the air separation unit (1 ASU) permits oxidation of any residual $H_2$ and CO still remaining in the spent fuel, producing more heat. The hot spent air stream (6.9) leaving the stacks is expanded to atmospheric pressure using turbines (Turb. 6.1 and Turb. 6.2), providing electricity and completing the Brayton cycle. The spent air (6.10) and spent fuel (6.4) streams are then sent to the HRSG unit (7 HRSG) for heat recovery.

For the example stream conditions shown for the illustrated embodiment of the present example, the operating voltage of the SOFCs is assumed to be 0.69V (out of a maximum theoretical potential of 0.96V for 910° C. operating temperature). This is consistent with the current state of the art. 5% of the total electrochemical energy released is assumed to be lost to the environment as unrecoverable heat. The DC→AC Inverter is assumed to be 96% efficient. The voltage of the SOFC (and thus the efficiency) may be increased by reducing the $H_2S$ contained in the syngas, by using alternative electrolyte materials with higher sulfur tolerance, or through other operating improvements to the device. Such efficiency gains may have a significant impact on the efficiency of the system as a whole.

Note that for some configurations, the spent air may be too hot to expand in a turbine without special materials. In such a case, the air stream could first be cooled to a lower temperature via contact with the HRSG unit (7 HRSG) (described below), expanded to atmospheric pressure, and then cooled further in the HRSG unit. This could result in a slightly lower electrical efficiency.

Turb. 6.3, shown in FIG. 15, reduces the pressure of the syngas down to the SOFC operating pressure while providing power. This turbine is optional. It may be more efficient to lower the gas inlet pressure to the SOFC by including optional Turbine 4.1 in the WGS unit (4 Water Gas Shift) instead of using Turb. 6.3. However, the nature of the chosen $H_2S$ removal process (such as a high pressure absorption process) may make use of Turb. 4.1 less advantageous than use of Turb. 6.3.

Figure 16:
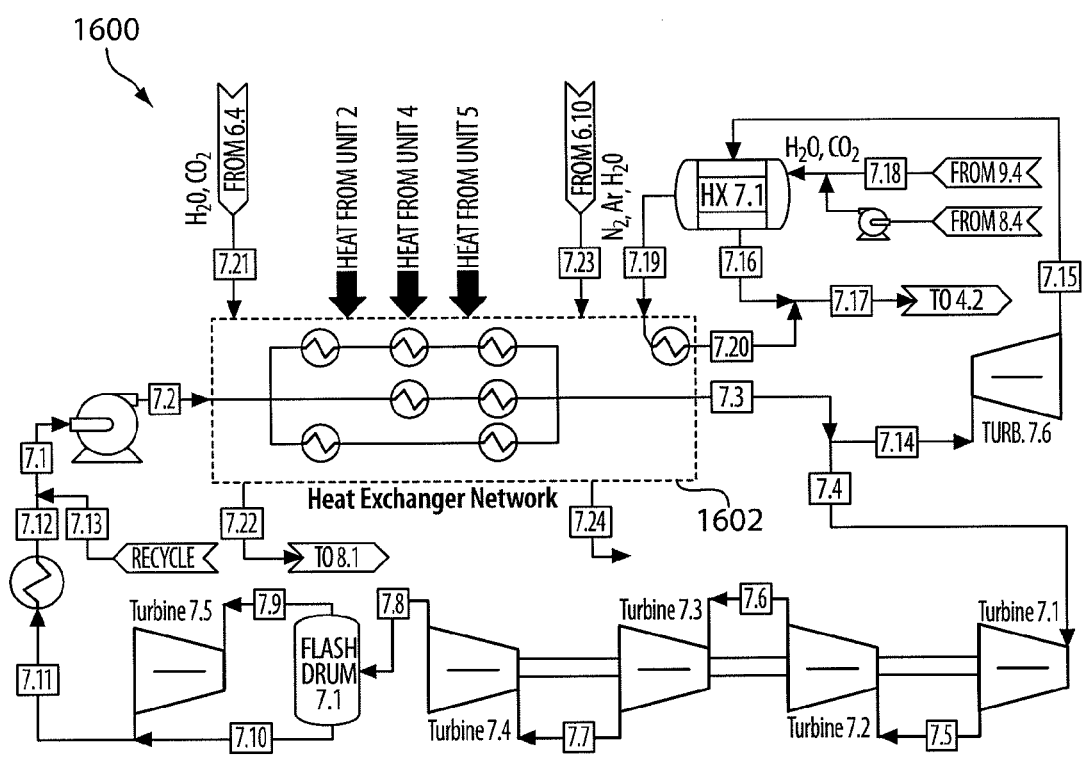
FIG. 16 shows, according to one set of embodiments, a schematic illustration of a heat recovery and steam generation system.

The spent fuel (6.4) and spent air (6.10) streams are sent to the HRSG unit (7 HRSG), where their heat is used to generate steam for additional turbine power. Additionally, heat from other areas of the process (excess heat given off by the gasifier, steam generated from intermediate cooling of the water-gas shift reactors, etc.) can be used for steam power generation as well. The pressure drop of the spent syngas or spent air through the HRSG unit can be small. The spent air stream (7.24) can be vented to the atmosphere after cooling and expansion. FIG. 16 shows a schematic illustration of the HRSG system 1600 used for implementing the HRSG unit as simulated. The stream compositions and conditions in FIG. 16 are outlined in Table 8 below.

TABLE 8

Stream compositions and conditions for the HRSG system in FIG. 16

| | | Stream | | | | | | |
|---|---|---|---|---|---|---|---|---|
| | 7.1 | 7.2 | 7.3 | 7.4 | 7.5 | 7.6 | 7.7 | 7.8 |
| T (° C.) | 38.7 | 40.0 | 550.0 | 550.0 | 363.7 | 221.1 | 109.2 | 75.9 |
| P (bar) | 0.1 | 127.0 | 127.0 | 127.0 | 28.2 | 6.3 | 1.4 | 0.4 |
| F (kmol/h) | 61333 | 61333 | 61333 | 56975 | 56975 | 56975 | 56975 | 56975 |
| Vap Frac | 0.00 | 0.00 | 1.00 | 1.00 | 1.00 | 1.00 | 1.00 | 0.96 |
| x  $H_2O$ | 100% | 100% | 100% | 100% | 100% | 100% | 100% | 100% |

| | | Stream | | | |
|---|---|---|---|---|---|
| | | 7.9 | 7.10 | 7.11 | 7.12 |
| T (° C.) | | 75.9 | 75.9 | 38.7 | 38.7 |
| P (bar) | | 0.4 | 0.4 | 0.1 | 0.1 |
| F (kmol/h) | | 54726 | 2249 | 56975 | 56975 |
| Vap Frac | | 1.00 | 0.00 | 0.92 | 0.00 |
| x  $H_2O$ | | 100% | 100% | 100% | 100% |

| | | Stream | | | | | | |
|---|---|---|---|---|---|---|---|---|
| | | 7.13 | 7.14 | 7.15 | 7.16 | 7.17 | 7.18 | 7.19 | 7.20 |
| T (° C.) | | 38.7 | 550.0 | 449.4 | 324.0 | 274.7 | 6.6 | 159.6 | 273.8 |
| P (bar) | | 0.1 | 127.0 | 60.3 | 60.3 | 60.3 | 74.0 | 60.3 | 60.3 |
| F (kmol/h) | | 4358 | 4358 | 4358 | 4358 | 7024 | 15 | 2665 | 2665 |
| Vap Frac | | 0.00 | 1.00 | 1.00 | 1.00 | 0.93 | 0.00 | 0.01 | 0.73 |
| Mole | $H_2O$ | 100% | 100% | 100% | 99.61% | 95.42% | 98.97% | 98.97% | 56.3% |
| Fractions | $O_2$ | | | | 1 ppb | 20 ppb | 3 ppb | 3 ppb | 3 ppm |
| | $N_2$ | | | | 1 ppm | 30 ppm | 3 ppm | 3 ppm | 0.76% |
| | Ar | | | | 3 ppm | 56 ppm | 7 ppm | 7 ppm | 0.68% |
| | $CO_2$ | | | | 0.39% | 4.57% | 1.03% | 1.03% | 42.26% |

TABLE 8-continued

Stream compositions and conditions for the HRSG system in FIG. 16

| | | Stream | | | |
|---|---|---|---|---|---|
| | | 7.21 | 7.22 | 7.23 | 7.24 |
| T (° C.) | | 1168.1 | 105.0 | 527.4 | 110.0 |
| P (bar) | | 18.6 | 18.6 | 1.1 | 1.1 |
| F (kmol/h) | | 28258 | 28258 | 31933 | 31933 |
| Vap Frac | | 1.00 | 0.47 | 1.00 | 1.00 |
| Mole | $H_2O$ | 56.3% | 1.35% | 1.35% | 1.35% |
| Fractions | $O_2$ | 3 ppm | 0.74% | 0.74% | 0.74% |
| | $N_2$ | 0.76% | 96.69% | 96.69% | 96.69% |
| | Ar | 0.68% | 1.18% | 1.18% | 1.18% |
| | $CO_2$ | 42.26% | 376 ppm | 376 ppm | 376 ppm |

In FIG. 16, water is pumped to the maximum allowable turbine pressure, and heated with various sources from elsewhere in the plant through a heat exchanger network 1602. The rate of water flow is adjusted so that the maximum desired rate of heat transfer is achieved, without temperature crossover in the heat exchanger network, and without increasing the temperature of the steam above the allowable maximum of the turbine. A portion (7.14) of this high pressure, high temperature steam is diverted for use in the WGS unit (4 Water Gas Shift), expanded in a turbine (Turb. 7.6) (producing power) to the operating pressure of the WGS reactors, and cooled through heat exchanger HX7.1 to the desired temperature. This is mixed with steam generated from the recycled water from the carbon dioxide-water separation unit (8 $CO_2$ Separation) and the $CO_2$ compression unit (9 $CO_2$ Compress) to provide for the total amount of desired steam in the WGS unit. The rest of the high pressure, high temperature steam (7.4) enters the multistage expansion turbines (Turb. 7.1, Turb. 7.2, Turb. 7.3, Turb. 7.4, and Turb. 7.5), producing power. Makeup water (7.13) is also added to the cycle to account for the water diverted for WGS purposes, which can be provided by recycle from the $CO_2$ separation unit, the sulfur collection unit or other sources. Depleted air, after cooling (7.24), is vented to the atmosphere. The depleted fuel, after cooling (7.22), is sent to the $CO_2$ separation unit. The desired cooling temperature depends on the nature of the $CO_2$ removal methods in the $CO_2$ separation unit.

Figure 17:
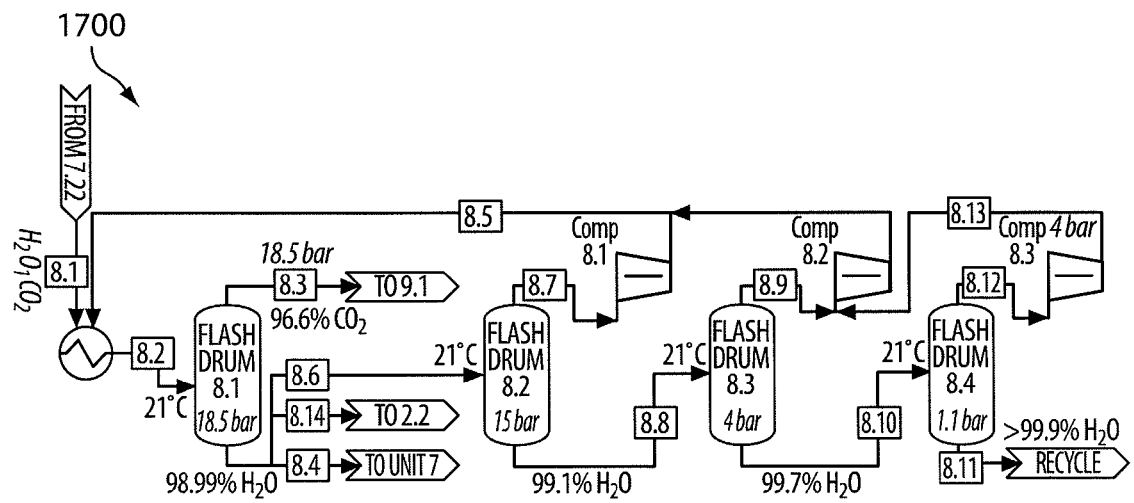
FIG. 17 is a schematic illustration of a carbon dioxide-water separation system, according to one set of embodiments.

The cooled fuel cell anode exhaust (7.22) is then fed to the carbon dioxide-water separation unit (8 $CO_2$ separation), where the water and the $CO_2$ are separated. The water exits at high purity and portions can be recycled upstream, such as to the gasifier unit (2 Gasifier) for use as sump water or in making slurries for coal solids. FIG. 17 shows a schematic illustration of the separation system 1700 employed as the as the carbon dioxide-water separation unit simulated. The stream compositions and conditions in FIG. 17 are outlined in Table 9 below.

TABLE 9

Stream compositions and conditions for the carbon dioxide-water separation system in FIG. 17

| | | Stream | | | | | | |
|---|---|---|---|---|---|---|---|---|
| | | 8.1 | 8.2 | 8.3 | 8.4 | 8.5 | 8.6 | 8.7 |
| T (° C.) | | 105 | 21 | 21 | 21 | 246 | 21 | 21 |
| P (bar) | | 18.6 | 18.5 | 18.4 | 18.4 | 18.5 | 18.4 | 15.0 |
| F (kmol/h) | | 28258 | 28278 | 12228 | 2650 | 20 | 2071 | 3 |
| Vap Frac | | 0.469 | 0.432 | 1 | 0 | 1 | 0 | 1 |
| Mole Fractions | $H_2O$ | 56.3% | 56.26% | 0.17% | 98.99% | 0.9% | 98.99% | 0.2% |
| | $O_2$ | 3 ppm | 3 ppm | 6 ppm | 3 ppb | 299 ppb | 3 ppb | 2 ppm |
| | $N_2$ | 0.76% | 0.75% | 1.74% | 3 ppm | 277 ppm | 3 ppm | 0.17% |
| | Ar | 0.68% | 0.68% | 1.58% | 7 ppm | 667 ppm | 7 ppm | 0.36% |
| | CO | 613 ppb | 613 ppb | 1 ppm | | 50 ppb | | 281 ppb |
| | $CO_2$ | 42.26% | 42.3% | 96.49% | 1.01% | 98.99% | 1.01% | 99.26% |

| | | Stream | | | | | | |
|---|---|---|---|---|---|---|---|---|
| | | 8.8 | 8.9 | 8.10 | 8.11 | 8.12 | 8.13 | 8.14 |
| T (° C.) | | 21 | 20 | 20 | 50 | 21 | 130 | 21 |
| P (bar) | | 15.0 | 4.0 | 4.0 | 1.1 | 1.1 | 4.0 | 18.4 |
| F (kmol/h) | | 2068 | 13 | 2055 | 2051 | 4 | 4 | 11328 |
| Vap Frac | | 0 | 1 | 0 | 0 | 1 | 1 | 0 |
| Mole Fractions | $H_2O$ | 99.14% | 0.6% | 99.76% | 99.97% | 2.24% | 2.24% | 98.99% |
| | $O_2$ | | 93 ppb | | | 4 ppb | 4 ppb | 3 ppb |
| | $N_2$ | 212 ppb | 34 ppm | | | 442 ppb | 442 ppb | 3 ppm |
| | Ar | 1 ppm | 194 ppm | 17 ppb | | 8 ppm | 8 ppm | 7 ppm |
| | CO | | 12 ppb | | | | | |
| | $CO_2$ | 0.86% | 99.36% | 0.24% | 305 ppm | 97.74% | 97.74% | 1.01% |

FIG. 17 includes a four-stage flash separation system 1700. In FIG. 17, the spent fuel stream, already cooled and partially condensed in the HRSG unit (7 HRSG), is flashed in Flash Drum 8.1 at medium pressure. The liquid stream is cooled further and flashed at sequentially lower pressures in a four stage sequence. The vapor streams from each flash drum are compressed using compression units (Comp. 8.1, Comp. 8.2, and Comp. 8.3) to the original pressure and combined. Additionally, a portion of the liquid leaving Flash Drum 8.1 is recycled to be used in either the gasifier unit (2 Gasifier) or as steam in the water-gas shift reactors (4 Water Gas Shift). This minimizes the compression load in Comp. 8.2 and Comp. 8.3.

Figure 18:
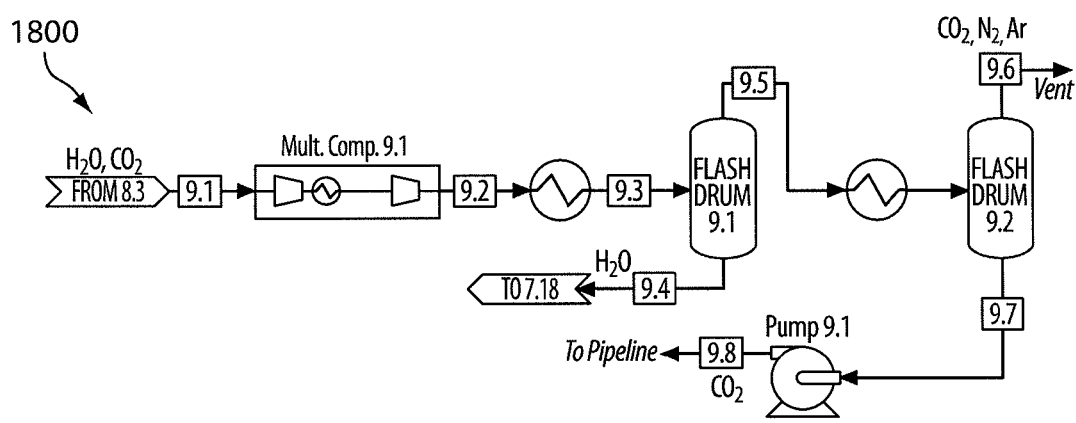
FIG. 18 is a schematic illustration of a compression system employed as part of a carbon dioxide-water separation system, according to one set of embodiments.

The recovered $CO_2$ (8.3) is finally sent to the $CO_2$ compression unit (9 $CO_2$ Compress.), where it is compressed to high pressure and ambient temperature in preparation for storage. Depending on the purity requirements for sequestration, further separation of $CO_2$ from residual impurities such as $O_2$, $N_2$ and Ar may be necessary. FIG. 18 includes a schematic illustration of the compression system 1800 employed as the $CO_2$ compression unit (9 $CO_2$ Compress.) as simulated. The stream compositions and conditions in FIG. 18 are outlined in Table 10 below.

removed from the process in a liquid slurry. Depending on the process used, high purity water may also be recovered, which can be used for recycle water to the gasifier.

There are currently tight environmental regulations on the amount of sulfur compounds that can be vented to the atmosphere, so the acid gas streams leaving the $H_2S$ removal unit may be treated to recover the sulfur with over 99.8% efficiency. Several processes can potentially be used for the $H_2S$ recovery unit, such as the typical Claus process, by which sulfur is recovered in elemental or compound form through the following reactions:

$$2H_2S+3O_2 \leftrightarrow 2H_2O+2SO_2 \quad [13]$$

$$2H_2S+SO_2 \leftrightarrow 2H_2O+3S \quad [14]$$

TABLE 10

Stream compositions and conditions for the carbon dioxide compression system in FIG. 18

| | | Stream | | | | | | |
|---|---|---|---|---|---|---|---|---|
| | 9.1 | 9.2 | 9.3 | 9.4 | 9.5 | 9.6 | 9.7 | 9.8 |
| T (° C.) | 21.0 | 80.4 | 25.1 | 6.6 | 6.6 | 25.6 | 25.6 | 47.3 |
| P (bar) | 18.4 | 74.0 | 74.0 | 74.0 | 74.0 | 74.0 | 74.0 | 153.0 |
| F (kmol/h) | 12228 | 12228 | 12228 | 15 | 12213 | 1893 | 10320 | 10320 |
| Vap Frac | 1.00 | 1.00 | 1.00 | 0.00 | 1.00 | 1.00 | 0.00 | 0.00 |
| Mole $H_2O$ | 0.17% | 0.17% | 0.17% | 95.42% | 501 ppm | 265 ppm | 544 ppm | 544 ppm |
| Fract. $O_2$ | 6 ppm | 6 ppm | 6 ppm | 20 ppb | 6 ppm | 11 ppm | 6 ppm | 6 ppm |
| $N_2$ | 1.74% | 1.74% | 1.74% | 30 ppm | 1.75% | 3.11% | 1.5% | 1.5% |
| Ar | 1.58% | 1.58% | 1.58% | 56 ppm | 1.58% | 2.42% | 1.42% | 1.42% |
| CO | 1 ppm | 1 ppm | 1 ppm | 3 ppb | 1 ppm | 2 ppm | 1 ppm | 1 ppm |
| $CO_2$ | 96.49% | 96.49% | 96.49% | 4.57% | 96.61% | 94.42% | 97.01% | 97.01% |
| $H_2$ | 65 ppm | 65 ppm | 65 ppm | 187 ppb | 65 ppm | 131 ppm | 53 ppm | 53 ppm |
| $H_2S$ | 58 ppm | 58 ppm | 58 ppm | 6 ppm | 58 ppm | 53 ppm | 59 ppm | 59 ppm |
| $CH_4$ | 17 ppm | 17 ppm | 17 ppm | 47 ppb | 17 ppm | 26 ppm | 15 ppm | 15 ppm |
| Others | 22 ppb | 22 ppb | 22 ppb | | 14 ppb | 19 ppb | 9 ppb | 9 ppb |

In FIG. 18, the $CO_2$ rich exhaust from the $CO_2$ separation unit is compressed with multistage compressors (Mult-.Comp.9.1). Liquid knockout (mostly water) may be recovered during multistage compression depending on the interstage temperature and pressures. If so, a fair amount of $CO_2$ may exist in the liquid knockout due to the high pressure conditions. For this example, the interstage stream (at 38.4 bar) was cooled to 21° C., which was not low enough to produce a liquid knockout stream. The vapor stream exiting multistage compression (9.2) is cooled to the dew point and flashed in Flash Drum 9.1, so that much of the water remaining (9.4) can be removed and sent to the HRSG unit (7 HRSG) to be converted to steam.

The vapor stream (9.5) leaving Flash Drum 9.1 is partially condensed and flashed in Flash Drum 9.2, with the remaining vapor (containing higher amounts of $N_2$ and Ar) vented to the atmosphere. This provides enough removal of inert atmospheric gases to meet desired pipeline purity criteria while still achieving high $CO_2$ recovery. It should be appreciated by someone skilled in the art that Flash Drum 9.2 is optional. If the purity of the $CO_2$ product (9.5) is high enough to meet the desired pipeline specifications, then stream 9.5 can be totally condensed instead.

The simulation of system 900 of FIG. 9 also includes a sulfur collection unit (10 Sulfur Collection). In the sulfur collection unit, the $H_2S$ recovered in the $H_2S$ removal unit (5 $H_2S$ Removal) is recovered as various sulfur compounds and A description of a Claus process using an $O_2$ rich feed (1.6) similar to that shown in the example can be found in Khudenko, B. M., et al., "Oxygen based Claus process for recovery of sulfur from $H_2S$ gases," *Journal of Environmental Engineering*, 119:6:1233-1251, which is incorporated herein by reference in its entirety. For simulation, it was assumed that the Claus process achieved sulfur recovery rates typical of those found in the industry, such that out of the total feed to sulfur collection (stream 5.6 and 5.7), 6.7% of the CO, 98% of $CO_2$, 12.4% of $H_2$, 11.7% of COS, and 4.2% of $H_2S$ are unrecovered and instead recycled to $H_2S$ removal as tail gas (10.1).

Alternatively, the $H_2S$ can be converted to other compounds depending on market conditions, such as at the Tampa Electric Polk Power Station (e.g., as described in (McDaniel J, "Tampa Electric Polk Power Station Integrated Gasification Combined Cycle Project: Final Technical Report," Tampa Electric Company, August 2002, which is incorporated herein by reference in its entirety), where $H_2SO_4$ is produced.

A summary of power production and consumption for the units simulated in this example can be found in Table 11 below.

TABLE 11

Summary of power production and consumption for the example stream conditions of the preferred embodiment of the present invention. All power values are in MW.

| Unit | Item * | Consumed (MW) | Produced (MW) |
|---|---|---|---|
| 1 | Comp 1.1 | 73.4 | |
| | Comp 1.2 | 11.4 | |
| | Turb 1.3 | | 1.3 |
| | Turb 1.4 | | 10.2 |
| 5 | Tot Pumps | 4.3 | |
| 6 | SOFCs | | 563 |
| | Turb 6.1 | | 81 |
| | Turb 6.2 | | 66 |
| | Turb 6.3 | | 21 |
| | Comp 6.1 | 187 | |
| | Comp 6.2 | 0.1 | |
| 7 | Turb 7.1 | | 91.9 |
| | Turb 7.2 | | 73.2 |
| | Turb 7.3 | | 58.3 |
| | Turb 7.4 | | 41.3 |
| | Turb 7.5 | | 50.3 |
| | Turb 7.6 | | 3.8 |
| | Tot Pumps | 5.0 | |
| 8 | Comp 8.1 | 0.00 | |
| | Comp 8.2 | 0.05 | |
| | Comp 8.3 | 0.01 | |
| 9 | Comp 9.1 | 12.3 | |
| | Pump 9.1 | 2.3 | |
| | Gross Totals | 296 | 1061 |
| | Net Production | | 765 |

EXAMPLE 4

This example outlines a simulation of an electricity generation process using natural gas as the fuel and solid oxide fuel cells as the power generation units. The process described in this example achieves high thermal efficiency (>77%) and zero atmospheric emissions. The process contains steam reforming and water-gas shift units heat integrated with the fuel cells to provide the heat necessary for reforming. As a result, the fuel cells run on $H_2$ and avoid carbon deposition issues. 100% $CO_2$ capture is achieved downstream of the fuel cells with very little energy penalty using a multi-stage flash cascade process of the invention, where high purity water is produced as side product. A schematic diagram of the simulated process 1900 is shown in FIG. 19, with stream conditions in Table 12 below.

TABLE 12

Figure 19:
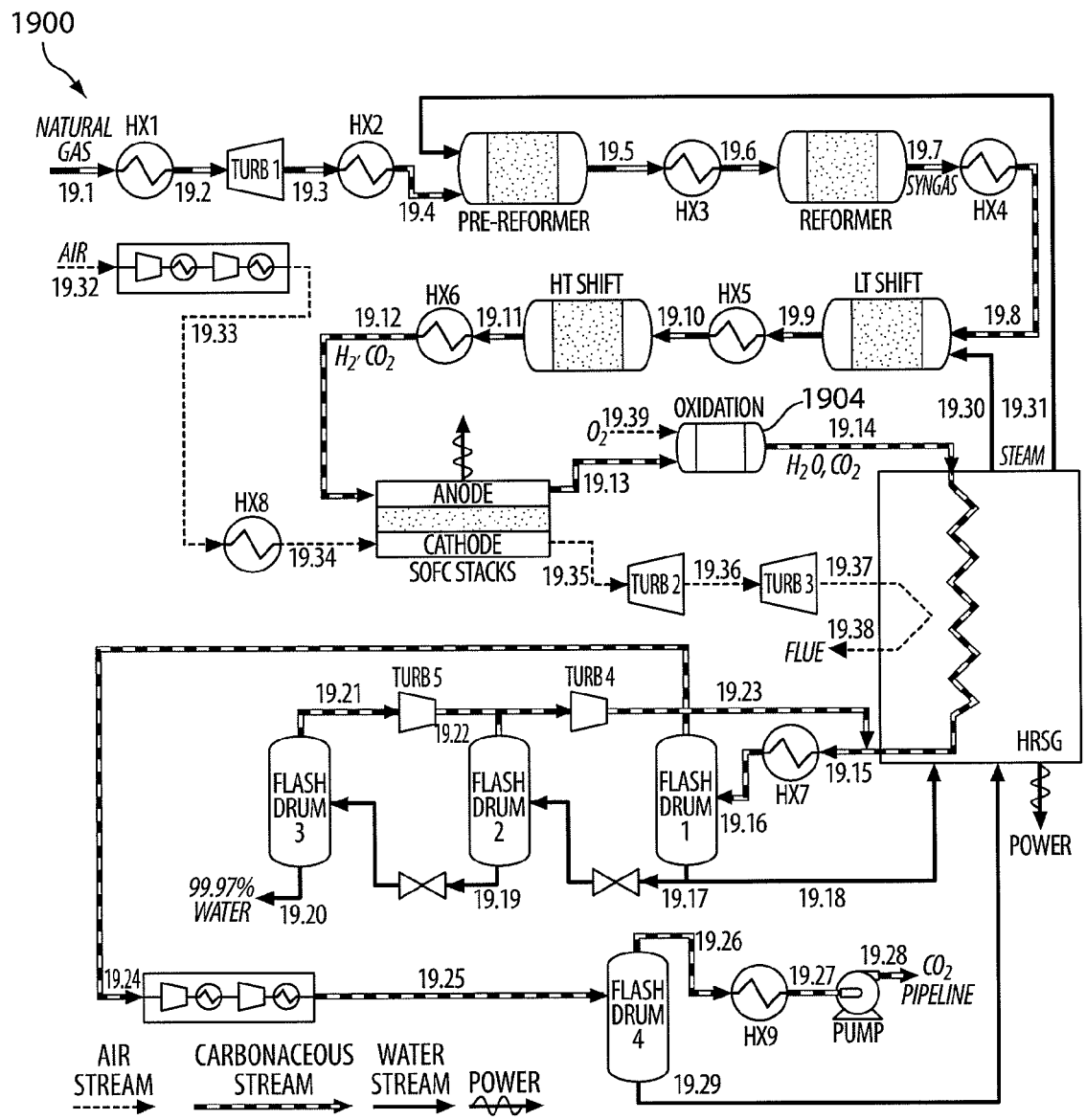
FIG. 19 shows, according to one set of embodiments, a schematic illustration of an electricity generation process using natural gas as the fuel.

Stream compositions and conditions for the electricity generation system in FIG. 19

| | | Stream | | | | | |
|---|---|---|---|---|---|---|---|
| | | 19.1 | 19.2 | 19.3 | 19.4 | 19.5 | 19.6 |
| | T (° C.) | 38 | 700 | 633 | 950 | 863 | 950 |
| | P (bar) | 30.0 | 30.0 | 12.5 | 12.5 | 12.1 | 12.1 |
| | F (kmol/h) | 4348 | 4348 | 4348 | 4348 | 18270 | 18270 |
| | Vapor Frac. | 1 | 1 | 1 | 1 | 1 | 1 |
| Mole Fractions | $CH_4$ | 93.9% | 93.9% | 93.9% | 93.9% | 22.3% | 22.3% |
| | $C_2H_6$ | 3.2% | 3.2% | 3.2% | 3.2% | | |
| | $C_3H_8$ | 0.7% | 0.7% | 0.7% | 0.7% | | |
| | $C_4H_{10}$ | 0.4% | 0.4% | 0.4% | 0.4% | | |
| | CO | | | | | 2.4% | 2.4% |
| | $CO_2$ | 1% | 1% | 1% | 1% | 0.6% | 0.6% |
| | $H_2$ | | | | | 5.8% | 5.8% |
| | $H_2O$ | | | | | 68.6% | 68.6% |
| | $N_2$ | 0.8% | 0.8% | 0.8% | 0.8% | 0.2% | 0.2% |
| | $O_2$ | | | | | 12 ppb | 12 ppb |
| | Ar | | | | | 772 ppb | 772 ppb |

| | | Stream | | | | | |
|---|---|---|---|---|---|---|---|
| | | 19.7 | 19.8 | 19.9 | 19.10 | 19.11 | 19.12 |
| | T (° C.) | 950 | 216 | 375 | 232 | 262 | 910 |
| | P (bar) | 11.5 | 11.5 | 10.8 | 10.8 | 10.1 | 10.1 |
| | F (kmol/h) | 26315 | 26315 | 26721 | 26721 | 26721 | 26721 |
| | Vapor Frac. | 1 | 1 | 1 | 1 | 1 | 1 |
| Mole Fractions | $CH_4$ | 0.2% | 0.2% | 0.2% | 0.2% | 0.2% | 0.2% |
| | $C_2H_6$ | | | | | | |
| | $C_3H_8$ | | | | | | |
| | $C_4H_{10}$ | | | | | | |
| | CO | 17% | 17% | 3.3% | 3.3% | 0.8% | 0.8% |
| | $CO_2$ | 0.4% | 0.4% | 13.8% | 13.8% | 16.3% | 16.3% |
| | $H_2$ | 49.9% | 49.9% | 62.5% | 62.5% | 65% | 65% |
| | $H_2O$ | 32.4% | 32.4% | 20% | 20% | 17.5% | 17.5% |
| | $N_2$ | 0.1% | 0.1% | 0.1% | 0.1% | 0.1% | 0.1% |
| | $O_2$ | 9 ppb | | | | | 9 ppb |
| | Ar | 536 ppb | | | | | 544 ppb |

TABLE 12-continued

Stream compositions and conditions for the electricity generation system in FIG. 19

| | | Stream | | | | | |
|---|---|---|---|---|---|---|---|
| | | 19.13 | 19.14 | 19.15 | 19.16 | 19.17 | 19.18 |
| | T (° C.) | 967 | 1253 | 50 | 21 | 21 | 21 |
| | P (bar) | 8.7 | 8.7 | 8.7 | 8.7 | 8.6 | 8.6 |
| | F (kmol/h) | 26721 | 26912 | 26912 | 27070 | 8844 | 13450 |
| | Vapor Frac. | 1 | 1 | 0.18 | 0.18 | 0 | 0 |
| Mole Fractions | $CH_4$ | 0.2% | 22 ppm | 22 ppm | 23 ppm | 24 ppb | 24 ppb |
| | $C_2H_6$ | | | | | | |
| | $C_3H_8$ | | | | | | |
| | $C_4H_{10}$ | | | | | | |
| | CO | 662 ppm | 7 ppm | 7 ppm | 7 ppm | 5 ppb | 5 ppb |
| | $CO_2$ | 17% | 17.2% | 17.2% | 17.6% | 0.5% | 0.5% |
| | $H_2$ | 5.2% | 516 ppm | 516 ppm | 513 ppm | 161 ppb | 161 ppb |
| | $H_2O$ | 77.3% | 82.4% | 82.4% | 82% | 99.5% | 99.5% |
| | $N_2$ | 0.1% | 0.2% | 0.2% | 0.2% | 688 ppb | 688 ppb |
| | $O_2$ | | 15 ppm | 15 ppm | 15 ppm | 17 ppb | 17 ppb |
| | Ar | 544 ppb | 0.1% | 0.1% | 0.1% | 1 ppm | 1 ppm |

| | | Stream | | | | | |
|---|---|---|---|---|---|---|---|
| | | 19.19 | 19.20 | 19.21 | 19.22 | 19.23 | 19.24 |
| | T (° C.) | 20 | 21 | 21 | 20 | 202 | 21 |
| | P (bar) | 4.0 | 1.1 | 1.1 | 4.0 | 8.7 | 8.6 |
| | F (kmol/h) | 8822 | 8806 | 19 | 23 | 41 | 4776 |
| | Vapor Frac. | 0 | 0 | 1 | 1 | 1 | 1 |
| Mole Fractions | $CH_4$ | | | 352 ppb | 9 ppb | 5 ppm | 128 ppm |
| | CO | | | 63 ppb | 2 ppm | 1 ppm | 37 ppm |
| | $CO_2$ | 0.2% | 649 ppm | 97.8% | 99.3% | 98.6% | 97.7% |
| | $H_2$ | 1 ppb | | 671 ppb | 63 ppm | 35 ppm | 0.3% |
| | $H_2O$ | 99.8% | 99.9% | 2.2% | 0.6% | 1.4% | 0.3% |
| | $N_2$ | 8 ppb | | 4 ppm | 267 ppm | 147 ppm | 1.1% |
| | $O_2$ | | | 279 ppb | 7 ppm | 4 ppm | 87 ppm |
| | Ar | 35 ppb | | 16 ppm | 411 ppm | 231 ppm | 0.6% |

| | | Stream | | | | | |
|---|---|---|---|---|---|---|---|
| | | 19.25 | 19.26 | 19.27 | 19.28 | 19.29 | 19.30 |
| | T (° C.) | 80 | 56 | 22 | 38 | 56 | 216 |
| | P (bar) | 74.0 | 74.0 | 74.0 | 153.0 | 74.0 | 11.5 |
| | F (kmol/h) | 4776 | 4660 | 4660 | 4660 | 116 | 406 |
| | Vapor Frac. | 1 | 1 | 0 | 0 | 0 | 1 |
| Mole Fractions | $CH_4$ | 128 ppm | 129 ppm | 129 ppm | 129 ppm | 88 ppm | 24 ppb |
| | CO | 37 ppm | 38 ppm | 38 ppm | 38 ppm | 4 ppm | 5 ppb |
| | $CO_2$ | 97.7% | 97.9% | 97.9% | 97.9% | 88.9% | 0.5% |
| | $H_2$ | 0.3% | 0.3% | 0.3% | 0.3% | 2 ppb | 161 ppb |
| | $H_2O$ | 0.3% | 577 ppm | 577 ppm | 577 ppm | 10.9% | 99.5% |
| | $N_2$ | 1.1% | 1.1% | 1.1% | 1.1% | 930 ppb | 688 ppb |
| | $O_2$ | 87 ppm | 88 ppm | 88 ppm | 88 ppm | 18 ppm | 17 ppb |
| | Ar | 0.6% | 0.6% | 0.6% | 0.6% | 0.1% | 1 ppm |

| | | Stream | | | | | |
|---|---|---|---|---|---|---|---|
| | | 19.31 | 19.32 | 19.33 | 19.34 | 19.35 | 19.36 |
| | T (° C.) | 950 | 15 | 398 | 910 | 967 | 796 |
| | P (bar) | 12.5 | 1.0 | 10.1 | 10.1 | 8.7 | 3.7 |
| | F (kmol/h) | 13044 | 42952 | 42952 | 42952 | 34859 | 34859 |
| | Vapor Frac. | 1 | 1 | 1 | 1 | 1 | 1 |
| Mole Fractions | $CH_4$ | 24 ppb | | | | | |
| | CO | 5 ppb | | | | | |
| | $CO_2$ | 0.5% | 300 ppm | 300 ppm | 300 ppm | 370 ppm | 370 ppm |
| | $H_2$ | 161 ppb | | | | | |
| | $H_2O$ | 99.5% | 1.1% | 1.1% | 1.1% | 1.3% | 1.3% |
| | $N_2$ | 688 ppb | 77.2% | 77.2% | 77.2% | 95.1% | 95.1% |
| | $O_2$ | 17 ppb | 20.8% | 20.8% | 20.8% | 2.4% | 2.4% |
| | Ar | 1 ppm | 0.9% | 0.9% | 0.9% | 1.2% | 1.2% |

TABLE 12-continued

Stream compositions and conditions for the electricity generation system in FIG. 19

|  |  | Stream | | |
| --- | --- | --- | --- | --- |
|  |  | 19.37 | 19.38 | 19.39 |
|  | T (° C.) | 591 | 50 | 80 |
|  | P (bar) | 1.1 | 1.1 | 8.7 |
|  | F (kmol/h) | 34859 | 34859 | 888 |
|  | Vapor Frac. | 1 | 1 | 1 |
| Mole Fractions | $CH_4$ |  |  |  |
|  | CO |  |  |  |
|  | $CO_2$ | 370 ppm | 370 ppm | 0.1% |
|  | $H_2$ |  |  |  |
|  | $H_2O$ | 1.3% | 1.3% | 3% |
|  | $N_2$ | 95.1% | 95.1% | 1.8% |
|  | $O_2$ | 2.4% | 2.4% | 92% |
|  | Ar | 1.2% | 1.2% | 3.1% |

The process can be broken into several sections: Reforming, Shifting, Power Generation, Heat Recovery, and $CO_2$ Recovery. For the calculations presented in this example, it is assumed that 4348 kmol/hr of desulfurized natural gas is available at 30 bar and 38° C., containing 93.9 mol % methane, 3.2 mol % ethane, 0.7 mol % propane, 0.4 mol % n-butane, 1 mol % $CO_2$, and the balance $N_2$. These are the same inlet conditions used in the natural gas combined cycle (NGCC) plant with $CO_2$ capture presented in Woods et al.

The process begins with the steam reforming of natural gas. At atmospheric pressure, 99% conversion of methane can be achieved with $H_2O:CH_4$ molar ratios of 3:1 at about 750° C. As the pressure increases, the temperature requirement for 99% conversion increases, approaching 1000° C. for 15 bar pressure.

It has commonly been assumed that power generation systems using SOFCs can be designed such that the steam reforming process takes place inside of the SOFC anodes simultaneously with the power generation reactions. Thermodynamically, this may be advantageous since heat released by the electrochemical oxidation of CO and $H_2$ at high temperatures can be used to directly satisfy the high temperature energy needs of the endothermic steam reforming process. However, the deposition of carbon solids inside the anode is a major challenge. Chemical equilibrium predictions have shown that for methane fuels above 400° C., graphitic carbon exists as a stable, condensed phase. As a result, the attainable fuel cell voltage decreases, causing a significant drop in the efficiency of the cell. Therefore, for natural gas fuels, it may be advantageous to perform steam reforming upstream of the SOFC power generation section.

In the process 1900 of FIG. 19, natural gas is preheated to 700° C. in a heat exchanger (HX 1) and expanded to 12.5 bar through a turbine (Turb. 1), producing power. The expanded natural gas is then heated further with a heat exchanger (HX 2) to the Pre-Reformer operating temperature (about 950° C.) and fed to the Pre-Reformer with steam. In the Pre-Reformer, ethane, propane, and butane are converted to syngas, but because they have a relatively low concentration, the temperature drop of the bulk gas is relatively small. Therefore, the Pre-Reformer can operate essentially adiabatically and still achieve high conversion. The Pre-Reformer effluent is then reheated to 950° C. (in HX 3) and sent to the Reformer, where greater than 99% conversion of methane is achieved. Because of the significant temperature drop, heat is provided by integration with downstream sections of the plant, maintaining the reformer temperature around 950° C.

The inlet pressure to the reformer (12.1 bar) is chosen such that greater than 99% methane conversion can be achieved at 950° C. with an inlet steam:methane molar ratio of 3:1. It is assumed that the pre-reformer has a 0.4 bar pressure drop and the reformer has a 0.6 bar pressure drop. Lower pressures increase the methane conversion, but have a negative impact on the electrical efficiency of the downstream SOFCs, as described below.

The next phase of the process involves enriching the syngas via a water-gas shift reaction. Though the use of natural-gas-derived syngas as fuel for SOFCs has been previously proposed, recent studies have shown that syngas fuels have the same carbon deposition issues as methane fuel. Like methane, chemical equilibrium predictions show the formation of a stable, graphitic carbon phase when CO is present in the SOFC anode under normal operating conditions. This is also true for a range of fossil-fuel-derived syngas mixtures. Researchers have experimentally confirmed that the presence of CO in the anode can cause both power loss and cell degradation, leading to a shorter lifetime and reduced efficiencies. Although some researchers have been able to run a SOFC for over a month on a syngas fuel, the effects of long-term exposure on the usable lifetime are still unclear. Furthermore, the simulations described in this example show that significantly more power may be produced when running the fuel cell on $H_2$ rather than a mixture of $H_2$ and CO, highlighting the negative impact of CO.

Although many variations of the water-gas shift are possible, the process of FIG. 19 utilizes two reactors in series: a high-temperature (about 300-450° C.) plug flow reactor (HT Shift) and a low-temperature (about 200-300° C.) plug flow reactor (LT Shift), with an intermediate cooler (HX 5). It is assumed that 80% conversion is achieved in the high temperature reactor, and the low temperature reaction approaches equilibrium, or about 96% conversion overall. Additional steam is added to the first reactor to bring the $H_2O:CO$ ratio up to 2:1. The reactor effluent consists of >65 mol % $H_2$, with the balance mostly $H_2O$ and $CO_2$ (the SOFC anode is tolerant of both). A pressure drop of 0.7 bar is assumed for each reactor.

The enriched syngas is fed to a SOFC system to produce power. The $H_2$-rich fuel is fed to the SOFC anode, while an oxygen source is provided in the cathode (e.g., air). In this example, it is assumed that 92% of the $H_2$ is consumed in the fuel cells, and the SOFCs operate at 10.1 bar. Pressures up to 20 bar are technologically permissible, with higher pressures leading to somewhat higher efficiencies. However, efficiency losses can be significant as the SOFC pressure decreases below 10 bar. Ultimately, the design pressure should be chosen as part of a plant-wide optimization problem, where raising the system pressure increases the electrical efficiency of the SOFCs but decreases the conversion of methane in the reformers.

SOFCs typically operate at about 800-1000° C., with higher temperatures providing higher fuel cell efficiency. A portion of the free energy of reaction is released as heat instead of electricity, and so inter-cooling stages are useful in preventing temperatures from rising above 1000° C. The inter-cooling stages can be heat-integrated with the steam reformer to provide a large portion of the high temperature heat requirement. This is an advantage over many steam reforming processes where a portion of the natural gas is combusted for the express purpose of providing high quality heat to the reformer, leading to an overall efficiency loss.

In the process of FIG. 19, shifted syngas is heated to 950° C. in HX6 and fed to the anode of the SOFC stack. Ambient air is compressed to 10.1 bar, preheated to 950° C. in HX8, and fed to the cathode. The fuel cells maintain separate anode and cathode exhaust streams, preventing the spent air from entering the fuel exhaust. Thus, the fuel exhaust comprises primarily the waste gases ($H_2O$ and $CO_2$) and some unreacted $H_2$.

The anode exhaust is fed to an oxidation reactor, where the unreacted $H_2$ (and any CO or $CH_4$ that may also remain) is reacted with a stoichiometric amount of $O_2$, creating heat, water and $CO_2$. In this example the oxygen source is provided by an air separation unit (not shown) at 92 mol % purity (the balance is $N_2$, Ar, and $H_2O$). Because the amount of oxygen required is small, higher purity commercial sources may be more cost effective, particularly for smaller plants. The oxidation reactor exhaust is heat integrated with the HRSG.

The cathode exhaust is expanded to atmospheric pressure through a set of turbines (Turb. 2 and Turb. 3), producing power. In this way, the air compressor 1902, HX8, SOFCs and turbines form a Brayton cycle, improving the power output of the plant. The remaining heat in the expanded air stream is recovered in the HRSG.

The HRSG section of the plant integrates all of the heat sources and sinks throughout the plant. Some of this heat is used to produce the high temperature (about 950° C.) and low temperature (about 216° C.) steam required for the reforming and water-gas shift processes. The necessary water is provided by recycling a portion of the water recovered during $CO_2$ Recovery, and may contain a small amount of $CO_2$ (<1%). The remaining heat is used in a bottoming steam cycle to produce power. For this example, the steam cycle reaches 550° C. and 127 bar and uses a five-stage steam turbine with exit pressures of 28.2, 6.3, 1.4, 0.4, and 0.07 bar (not shown).

The performance of the heat exchanger network (HEN) (not shown) for the HRSG in this example is described in Table 13. The simulation of the HEN assumes that all of the heat from SOFC inter-stage cooling can be used toward high temperature (950° C.) heat sinks. Since SOFC stacks are highly modular, this may be achieved by using a large number of intercooling stages. The HEN avoids temperature crossover, but assumes an idealized 0° C. minimum approach temperature for simplicity.

TABLE 13

The heat exchanger network used in the system of FIG. 19. The columns indicate the duty (in MW) of the heat exchanger connection between heat sinks and sources. The "Cp, avail" column indicated the available heat capacity of each stream, given in terms on MW per ° C., assuming a 0° C. pinch point.

| | | Duty MW | T In (° C.) | T Out (° C.) | Cp, avail MW/° C. | Heat Exchanger Network Connections (MW) | | | | | |
|---|---|---|---|---|---|---|---|---|---|---|---|
| Heat Needs | | | | | | | | | | | |
| HX1 | Natural Gas Preheat | 46 | 38 | 700 | 0.08 | 24 | | 22 | | | |
| HX2 | Pre-reformer Preheat | 30 | 633 | 950 | 0.08 | | 30 | | | | |
| HX3 | Reformer Preheat | 23 | 863 | 950 | 0.26 | | 23 | | | | |
| | Reformer Heating | 253 | 950 | 950 | | 224 | 29 | | | | |
| HX6 | SOFC Fuel Preheat | 170 | 262 | 910 | 0.26 | | | 20 | 150 | | |
| HX8 | SOFC Air Preheat | 200 | 398 | 910 | 0.39 | | | 20 | 180 | | |
| HRSG | WGS Steam Gen. | 6 | 21 | 216 | 0.03 | | | | | | 6 |
| HRSG | Reformer Steam Gen. | 289 | 21 | 950 | 0.31 | | | 181 | | 35 | 73 |
| HRSG | Bottoming | 237 | 43 | 550 | 0.47 | | | | | 159 | 78 |
| Available Sources | | | | | | | | | | | |
| HX4 | WGS Pre-cooling | −181 | 950 | 216 | 0.25 | | | 181 | | | |
| HX5 | WGS Interstage Cool | −35 | 375 | 232 | 0.25 | | | | | | 35 |

TABLE 13-continued

The heat exchanger network used in the system of FIG. 19. The columns indicate the duty (in MW) of the heat exchanger connection between heat sinks and sources. The "Cp, avail" column indicated the available heat capacity of each stream, given in terms on MW per ° C., assuming a 0° C. pinch point.

| | | Duty MW | T In (° C.) | T Out (° C.) | Cp, avail MW/° C. | Heat Exchanger Network Connections (MW) |
|---|---|---|---|---|---|---|
| SOFC | SOFC Interstage Cool | −224 | 1000 | 950 | 0.68 | 224 |
| HRSG | Fuel Exhaust Cooling 1 | −146 | 1253 | 841 | 0.35 | 29 24 30 23 20 20 |
| HRSG | Fuel Exhaust Cooling 2 | −508 | 841 | 50 | 0.64 | 150 180 22 6 73 78 |
| HRSG | Air Exhaust Cooling | −159 | 591 | 50 | 0.29 | 159 |

The fuel utilization of the SOFCs can affect the structure of the HEN. If the fuel utilization is raised, slightly more heat is produced in the SOFCs, but less recoverable heat is produced in the oxidizer 1904, since less $H_2$ is available for oxidation. Overall, this reduces the amount of high quality heat for use in the reformer and reformer pre-heaters. In certain cases, a portion of the $H_2$ fuel could bypass the SOFCs and instead enter the oxidation reactor directly to make up for heat deficits, however leading to lower power production.

The spent fuel gas, after heat recovery, comprises primarily $CO_2$ and $H_2O$ at low temperature and about 8.6 bar. The $CO_2$ can be recovered, for example, through a three-stage flash cascade process provided according to the invention. The gas stream is cooled to 21° C. and flashed in a drum (Flash Drum 1) at 8.6 bar. The liquid product contains water at about 99 mol % purity. A portion of this water is diverted to the HRSG for steam production for the reforming and WGS operations. The remaining water is flashed in two successive drums (Flash Drum 2 and Flash Drum 3) at 4 bar and 1 bar. Vapor products from these drums (rich in $CO_2$) are recompressed to 8.6 bar and recycled to the first drum. The liquid product from the last drum consists of greater than 99.97 mol % water, which can be treated and used for other purposes.

The $CO_2$ rich vapor product from the first drum is compressed to 74 bar (near the critical point), cooled to 56° C., and flashed in Flash Drum 4. Most of the remaining water is recovered in the liquid phase and recycled to the HRSG for steam generation. The vapor product is condensed to a liquid and then pumped to supercritical pressures (153 bar) for transportation in a $CO_2$ pipeline.

In this exemplary process, a 77.4% HHV thermal efficiency is achieved, producing a net 853 MW of electricity. As shown in Table 14, most of this is produced by the SOFC stacks, while 80 MW are produced by the steam bottoming cycle. Although the power consumption of air compression for the SOFC cathode is large, it is mostly provided for by the recovery turbines (Turb. 2 and Turb. 3).

Table 14 includes a comparison between this examples and Case 14 in Woods et al. The Woods process represents a typical NGCC process with $CO_2$ capture, where natural gas is directly combusted with air for a gas turbine, and residual heat from the exhaust is captured in a bottoming steam cycle. The Woods process achieves 44.5% efficiency and a net power output of 490 MW for the same input—significantly lower than the inventive SOFC-based process. In the Woods process an amine-based absorption process recovers $CO_2$ from the cooled flue gas, typically achieving about 90% recovery. The unrecovered gases (including $NO_X$ and 10% of the $CO_2$) are emitted to the atmosphere through the flue.

TABLE 14

The power and environmental breakdown of the natural gas SOFC process of Example 4, and the NGCC process with $CO_2$ capture presented in Case 14 of Woods et al. Some minor auxiliary loads in the Woods process were not included for this comparison. Negative values indicate power produced, positive values indicate power consumed.

| | This Work | NGCC [Woods et al.] |
|---|---|---|
| Steam Reforming | | |
| NG Expander (Turb 1) | −5.9 | |
| Power Plant | | |
| Air Multistage Compression | 136.5 | |
| SOFC Power Produced | −803.1 | |
| Gas Turbine, Including Air Compres. | | −370.2 |
| Air Power Recovery (Turb 2) | −55.7 | |
| Air Power Recovery (Turb 3) | −64.3 | |
| HRSG | | |
| Total Steam Turbines | −79.8 | −149.9 |
| Total Pumps | 1.2 | 5.0 |
| $CO_2$ Recovery | | |
| $CO_2$/Water Separation (Turbs 4 & 5) | 0.1 | |
| Amine-based $CO_2$ Recovery | | 9.6 |
| $CO_2$ Compression | 9.3 | 15.0 |
| Air Separation | | |
| Air Separation Power Consumption | 8.5 | |
| Net Power Output (MW) | 853.2 | 490.5 |
| HHV NG Feed (MW) | 1102 | 1102 |
| Plant Thermal Efficiency (% HHV) | 77.4% | 44.5% |
| Emissions Summary | | |
| $CO_2$ In Pipeline (kmol/hr) | 4563 | 4141 |
| Carbon Capture | 100% | 91% |
| $CO_2$ Emissions (tonne/yr) | 0 | 115 |
| $NO_X$ Emissions (tonne/yr) | 0 | 151,000 |

The inventive fuel cell based process in this example, on the other hand, has essentially zero atmospheric emissions. As shown in Table 14, nearly all of the carbon contained in the natural gas feed is captured, liquefied, and sent to the pipeline for sequestration. Only a slight amount of $CO_2$ escapes in the high purity water product. Some impurities may be present in the $CO_2$ sequestration stream, but the water, $N_2$, and Ar concentrations are low enough for many pipelines in use in the industry. Any $NO_X$ gases that might be formed during this process (though neglected for this analysis) would also be sequestered with the $CO_2$. Thus, essentially no waste gases derived from the natural gas source are emitted to the environment. Additionally, this process produces, rather than consumes, water. Because essentially all of the steam requirements can be provided by recovery of water produced in the fuel cells, essentially no freshwater needs to be added to the process. Rather, the recovered water is at very high purity, suitable for municipal wastewater treatment.

The cooling requirements of this plant were not considered. Typically cooling towers are preferred, which provide cooling by evaporating a supply of fresh water. The water produced in the power generation process can be recycled for this purpose, reducing the consumption of water drawn from the environment. Alternatively, if a waterless cooling system (e.g., air-cooled exchangers) is used, no freshwater will typically be needed at all (although there will be a sizeable energy penalty), and thus the plant will be, on the whole, water positive.

The natural gas source in this example contained essentially no other impurities, particularly sulfur. If other impurities were present, various impurity removal processes could be included, such as those described in Example 3.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of separating carbon dioxide and water, comprising:
    separating a first fluid stream comprising carbon dioxide and water within a first flash drum to create a second fluid stream enriched in water relative to the first fluid stream and a third fluid stream enriched in carbon dioxide relative to the first fluid stream, wherein the third fluid stream contains at least about 99 wt % carbon dioxide; and
    separating at least a portion of the second fluid stream comprising carbon dioxide and water within a second flash drum to create a fourth fluid stream enriched in water relative to the second fluid stream, wherein the fourth fluid stream contains at least about 99 wt % water.

2. A method of separating carbon dioxide and water, comprising:
    separating a first fluid stream comprising carbon dioxide and water within a first flash drum to create a second fluid stream enriched in water relative to the first fluid stream;
    separating at least a portion of the second fluid stream comprising carbon dioxide and water within a second flash drum to create a third fluid stream enriched in carbon dioxide relative to the second fluid stream; and
    recycling and directly combining at least a portion of the third fluid stream with the first fluid stream.

3. The method of claim 1, wherein the fourth fluid stream contains at least about 99.8 wt % water.

4. The method of claim 1, wherein at least one of the first and second separation steps is performed essentially adiabatically.

5. The method of claim 1, comprising creating from the second fluid stream in the second flash drum a fifth fluid stream enriched in carbon dioxide relative to the second fluid stream.

6. The method of claim 1, comprising sequestering the third fluid stream.

7. The method of claim 1, wherein the pressure in the first flash drum is between about 2 bar and about 35 bar.

8. The method of claim 1, wherein the pressure in the second flash drum is between about 2 bar and about 35 bar.

9. The method of claim 1, wherein the first fluid stream contains less than about 1.5 wt % carbon monoxide.

10. The method of claim 1, wherein the first fluid stream consists essentially of carbon dioxide and water.

11. The method of claim 1, wherein the weight ratio of carbon dioxide to carbon monoxide in the first fluid stream is at least about 30:1.

12. The method of claim 1, wherein the first fluid stream comprises or is derived from at least a portion of a fluid product of a chemical reactor.

13. The method of claim 1, wherein the first fluid stream comprises or is derived from a syngas.

14. The method of claim 1, wherein the second flash drum is operated at ambient temperature.

15. The method of claim 5, comprising recycling and combining at least a portion of the fifth fluid stream with the first fluid stream.

16. The method of claim 1, wherein the third fluid stream contains at least about 99.9 wt % carbon dioxide.

17. The method of claim 1, wherein the fourth fluid stream contains at least about 99.99 wt % water.

18. The method of claim 2, wherein the first fluid stream contains less than about 1.5 wt % carbon monoxide.

19. The method of claim 2, wherein the first fluid stream comprises or is derived from a syngas.

20. The method of claim 2, wherein the second flash drum is operated at ambient temperature.

* * * * *